(12) United States Patent
Hilgers et al.

(10) Patent No.: US 12,291,249 B2
(45) Date of Patent: May 6, 2025

(54) SYSTEM AND METHOD FOR TRAVERSING A NON-MOVING RAIL SWITCH USING ELECTROMAGNETIC ENGINES

(71) Applicant: Hyperloop Technologies, Inc., Los Angeles, CA (US)

(72) Inventors: Andy Alexander Hilgers, Los Angeles, CA (US); Timothy Nicholas Leslie Lambert, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 305 days.

(21) Appl. No.: 17/790,753

(22) PCT Filed: Feb. 8, 2021

(86) PCT No.: PCT/US2021/017029
§ 371 (c)(1),
(2) Date: Jul. 4, 2022

(87) PCT Pub. No.: WO2021/162968
PCT Pub. Date: Aug. 19, 2021

(65) Prior Publication Data
US 2022/0371635 A1 Nov. 24, 2022

Related U.S. Application Data

(60) Provisional application No. 62/976,128, filed on Feb. 13, 2020, provisional application No. 62/977,692, (Continued)

(51) Int. Cl.
*B60L 13/08* (2006.01)
*B61F 5/24* (2006.01)
(Continued)

(52) U.S. Cl.
CPC ............ *B61L 15/0072* (2013.01); *B60L 13/08* (2013.01); *B61F 5/245* (2013.01); *B61H 7/08* (2013.01);
(Continued)

(58) Field of Classification Search
CPC ... B61F 5/46; B61F 9/005; B61H 7/08; B60L 13/08; B61L 11/08; B61L 11/083; B61L 13/047
(Continued)

(56) References Cited

U.S. PATENT DOCUMENTS 2,198,928 A 4/1940 Wehner
3,763,788 A * 10/1973 Pougue ................. B61B 13/122
104/130.02
(Continued)

FOREIGN PATENT DOCUMENTS

DE 2541599 A1 3/1977
EP 3333043 A1 6/2018
(Continued)

OTHER PUBLICATIONS

Krull, Hintze, and Luke, "Eddycurrent Detection of Head Checks on the Gauge Corners of Rails: Recent Results" NDT.net vol. 7, No. 6, Jun. 2002, entire document cited.
(Continued)

*Primary Examiner* — Erick R Solis
(74) *Attorney, Agent, or Firm* — Seyfarth Shaw LLP

(57) ABSTRACT

A system and method are disclosed enabling the use of electromagnetic engines to traverse a wheeled bogie assembly across a plurality of rails. The electromagnetic engines may be used within a rail assembly comprising four rails and a frog assembly. Further, the electromagnetic engines may be used to traverse between a straight path and a turnout path at a non-moving rail switch having a frog assembly. In one
(Continued)

aspect, an algorithm for powering various coils is disclosed wherein the algorithm controls the power level to switch tracks connected to the frog assembly.

13 Claims, 61 Drawing Sheets

Related U.S. Application Data filed on Feb. 17, 2020, provisional application No. 62/978,293, filed on Feb. 18, 2020, provisional application No. 63/028,551, filed on May 21, 2020, provisional application No. 63/050,751, filed on Jul. 11, 2020, provisional application No. 63/085,119, filed on Sep. 29, 2020.

(51) Int. Cl.
| | | |
|---|---|---|
| *B61H 7/08* | (2006.01) | |
| *B61L 11/08* | (2006.01) | |
| *B61L 13/04* | (2006.01) | |
| *B61L 15/00* | (2006.01) | |
| *B61F 9/00* | (2006.01) | |

(52) U.S. Cl.
CPC ............. *B61L 11/08* (2013.01); *B61L 11/083* (2013.01); *B61L 13/047* (2013.01); *B61L 15/0058* (2024.01); *B61L 15/0081* (2013.01); *B60L 2200/26* (2013.01); *B61F 9/005* (2013.01)

(58) Field of Classification Search
USPC ...... 105/34.1, 34.2; 246/419, 422, 424, 426; 701/19
See application file for complete search history.

(56) References Cited

U.S. PATENT DOCUMENTS

| | | | | |
|---|---|---|---|---|
| 3,845,720 | A * | 11/1974 | Bohn | B60L 13/003 |
| | | | | 104/130.02 |
| 3,847,088 | A * | 11/1974 | Karch | B60L 13/10 |
| | | | | 104/130.02 |
| 3,851,594 | A * | 12/1974 | Schwarzler | B60L 13/04 |
| | | | | 104/130.02 |
| 3,874,299 | A * | 4/1975 | Silva | B60L 13/003 |
| | | | | 104/130.02 |
| 3,911,829 | A | 10/1975 | Ross et al. | |
| 3,931,767 | A * | 1/1976 | Karch, deceased | B61B 13/08 |
| | | | | 104/130.02 |
| 3,941,062 | A | 3/1976 | Machefert-Tassin | |
| 4,038,928 | A * | 8/1977 | Degen | B61F 9/005 |
| | | | | 105/157.1 |
| 4,041,877 | A | 8/1977 | Simon et al. | |
| 4,519,329 | A | 5/1985 | Vacher | |
| 4,920,893 | A * | 5/1990 | Maupu | B61F 5/383 |
| | | | | 104/242 |
| 5,794,535 | A * | 8/1998 | Pardes | B60L 13/10 |
| | | | | 104/130.07 |
| 6,101,952 | A * | 8/2000 | Thornton | B60L 13/003 |
| | | | | 104/130.02 |
| 10,647,336 | B2 * | 5/2020 | Consoli | B61F 9/00 |
| 2001/0035107 | A1 | 11/2001 | Henderson | |
| 2007/0044676 | A1 * | 3/2007 | Clark | B61B 13/08 |
| | | | | 104/130.02 |
| 2016/0009196 | A1 * | 1/2016 | Allard | B60L 13/10 |
| | | | | 104/130.03 |
| 2016/0144873 | A1 | 5/2016 | Atmur et al. | |
| 2018/0186389 | A1 | 7/2018 | Hosseini | |
| 2019/0031045 | A1 | 1/2019 | Usman et al. | |

FOREIGN PATENT DOCUMENTS

| | | |
|---|---|---|
| GB | 1200201 A | 7/1970 |
| GB | 1494120 A | 12/1977 |
| GB | 2477109 A | 7/2011 |
| GB | 2477109 B | 2/2018 |
| KR | 20110036445 A | 4/2011 |
| WO | 2011152592 A1 | 12/2011 |

OTHER PUBLICATIONS

Liu et al., "Electromagnetic Tomography Rail Defect Inspection," IEEE Transactions of Magnetics, vol. 51, No. 10, dated Oct. 2015, retrieved online on May 17, 2021, entire document cited.
Ma et al., "Design and Analysis of the Hybrid Excitation Rail Eddy Brake System of High-Speed Trains" Journal of Zhejiang University, ISSN 1673-565X, dated Dec. 2011, Retrieved May 17, 2021, entire document cited.
Magel, Eric E. et al., A Practical Approach to Controlling Rolling Contact Fatigue in Railways, 2005, 8th International Heavy Haul Conference, entire document cited.
PCT IPEA/408 Written Opinion of International Preliminary Examining Authority, PCT/US2021/017025, dated Sept. 9, 2021, entire document cited.
PCT IPEA/408 Written Opinion of International Preliminary Examining Authority, PCT/US21/17029, dated Jul. 30, 2021, entire document cited.
PCT IPEA/408 Written Opinion of International Preliminary Examining Authority, PCT/US21/17032, dated Jul. 30, 2021, entire document cited.
PCT IPEA/409 International Preliminary Report on Patentability Chapter II, PCT/US2021/017025, dated May 13, 2022, entire document cited.
PCT IPEA/409 International Preliminary Report on Patentability Chapter II, PCT/US21/17029, dated May 12, 2022, entire document cited.
PCT IPEA/409 International Preliminary Report on Patentability Chapter II, PCT/US21/17032, dated May 31, 2022, entire document cited.
PCT ISA/210 International Search Report, PCT/US2021/017025, dated Jul. 14, 2021, entire document cited.
PCT ISA/210 International Search Report, PCT/US21/17029, dated Jul. 8, 2021, entire document cited.
PCT ISA/210 International Search Report, PCT/US21/17032, dated May 20, 2021, entire document cited.
PCT ISA/237 Written Opinion of International Searching Authority, PCT/US2021/017025, dated Jul. 14, 2021, entire document cited.
PCT ISA/237 Written Opinion of International Searching Authority, PCT/US21/17029, dated Jul. 8, 2021, entire document cited.
PCT ISA/237 Written Opinion of International Searching Authority, PCT/US21/17032, dated May 20, 2021, entire document cited.

* cited by examiner

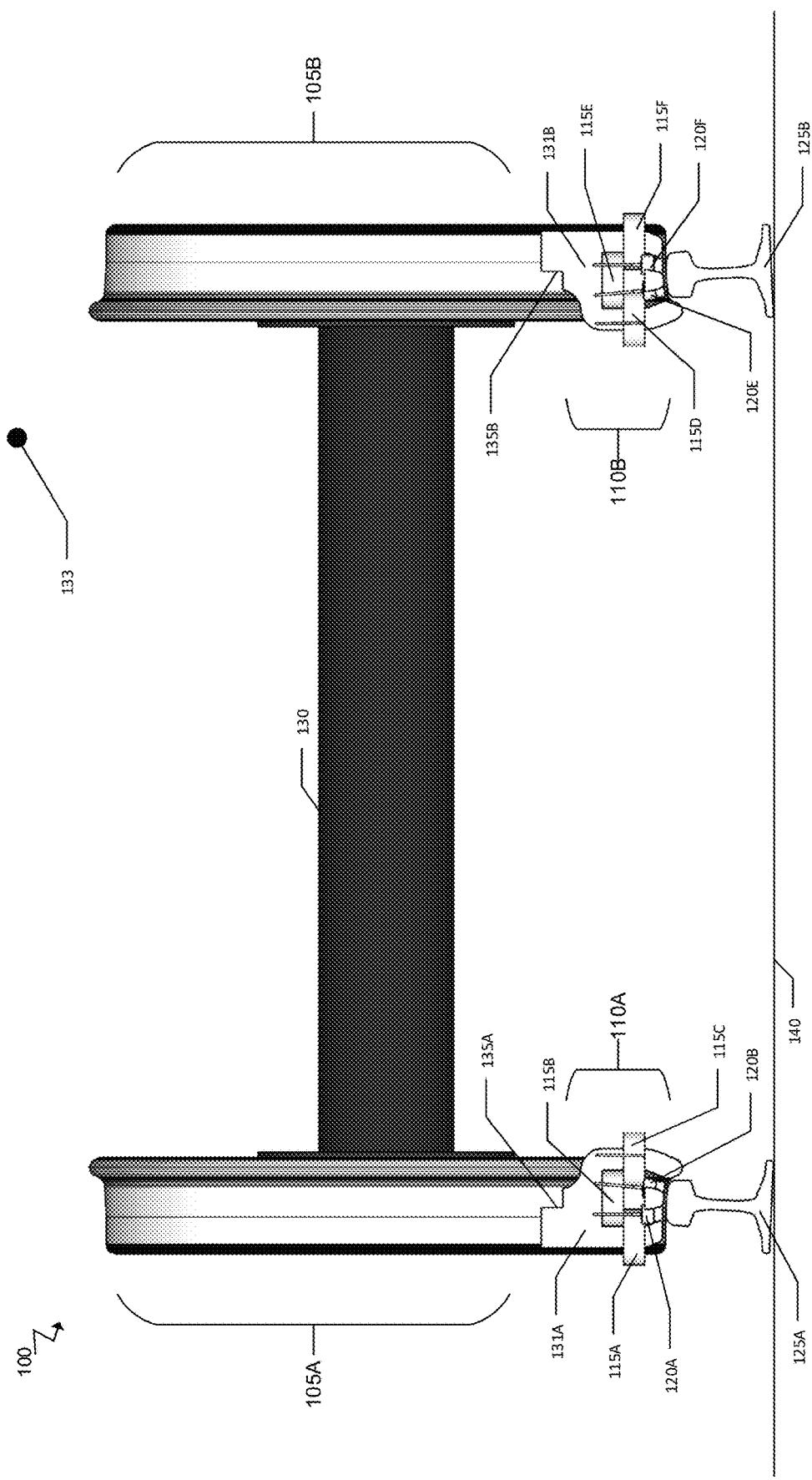

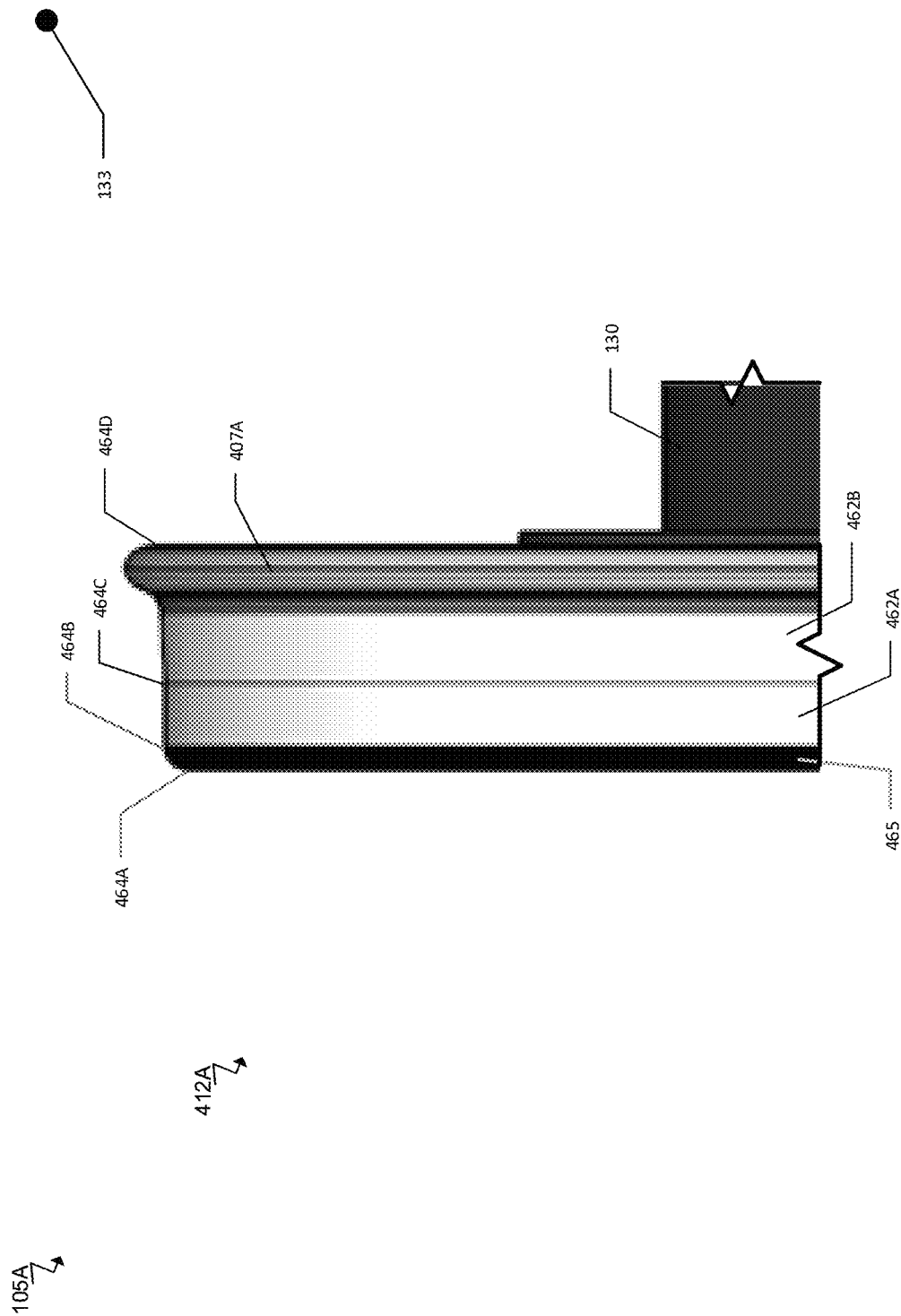

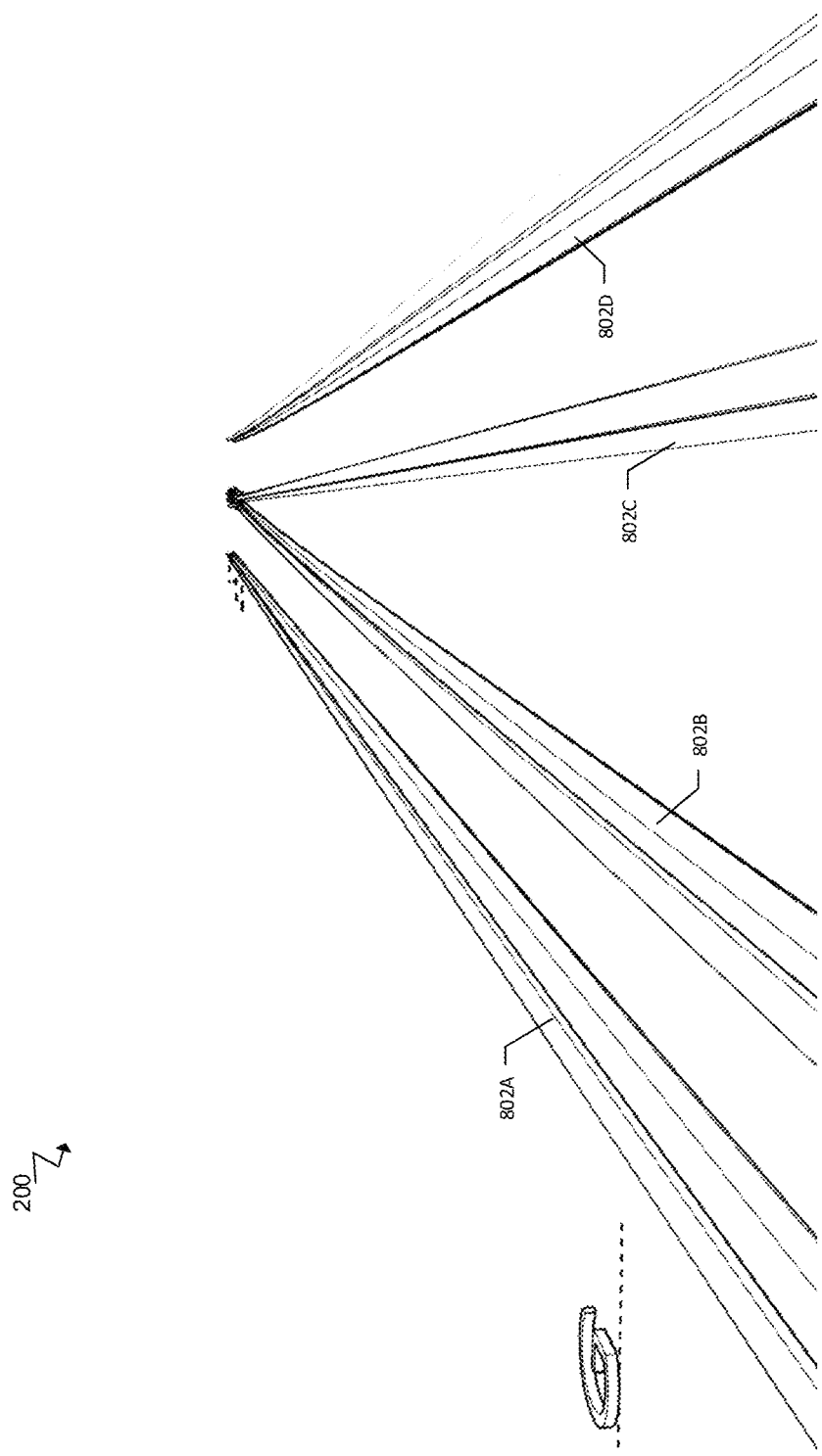

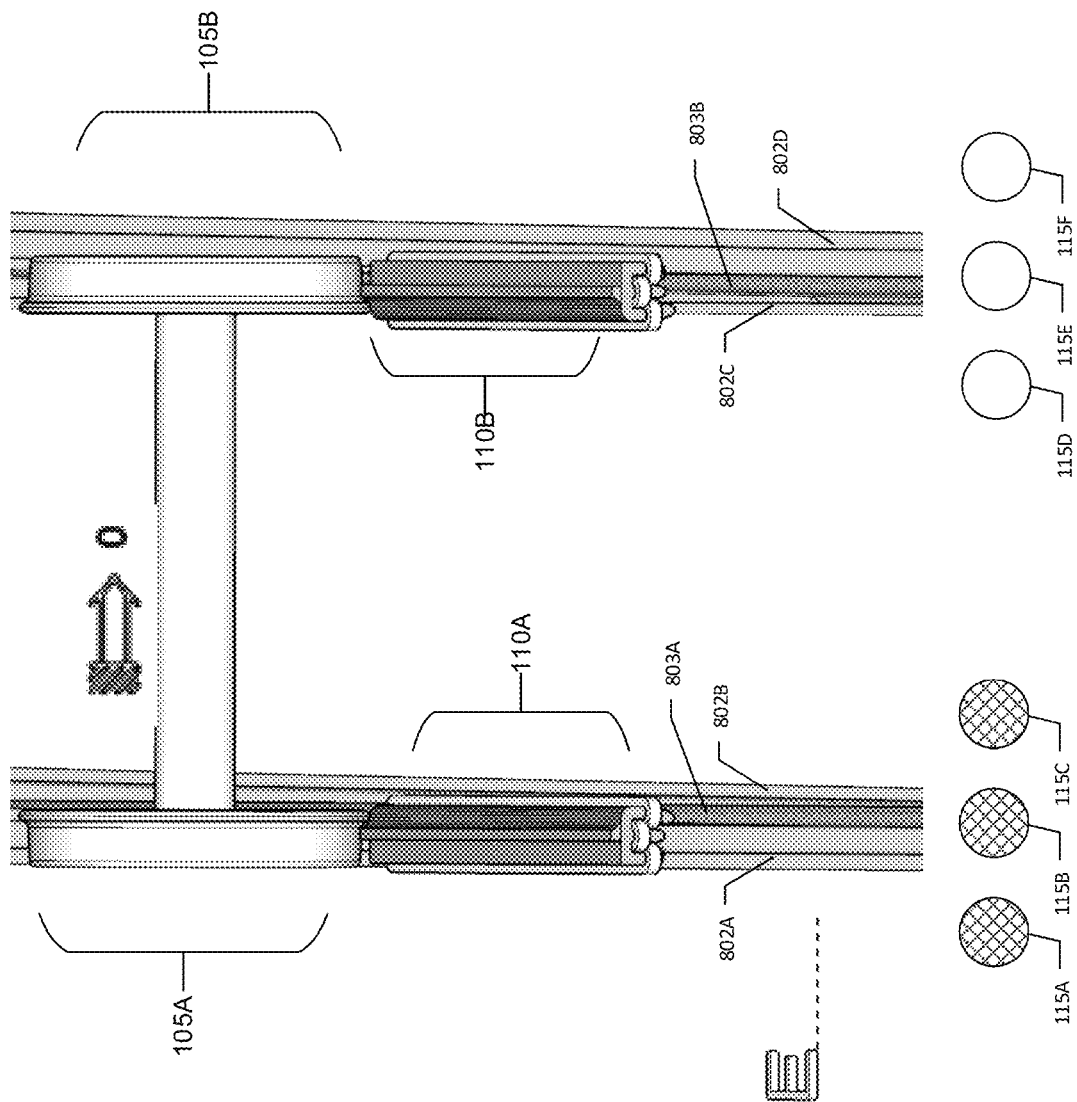

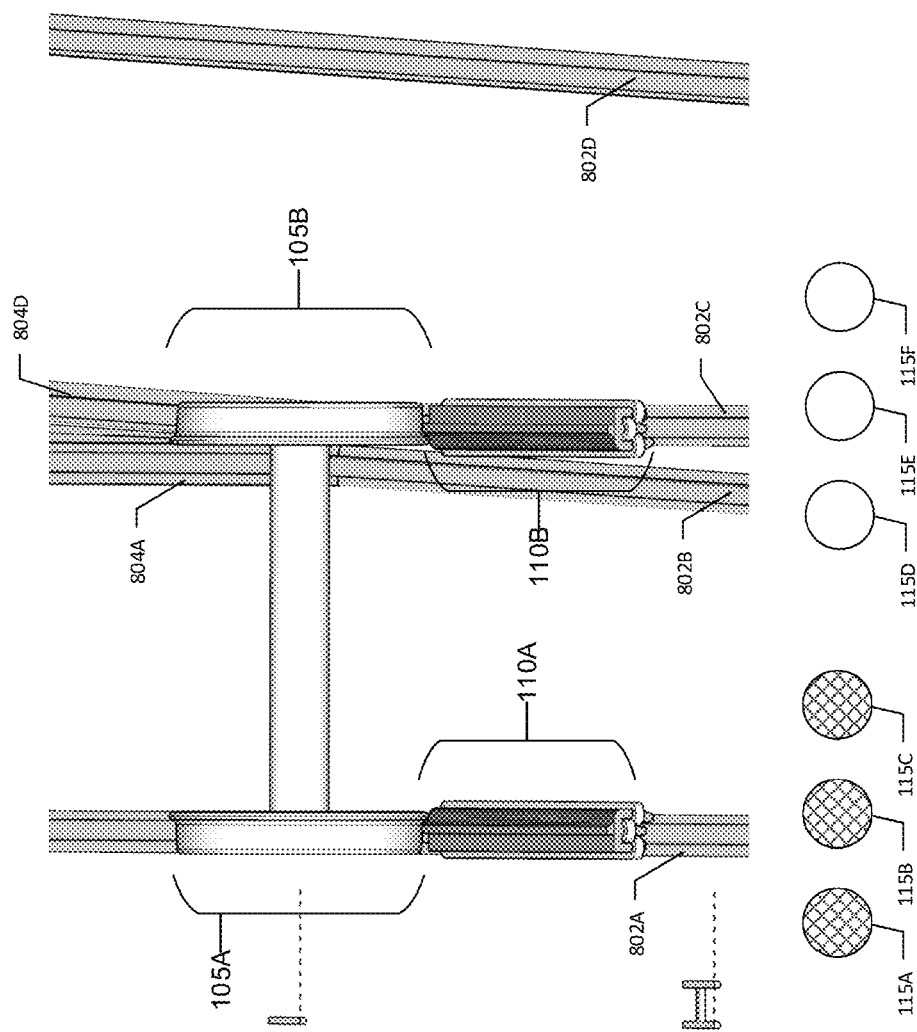

SYSTEM AND METHOD FOR TRAVERSING A NON-MOVING RAIL SWITCH USING ELECTROMAGNETIC ENGINES

CROSS REFERENCE AND PRIORITY TO RELATED APPLICATIONS

This application claims the benefit of priority under 35 USC 119(e) to: U.S. Provisional No. 62/976,128 entitled "Systems and Methods for Guidance Control on Wheeled Bogie," filed on Feb. 13, 2020; U.S. Provisional No. 62/977,692 entitled "Systems and Methods for Guidance Control on Non-Moving Switch," filed on Feb. 17, 2020; U.S. Provisional No. 62/978,293 entitled "Systems and Methods for Inverted Electromagnetic Engine on Wheeled Bogie," filed on Feb. 18, 2020; U.S. Provisional No. 63/028,551 "Systems and Methods for Real-time Track Monitoring," filed on May 21, 2020; U.S. Provisional No. 63/050,751 entitled "Systems and Methods for Rail Inspection Using Eddy Currents," filed on Jul. 11, 2020; U.S. Provisional No. 63/085,119 entitled "System and Method for a Treated Rail for Rolling Stock," filed on Sep. 29, 2020. Further, this application claims priority under 35 USC 371 to PCT Application No. PCT/US21/17029 entitled "System and Method for Traversing a Non-Moving Rail Switch Using Electromagnetic Engines," filed on Feb. 8, 2021. All the aforementioned applications are hereby incorporated by reference in their entirety.

BACKGROUND

Existing railways are predominately utilized by conventional wheeled vehicles moving along metal rails. Many existing rail networks rely on moving switches to divert rolling stock from a straight path to a turnout path. Switches are commonly formed by stock rail and moving point (or switch) blades. The constant movement between the straight path and the turnout path results in significant wear on both the moving parts as well as the non-moving rail. Increased wear results in higher maintenance costs as well as additional risk to property and lives. In some cases, moving switches have trapped people's feet between the point blade and the stock rail, resulting in significant harm and loss of life.

What is needed is a system and method to enable existing bogies to be adapted to operate across non-moving switches such that the aforementioned problems may be reduced or completely eliminated. Further, said system and method provides an ability to laterally traverse an entire wheeled bogie that is in locomotion on a rail.

SUMMARY

A rail assembly may be comprised of a left rail, a left-center rail, wherein the left-center rail has a first grooved profile. The first grooved profile may be disposed proximal to the left rail and configured to transition a first flanged wheel between the left rail and the left-center rail. A right-center rail may have a second grooved profile that is disposed proximal to a right rail and configured to transition a second flanged wheel between the right rail and the right-center rail. The rail assembly may have a right rail and a frog assembly that operatively connects the left-center rail and the right-center rail.

In one aspect, the left rail is substantially parallel to the right-center rail. In another aspect, the left-center rail is substantially parallel to a section of the right rail. In yet another aspect, the right-center rail may be substantially parallel to the left rail. In still another aspect, the right rail may have a substantially straight section and a curved section. The substantially straight section may be physically connected to the right-center rail. The curved section may be physically disconnected from the right-center rail. In one aspect, the left-center rail may be formed from steel being less magnetic than steel from which the left rail is formed; further, the right-center rail may be formed from a steel being less magnetic than steel from which the right rail is formed.

A plurality of electromagnetic engines is also disclosed. In one aspect, the plurality of electromagnetic engines may be configured to be attached to a wheeled bogie assembly that is in turn configured to operate on a plurality of rails. A first electromagnetic engine may have a first coil, a second coil, and a third coil. A second electromagnetic engine may have a fourth coil, a fifth coil, and a sixth coil. The plurality of electromagnetic engines may have a controller coupled therewith and operable to receive a traversal signal that is either a left-traversal signal or a right-traversal signal.

The controller may excite a first plurality of coils, upon receiving the left-traversal signal, where the exciting of the first plurality of coils causes the wheeled bogie assembly to traverse left, in a lateral direction, on top of the plurality of rails. Further, the controller may excite a second plurality of coils, upon receiving the right-traversal signal, where such exciting of the second plurality of coils causes the wheeled bogie assembly to traverse right, in a lateral direction, on top of the plurality of rails. In one aspect, the first plurality of coils may be comprised of the first coil, the second coil, the fourth coil, and the fifth coil. In another aspect, the second plurality of coils comprises the second coil, the third coil, the fifth coil, and the sixth coil.

A method for controlling a plurality of electromagnetic engines is disclosed. The electromagnetic engines may be configured for attachment to a wheeled bogie assembly configured to operate on a plurality of rails. The method may receive a traversal signal, and the traversal signal may either be a left-traversal signal or a right-traversal signal. The method may excite a first plurality of coils, upon receiving the left-traversal signal, and the exciting of the first plurality of coils may cause the wheeled bogie assembly to traverse left, in a lateral direction, on top of the plurality of rails. A second plurality of coils may be excited, upon receiving the right-traversal signal, where the exciting of the second plurality of coils may cause the wheeled bogie assembly to traverse right, in a lateral direction, on top of the plurality of rails. The first plurality of coils may be comprised of the first coil, the second coil, the fourth coil, and the fifth coil. The second plurality of coils may be comprised of the second coil, the third coil, the fifth coil, and the sixth coil. The method may be stored in a computer readable-medium that, when read by a computer, causes the computer to execute the steps of the method by invoking a set of operations. In one aspect, the computer may be an embedded device within an electromagnetic engine. In another aspect, the computer may be a controller likewise embedded.

A plurality of electromagnetic engines may be configured to be attached to a wheeled bogie assembly configured to operate on a rail assembly having a left rail, a left-center rail, a right-center rail, a right rail, and a frog assembly. The plurality of electromagnetic engines may be comprised of a first electromagnetic engine that may have a first plurality of coils. The plurality of electromagnetic engines may have a second electromagnetic engine, where the second electromagnetic engine may have a second plurality of coils. The plurality of electromagnetic engines may have a controller coupled therewith. The controller may receive a first signal and excite, based on the first signal, one or more coils, where the one or more coils may be disposed in the first electromagnetic engine and the second electromagnetic engines. The exciting of the one or more coils may be performed according to a set of power states that define which of the one or more coils are excited.

The one or more coils, when excited, may be excited to a partial power level, which may be less than a full power level. In one aspect, the first signal may be a straight signal to cause the wheeled bogie assembly to proceed straight via the left rail, the right-center rail, the frog assembly, or combination thereof. In another aspect, the first signal may be a turnout signal to cause the wheeled bogie assembly to turnout via the right rail, the left-center rail, and the frog assembly, or combination thereof. In still another aspect, the set of power states may be configured to cause the wheeled bogie assembly to traverse between the left rail and the left-center rail via a first grooved profile section. In yet another aspect, the set of power states may be configured to cause the wheeled bogie assembly to traverse between the right rail and the right-center rail via a second grooved profile section.

A method is disclosed for controlling a first electromagnetic engine and a second electromagnetic engine, both of which being configured to be attached to a wheeled bogie assembly configured to operate on a rail assembly having a left rail, a left-center rail, a right-center rail, a right rail, and a frog assembly. The method may receive a first signal and determine a set of power states configured to cause the first electromagnetic engine and the second electromagnetic engine to excite one or more coils, the exciting resulting in electromagnetic force operable to cause the attached wheeled bogie to traverse laterally across a first plurality of rails. The method may further excite, based on the first signal, the one or more coils, based on a set of power states which define which of the one or more coils are excited.

In one aspect, the one or more coils, when excited, are excited to a partial power level that is less than a full power level. In another aspect, the first signal is a straight signal that may cause the wheeled bogie assembly to proceed straight via the left rail, the right-center rail, the frog assembly, or combination thereof. In still another aspect, the first signal may be a turnout signal that causes the wheeled bogie assembly to turnout via the right rail, the left-center rail, and the frog assembly, or combination thereof. The set of power states may be configured to cause the wheeled bogie assembly to traverse between the left rail and the left-center rail via a first grooved profile section. Further, the set of power states may be configured to cause the wheeled bogie assembly to traverse between the right rail and the right-center rail via a second grooved profile section. The method may be stored in a computer readable-medium that when read by a computer cause the computer to execute the steps of the method by invoking a set of operations. In one aspect, the computer may be an embedded device operatively coupled to the electromagnetic engine.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

FIG. 1A illustrates a planar view of a wheeled bogie assembly, shown from a front perspective.
FIG. 1G illustrates a planar view of a wheel assembly, as shown from a front perspective.
FIG. 2G illustrates a perspective view of a rail assembly.
FIG. 4E illustrates a perspective view of a bogie assembly positioned on a rail assembly.

FIG. 4H illustrates a perspective view of a bogie assembly positioned on a rail assembly.

FIG. 6I illustrates a perspective view of a bogie assembly positioned on a rail assembly.

DETAILED DESCRIPTION

Figure 1B:
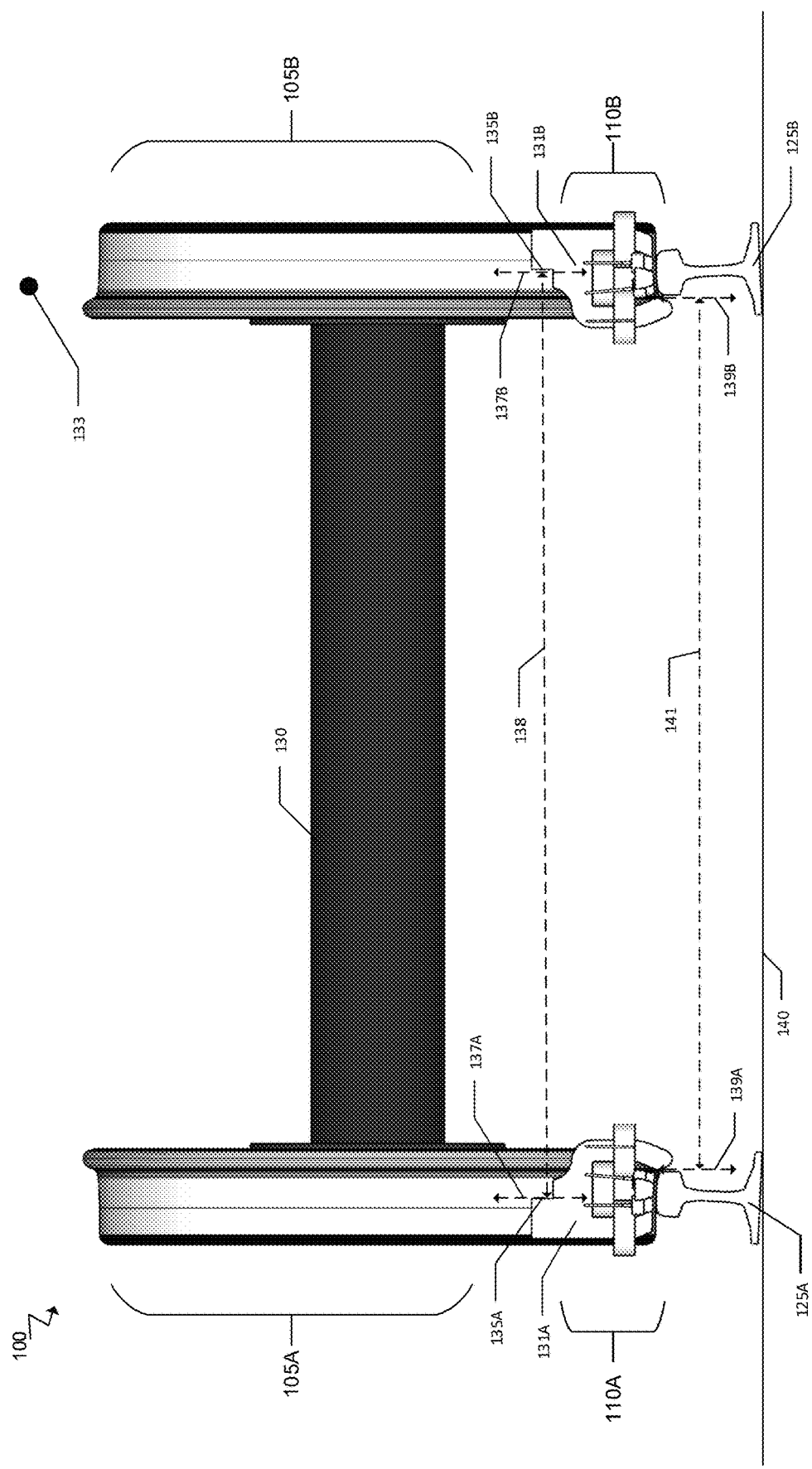
FIG. 1B illustrates a planar view of a wheeled bogie assembly, shown from a front perspective.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Moving track switches are mechanical sections of rail that provide for railway vehicles to switch tracks. Given the mechanical nature of moving track switches, failure is common. Further, maintenance costs are high and often exceed the cost of servicing a comparable section of non-movable track. As the complexity of routes increases with more railway traffic, more and more moving track switches will appear in the industry, thus increasing both safety risks and economic costs.

The solution to the aforementioned problems is a non-moving rail switch operable for traversal by an electromagnetic guidance system based on electromagnetic engines that are integrated into existing, conventional bogie designs. The non-moving aspect of the rail switch provides for lower maintenance costs, lower part-related costs, lower assembly costs, and increased safety.

FIG. 1A illustrates a planar view of a wheeled bogie assembly 100, shown from a front perspective. The wheeled bogie assembly 100 comprises an axle 130, a first wheel assembly 105A, a second wheel assembly 105B, a first electromagnetic engine 110A, and a second electromagnetic engine 110B. The wheeled bogie assembly 100 may be positioned on a first rail 125A and a second rail 125B. In one aspect, the rails 125A, 125B may be a standard-gauge railway with a track gauge of 1,435 mm, often referred to as the Stephenson gauge. As shown, the rails 125A, 125B are flat-bottom rails which are commonly used in the United States. One of skill in the art will appreciate that other rail profiles may be utilized and be similarly operable for travel with the wheel assemblies 105A, 105B, including those substantially connected to the electromagnetic engines 110A, 110B. The rails 125A, 125B may be disposed on a rail support 140 (e.g., the ground).

A direction of travel ray 133 is depicted as a dot because the wheeled bogie assembly 100 is traveling toward the viewer. The ray 133 shall be used throughout this disclosure to enable the viewer to determine the direction of travel and orientation of the figures. When a dot is utilized herein for the ray 133, the wheeled bogie assembly 100 is traveling toward the viewer unless otherwise noted.

The first electromagnetic engine 110A and the second electromagnetic engine 110B may be disposed in front of the wheel assemblies 105A, 105B, respectively. The electromagnetic engines 110A, 110B may however be similarly disposed behind the wheel assemblies 105A, 105B, depending on commercial need, design considerations, operating environments, etc. Further, a bogie typically has a plurality of wheelsets; therefore, the electromagnetic engines 110A, 110B may be distributed between several wheelsets (including before and after the wheelsets). For clarity, one wheelset is shown in the instant figure. In one aspect, the electromagnetic engines 110A, 110B may be disposed on the locomotive and/or on the rear car in order to save deployment costs i.e., one to two points of guidance may be sufficient for some commercial applications.

The electromagnetic engine 110A comprises a steel core 131A with three prongs. The steel core 131A has an outer electromagnetic coil 115A, a center electromagnetic coil 115B, and an inner electromagnetic coil 115C. The center prong of the steel core 131A separates the coils 115A, 115C. The coil 115B is disposed higher than the coils 115A, 115C. Further, the coil 115B partially overlaps with the coils 115A, 115C, where the overlap is the result of the coil 115B being disposed higher. As shown in the instant figure, the overlap of the coil 115B is approximately one-third the width (or diameter) of the coil 115A as measured from the outer edge of the coil 115B. Likewise, the coil 115B is overlapping with the coil 115C by approximately one-third the width (or diameter) of the coil 115B. One of skill in the art will appreciate that the overlap may vary slightly without deviating from the intended purpose of the coils 115A, 115B, 115C. In a similar manner to the electromagnetic engine 110A, the electromagnetic engine 110B may have a steel core 131B with an inner coil 115D, a center coil 115E, and an outer coil 115F. One of skill in the art will appreciate that the coils 115D, 115E, 115F are configured according to the symmetry of the bogie assembly 100.

In an alternative embodiment, the electromagnetic engine 110A may be comprised of the coils 115A, 115C, disposed on steel core 131A. Likewise, the electromagnetic engine 110B may be comprised of the coils 115D, 115F, disposed on the steel core 131B. Such an alternative embodiment may enable use of a two-coil design, respectively for each of the electromagnetic engines 110A, 110B.

The coils 115A, 115B, 115C, 115D, 115E, 115F provide an excitation source to generate an electromagnetic field at a certain frequency. This frequency may be zero if it is desired, such that the electromagnetic engines 110A, 110B produce a constant field. Further, the electromagnetic engines 110A, 110B may be moved by the wheeled bogie assembly 100, such that the electromagnetic field is caused to move as well. Such a moving electromagnetic field may further be described as having a frequency as a result of such movement. Such an electromagnetic field may permeate the rails 125A, 125B, as governed by the laws of electromagnetism. The depth of electromagnetic field permeation is a function of the frequency of the field, the permeability of the material, and the conductivity of the material.

The electromagnetic engine 110A further comprises a first electromagnetic sensor 120A, a second electromagnetic sensor 120B, and a third electromagnetic sensor 120C (obstructed in the instant view). The electromagnetic sensors 120A, 120B, 120C are generally operable to detect the presence and strength of magnetic fields and fluxes, which may further be used to estimate magnetic forces. In one aspect, the detected magnetic force may be the result of generated electromagnetic force resulting from the excitement of the electromagnetic coils 115A, 115B, 115C.

The electromagnetic sensors 120A, 120B, 120C may take many implementations in the commercial deployment of the electromagnetic engine 110A. In one aspect, the electromagnetic sensors 120A, 120B, 120C may be implemented using electromagnetic coils, which provide the advantage of being relatively elegant in design. In another aspect, Hall-effect elements may be utilized as the electromagnetic sensors 120A, 120B, 120C. Hall-effect elements provide the advantage of relatively precise areas of measurement. In yet another aspect, the electromagnetic sensors 120A, 120B, 120C may be implemented using magneto-resistive devices. Each of the various implementations of the electromagnetic sensors 120A, 120B, 120C have advantages and disadvantages, all of which one of skill in the art will balance given the intended commercial deployment.

In one aspect, the sensors 120A, 120B, 120C may be individual computing devices capable of measuring, storing, and processing real-world measurements. In another aspect, the sensors 120A, 120B, 120C may be connected to a computer operable to measure, store, and process the real-world measurements observed by the sensors 120A, 120B, 120C.

The electromagnetic engine 110B comprises a steel core 131B with three prongs. The steel core 131B has an inner electromagnetic coil 115D, a center electromagnetic coil 115E, and an outer electromagnetic coil 115F. The coils 115D, 115E, 115F are substantially similar to the coils 115A, 115B, 115C. The electromagnetic engine 110B further comprises a first electromagnetic sensor 120D (obstructed in the instant view), a second electromagnetic sensor 120E, and a third electromagnetic sensor 120F. The sensors 120D, 120E, 120F may be substantially similar to the sensors 120A, 120B, 120C.

One of skill in the art will appreciate that the second electromagnetic engine 110B is a symmetrical instance of the first electromagnetic engine 110A, with a difference being that the electromagnetic engine 110B is configured for the rail 125B. One of skill in the art will further appreciate that the electromagnetic engines 110A, 110B may or may not be disposed in parallel. Therefore, in one aspect, either one of the electromagnetic engines 110A, 110B may not be present in the wheeled bogie assembly 100.

A surface 135A may be present on the steel core 131A. Likewise, a surface 135B may be present on the steel core 131B. The surfaces 135A, 135B are generally operable to provide a calibrated distance between the electromagnetic engines 110A, 110B. In one aspect, the calibrated distance may be utilized to generate a signature related to a substantially ideal track gauge.

FIG. 1B illustrates a planar view of the wheeled bogie assembly 100, shown from a front perspective. The surfaces 135A, 135B are separated by a distance 138 defined by a left axis 137A and a right axis 137B. The distance 138 is generally utilized as a calibration means to detect deviations from a nominal distance between the rails 125A, 125B. For instance, the track gauge may be 1,435 mm. In operation, the distance 138 may be utilized in conjunction with the electromagnetic engines 110A, 110B to identify deviations from the nominal track gauge.

The distance 138 may be determined by operating the wheeled bogie assembly 100 over a segment of track that is substantially machined to be at or near the nominal distance desired (e.g., 1,435 mm). In the instant figure, a distance 141 is bounded by a left axis 139A and a right axis 139B. The distance 141 may be at or near the nominal distance of the track gauge. As stated, the distance 138 between the electromagnetic engines 110A, 110B may be utilized to determine deviations from the distance 141 as measured by the electromagnetic engines 110A, 110B. The distances 138, 141 may have some deviation from ideal distances, and such deviations may be accounted for by the electromagnetic engines 110A, 110B when deployed in commercial use.

Figure 1C:
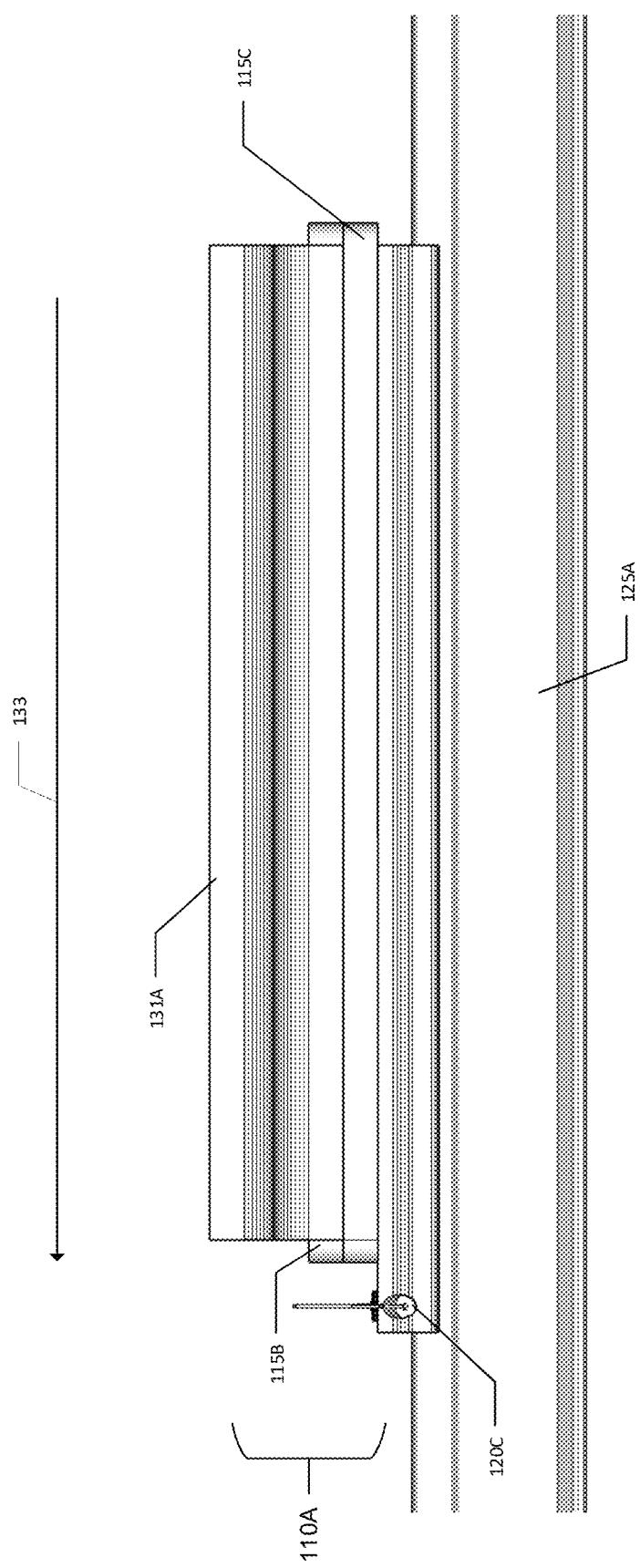
FIG. 1C illustrates a planar view of an electromagnetic engine, shown from a side perspective.

FIG. 1C illustrates a planar view of the electromagnetic engine 110A, shown from a side perspective. The electromagnetic sensor 120C is shown without obstruction in the instant figure. One of skill in the art will appreciate that the wheeled bogie assembly 100, in operation, would be traveling along the ray 133.

Figure 1D:
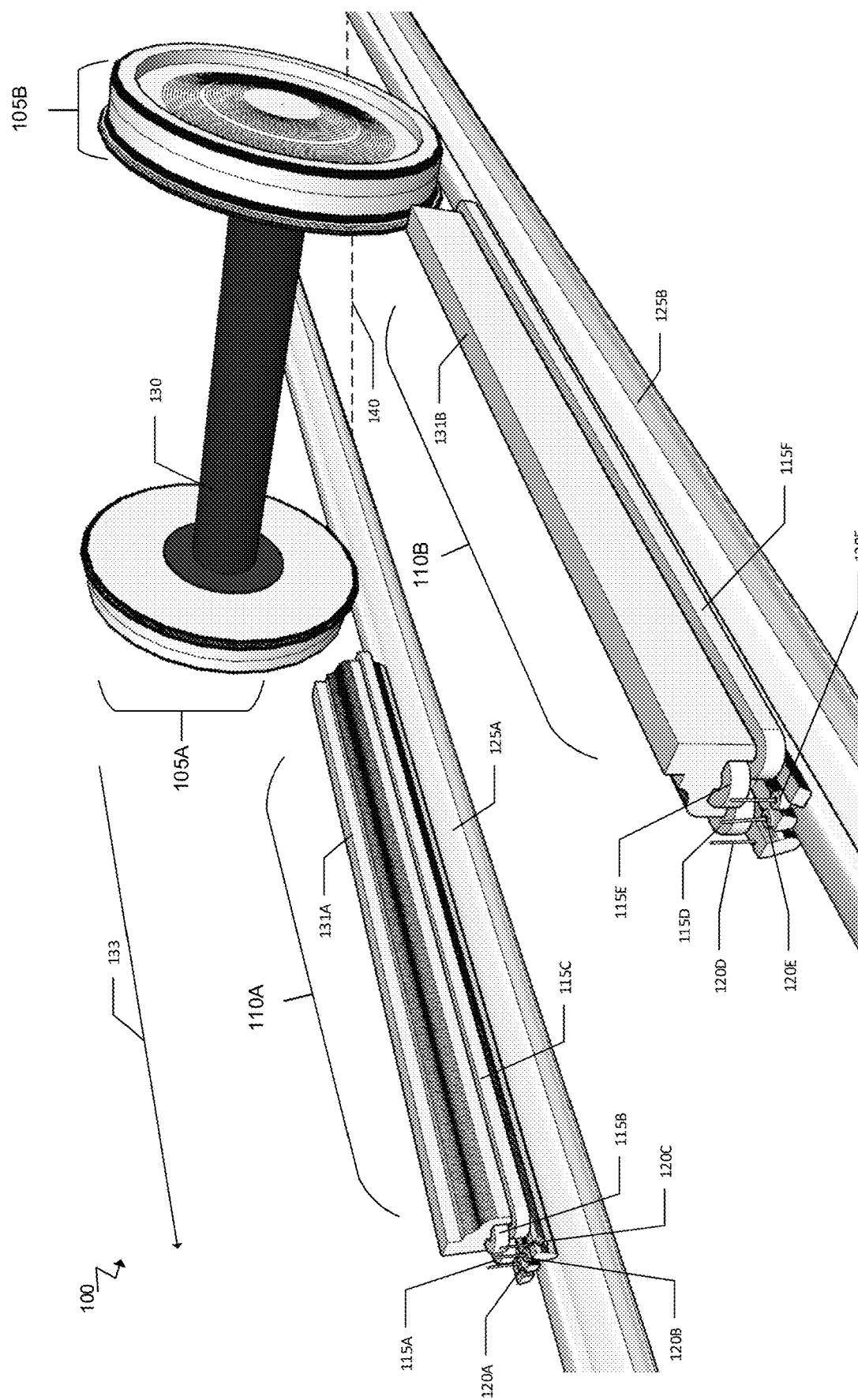
FIG. 1D illustrates a three-quarter perspective of a wheeled bogie assembly, as shown from a front perspective.

FIG. 1D illustrates a three-quarter perspective of the wheeled bogie assembly 100, as shown from a front perspective. One of skill in the art will appreciate that the wheeled bogie assembly 100 in operation would be traveling along the ray 133. In one aspect, the instant figure provides an example of a segment of track operable to generate a signature of ideal and/or desired conditions of track deployed in normal commercial use. Such ideal track segments may be calibrated and configured using methods and means not generally available in fielded track segments.

Figure 1E:
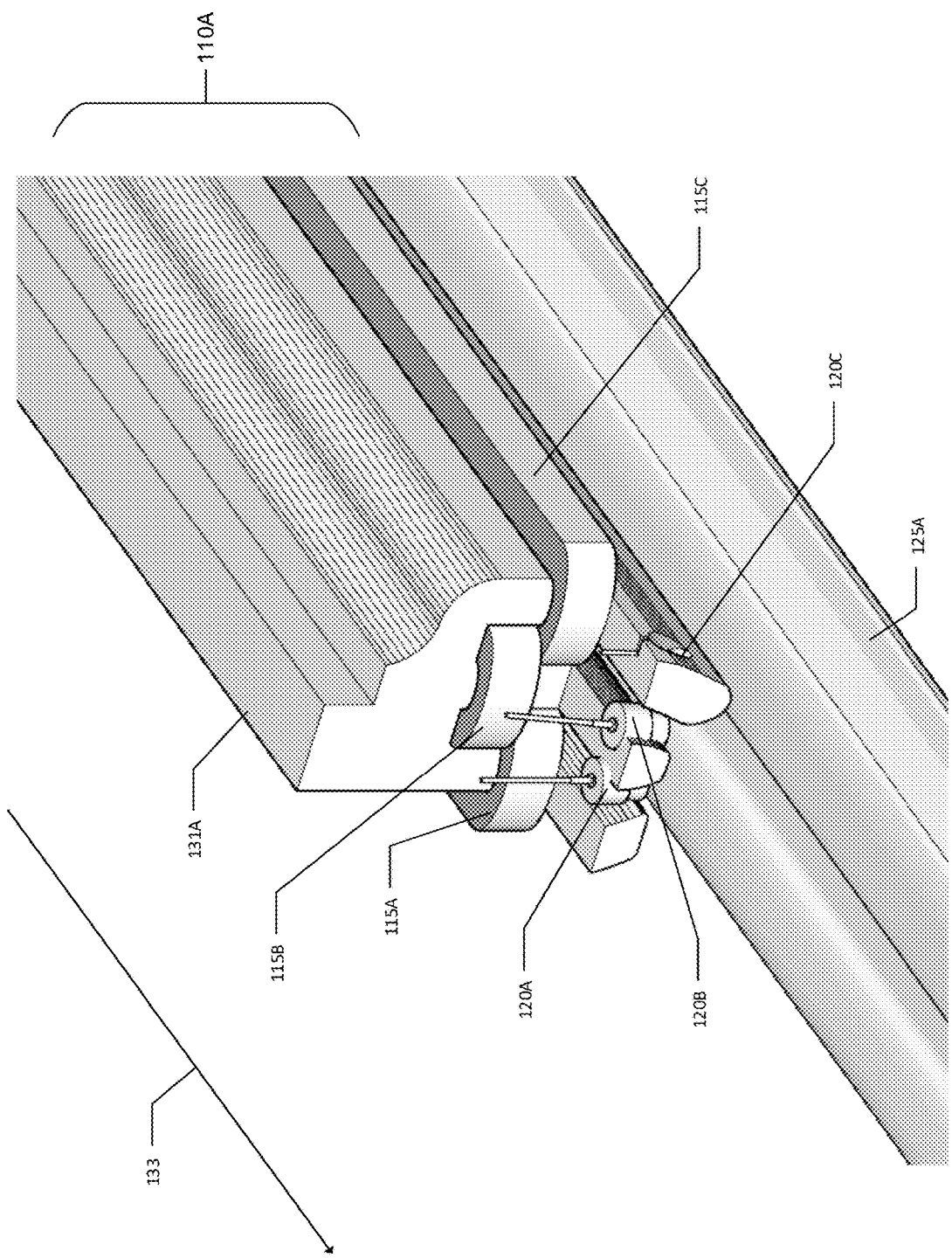
FIG. 1E illustrates a three-quarter perspective of an electromagnetic engine, as shown from a front perspective.

FIG. 1E illustrates a three-quarter perspective of the electromagnetic engine 110A, as shown from a front perspective. One of skill in the art will appreciate that the wheeled bogie assembly 100 in operation would be traveling along the ray 133.

Figure 1F:
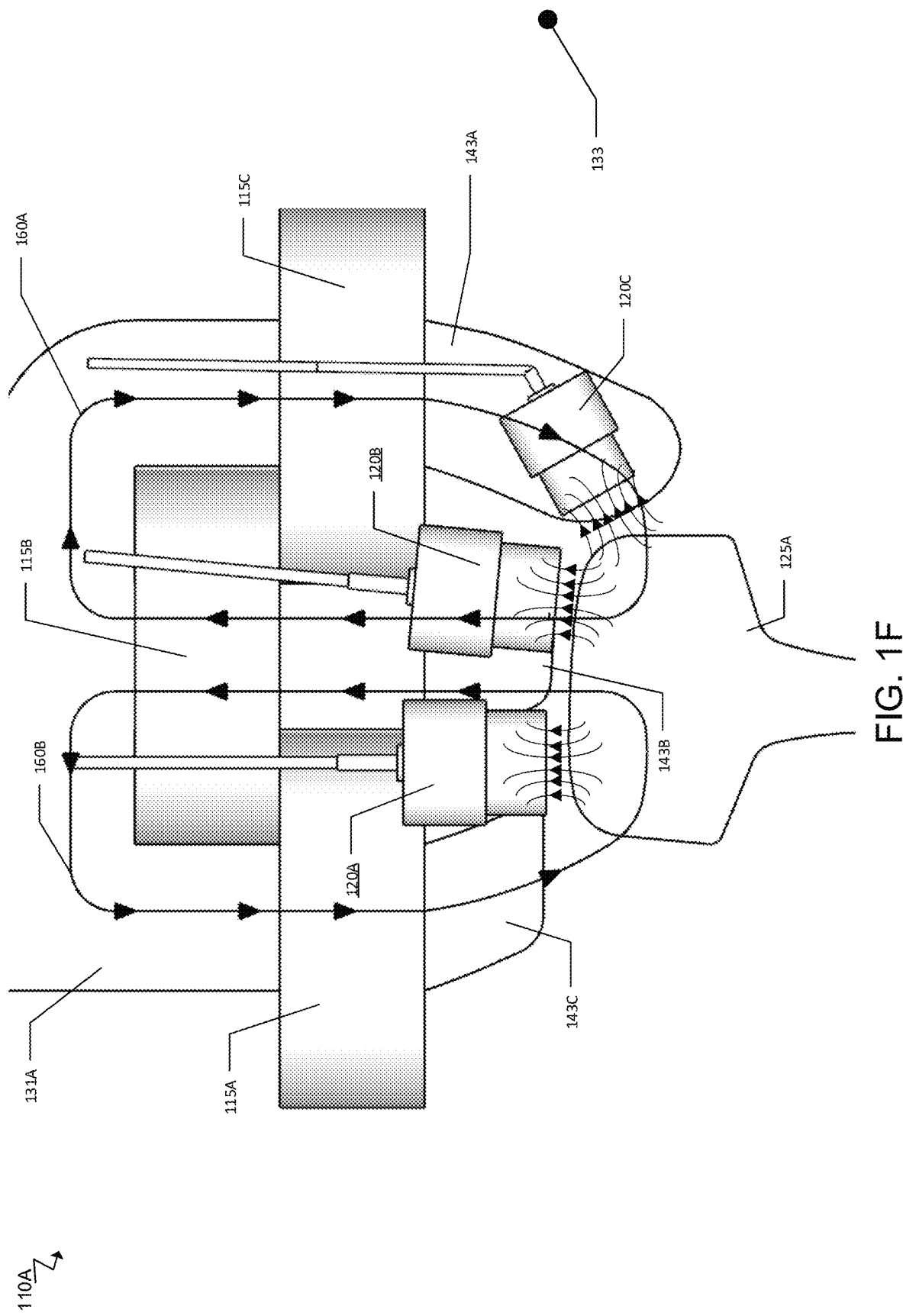
FIG. 1F illustrates a planar view of an electromagnetic engine, as shown from a front perspective.

FIG. 1F illustrates a planar view of the electromagnetic engine 110A, as shown from a front perspective. The steel core 131A comprises an inner prong 143A, a center prong 143B, and an outer prong 143C. The coils 115A, 115B, 115C may be disposed around an outer prong 143A, a center prong 143B, and an inner prong 143C, respectively. The inner prong 143A curves slightly toward the rail 125A to increase inner attractive force 160A which is reacted by the rail 125A. The inner attractive force 160A is generated by the prongs 143A, 143B when the coils 115B, 115C are excited.

The outer prong 143C is curved toward the head of the rail 125A. Similar to the prong 143A, the orientation of the prong 143C enables an outer magnetic force 160B to travel through the prongs 143B, 143C. Further, such orientation provides stronger electromagnetic force interaction while still following the profile of the wheel flange in the wheel assemblies 105A, 105B. The outer magnetic force 160B is generated by the prongs 143B, 143C as created by the coils 115A, 115B.

The air gap between the rail 125A and the electromagnetic engine 110A is shown in the instant figure with more detail. One of skill in the art will appreciate the lack of physical contact between the rail 125A and the prongs 143A, 143B, 143C. One of skill in the art will further appreciate from the instant figure that the magnetic forces 160A, 160B represent flux produced by excitation of the coils 115A, 115B, 115C. Hence the flux is understood to flow substantially in a loop comprising at least two of the prongs in the electromagnetic engine 110A.

FIG. 1G illustrates a planar view of the wheel assembly 105A, as shown from a front perspective. A wheel 412A has a flange 407A on the outboard side.

The wheel 412A is formed with a cylindrical section 462A and a conical section 462B. The cylindrical section 462A is defined between a diameter 464B and a diameter 464C. The cylindrical section 462A is substantially flat between the diameters 464B, 464C. The cylindrical section 462A may have a shrinking diameter 465, that leads to an outer diameter 464A on the field side of the wheel 412A. The conical section 462B is positioned between the diameter 464C and a diameter 464D. One of skill in the art will appreciate that the wheel assemblies 105A, 105B are substantially similar with respect to the design disclosed in the instant figure.

Figure 2A:
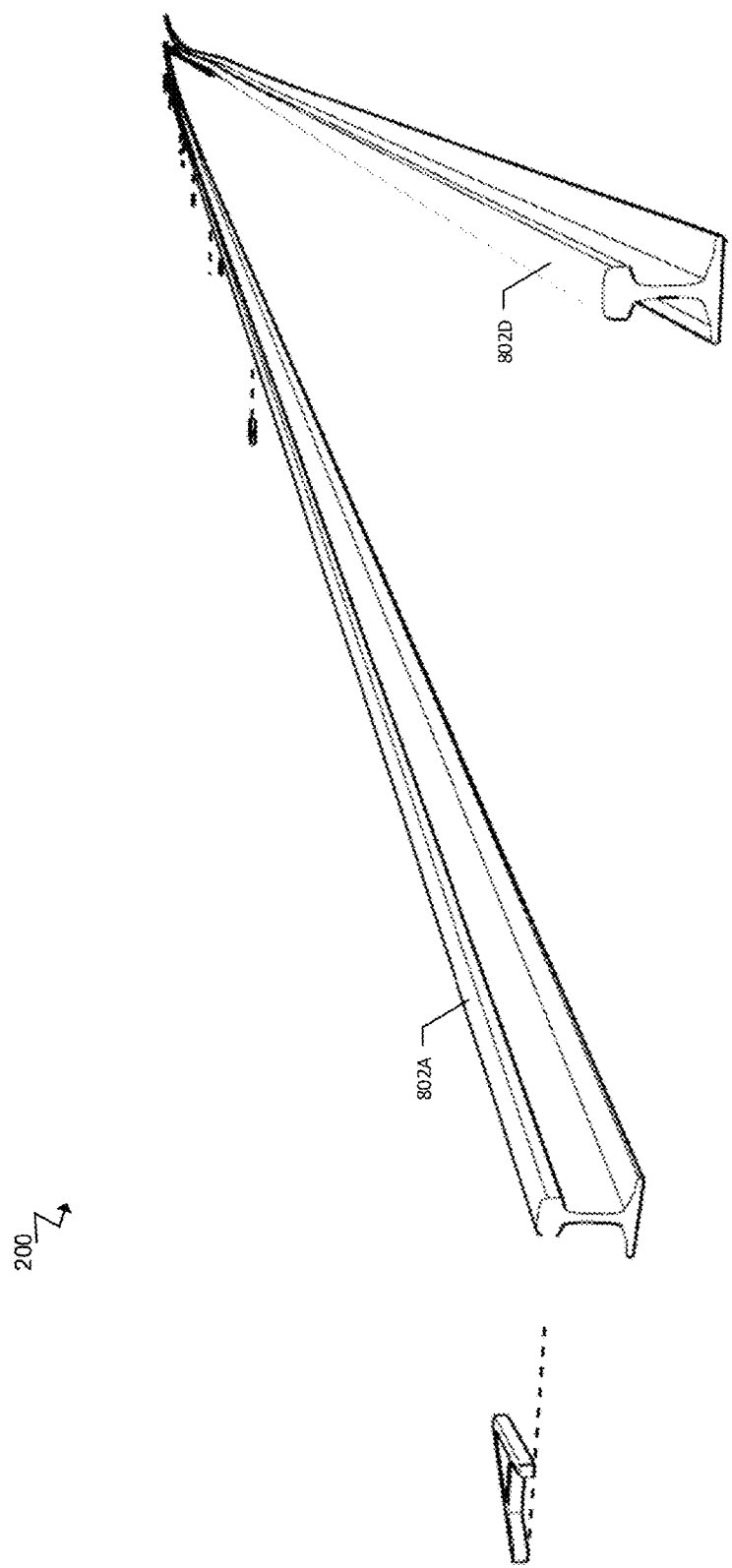
FIG. 2A illustrates a perspective view of a rail assembly.

FIG. 2A illustrates a perspective view of a rail assembly 200. The rail assembly 200 is comprised of a left rail 802A, a right rail 802D, both of which are standard profile geometry and are made of steel. In one aspect, the steel grade may have elevated magnetic permeability and/or elevated magnetic resistivity when compared with existing grades of steel in commercial use by the rail industry today. For the purposes of the disclosure herein, some rails may be considered to be fully operable for bidirectional magnetic force interaction while some other rails described herein may be partially operable for bidirectional magnetic force interaction. One of skill in the art will appreciate that other materials may provide for weaker and/or stronger magnetic force interaction as required by commercial deployment of the instant solution.

The instant figure contains a reference marker on the left side of the left rail 802A (e.g., Reference A). FIG. 2A through FIG. 2I contain similar reference marks, specifically Reference A through Reference J. The reference markers Reference A through Reference J shall be used in FIG. 2A through FIG. 6I. One of skill in the art will appreciate the correlation of the reference markers Reference A through Reference J as presented in the various views and description provided herein.

The rail assembly 200 may be referred to as a "non-moving switch." The term "non-moving switch" is technical rather than literal and refers to the switch not having a traditional, mechanical switch between tracks. The rail assembly 200 provides a means by which the bogie assembly 100 may traverse from one track to another. Traditionally, such track changes required a moving switch that is physically moved to guide the bogie assembly 100 from a first track toward an alternate track (e.g., a straight section to a turnout section). By use of the processes that are disclosed herein and related to the electromagnetic engines 110A, 110B, the bogie assembly 100 may "switch" from one track to another without requiring a traditional moving rail switch. One of skill in the art will appreciate that the processes provided herein will reduce the cost of rail maintenance because moving parts require more attention and are more prone to failure. Further, existing moving switches introduce safety risks for humans. For example, a moving switch is unlikely to be placed within a traditional road for trolley service because feet may be trapped within moving switches. The instant non-moving switch provides new opportunities for switch deployment.

Figure 2B:
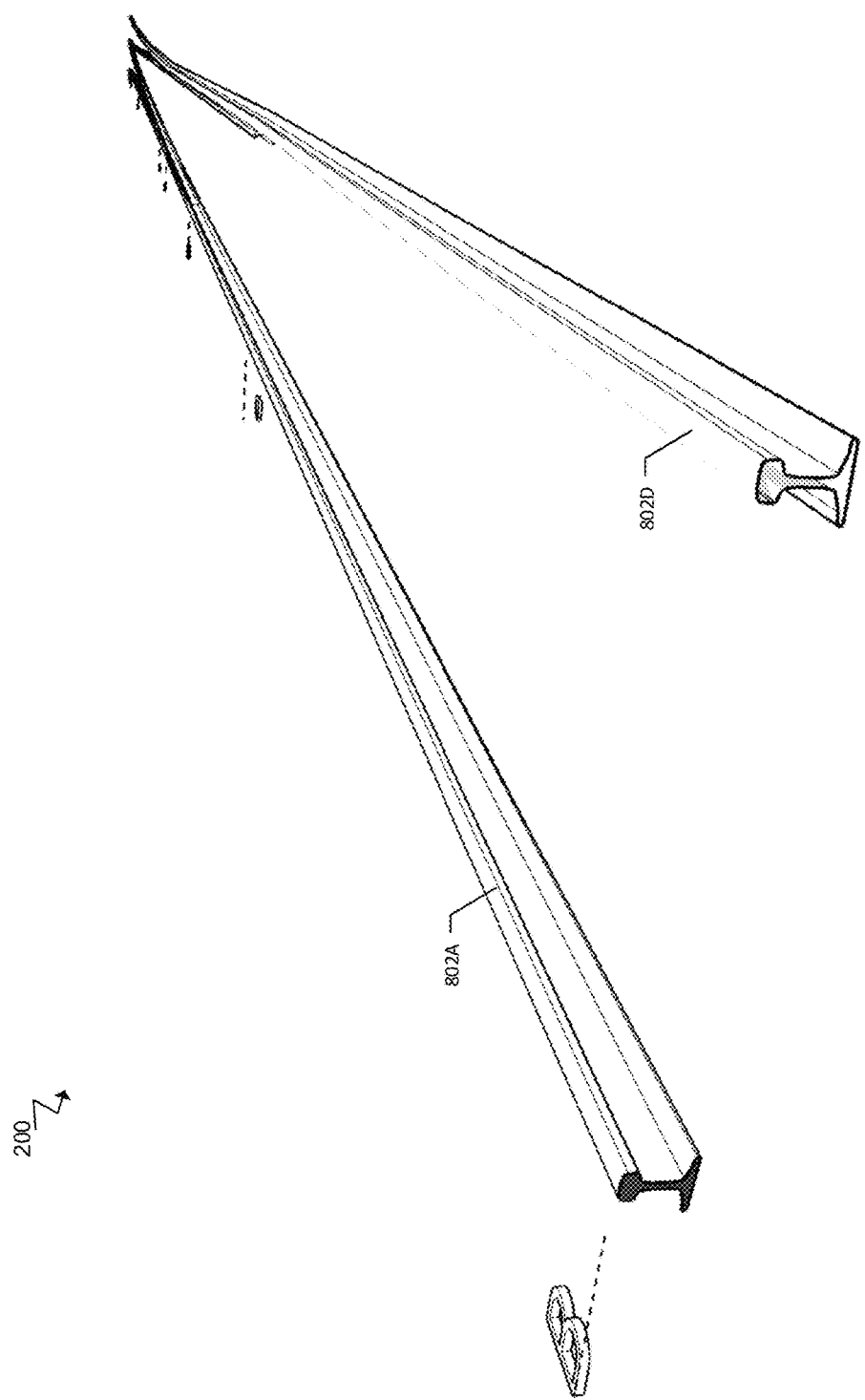
FIG. 2B illustrates a perspective view of a rail assembly.

FIG. 2B illustrates a perspective view of the rail assembly 200. The instant figure shows the left rail 802A and the right rail 802D.

Figure 2C:
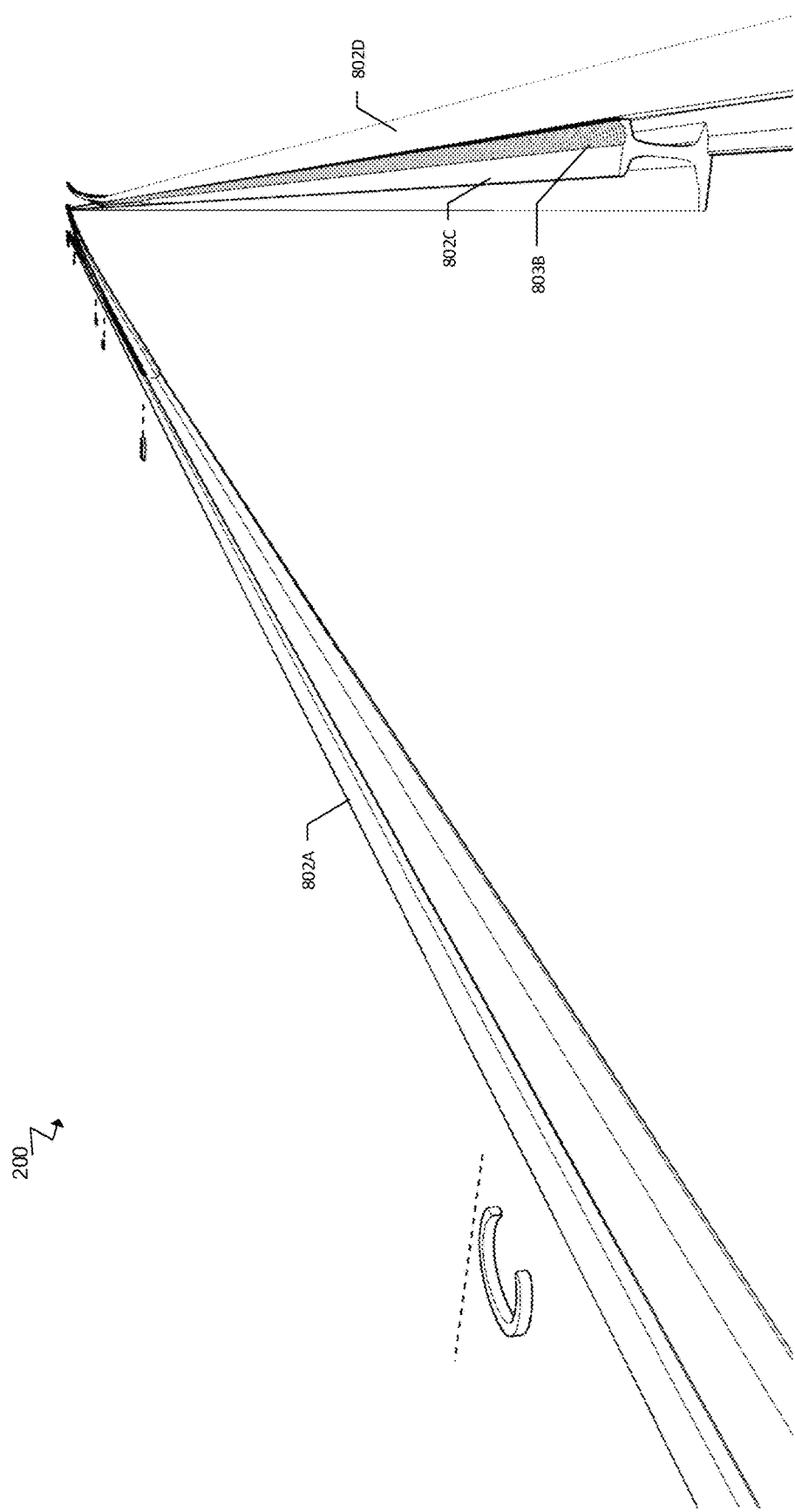
FIG. 2C illustrates a perspective view of a rail assembly.

FIG. 2C illustrates a perspective view of the rail assembly 200. The instant figure shows the left rail 802A and the right rail 802D. A right-center rail 802C is shown in the instant figure and disposed next to the right rail 802D. The right-center rail 802C is partially operable for bidirectional magnetic force interaction. In one aspect, the right-center rail 802C is made of less-magnetic steel than the steel utilized in the rails 802A, 802D. A grooved profile 803A may be present within the right-center rail 802C and shall be discussed herein.

Figure 2D:
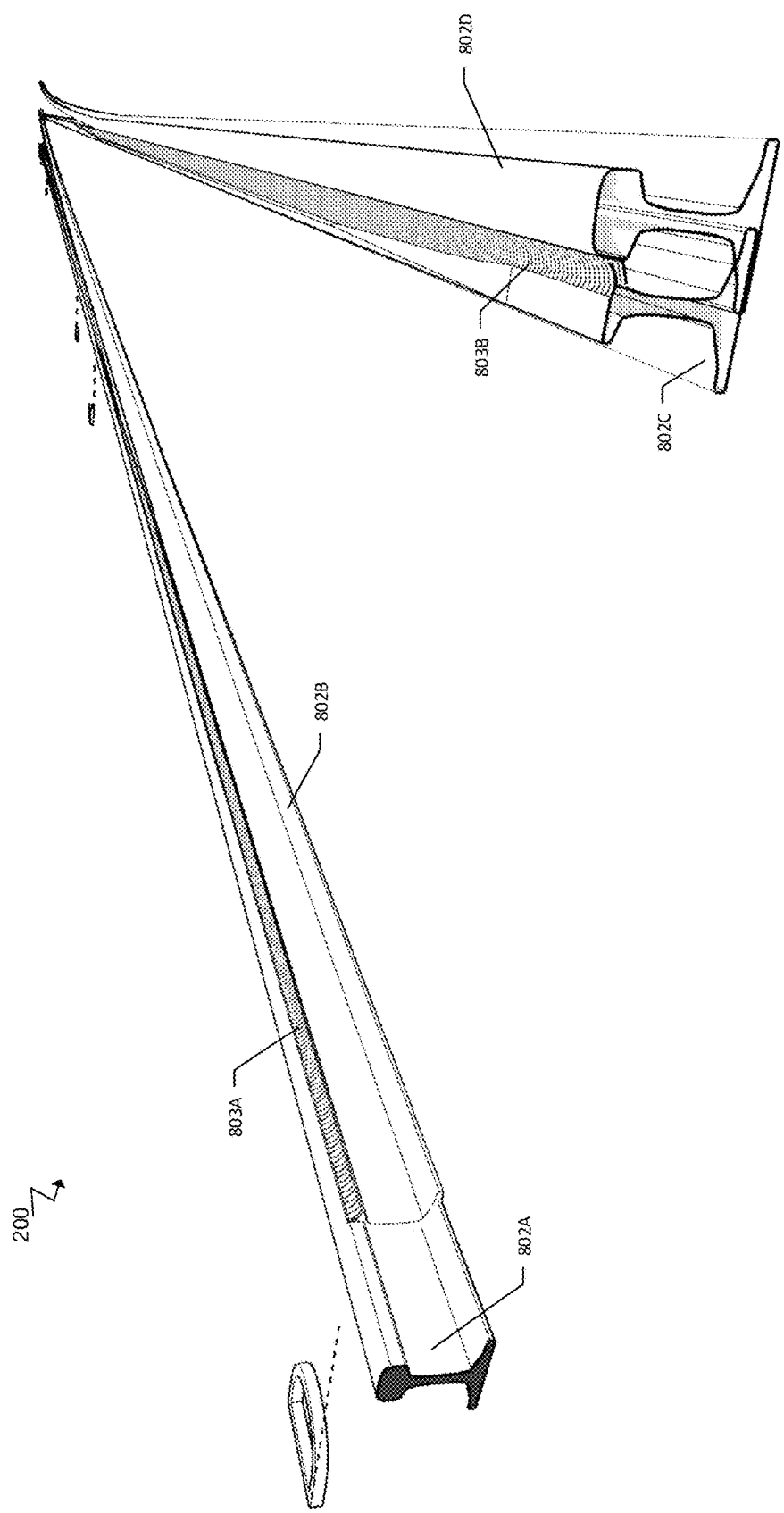
FIG. 2D illustrates a perspective view of a rail assembly.

FIG. 2D illustrates a perspective view of the rail assembly 200. The instant figure shows the rails 802A, 802B, 802C, 802D. A left-center rail 802B is shown in the instant figure and disposed next to the left rail 802A. In one aspect, the left-center rail 802B may comprise a less-magnetic steel than the steel utilized in the rails 802A, 802D. In another aspect, the right-center rail 802C may comprise a less-magnetic steel than the steel utilized in the rails 802A, 802D. In one aspect, the steel used in both the rails 802B, 802C are substantially similar. The grooved profile 803A and a grooved profile 803B provide a dividing entry to an oncoming wheel to force the wheel and trailing wheels to one side or the other. In one aspect, the grooved profiles 803A, 803B may provide protection against potential derailment events. One of skill in the art will appreciate that the groove width is substantially related to the width of the flanges in the wheel assemblies 105A, 105B.

Figure 2E:
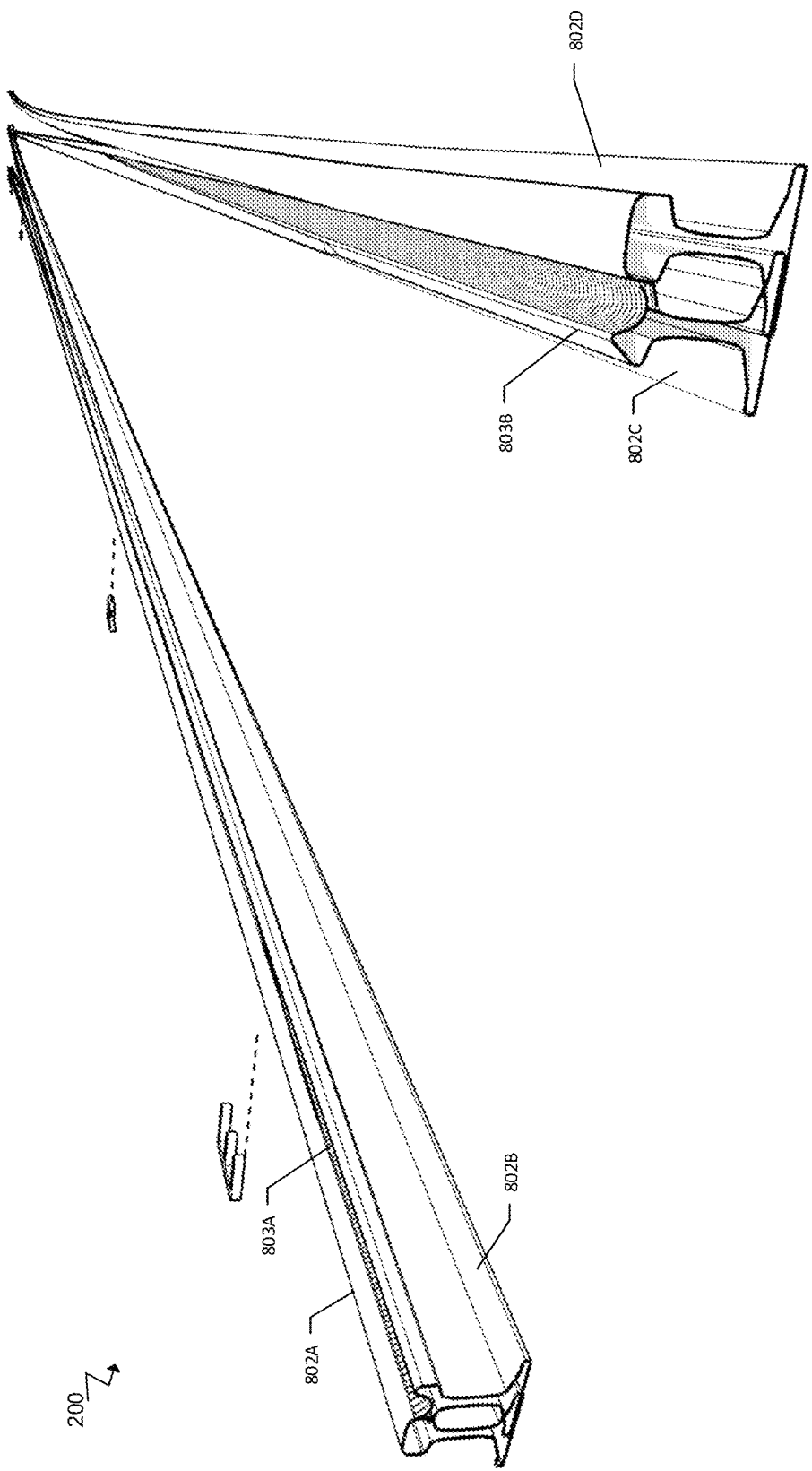
FIG. 2E illustrates a perspective view of a rail assembly.

FIG. 2E illustrates a perspective view of the rail assembly 200. The instant figure shows the rails 802A, 802B, 802C, 802D.

Figure 2F:
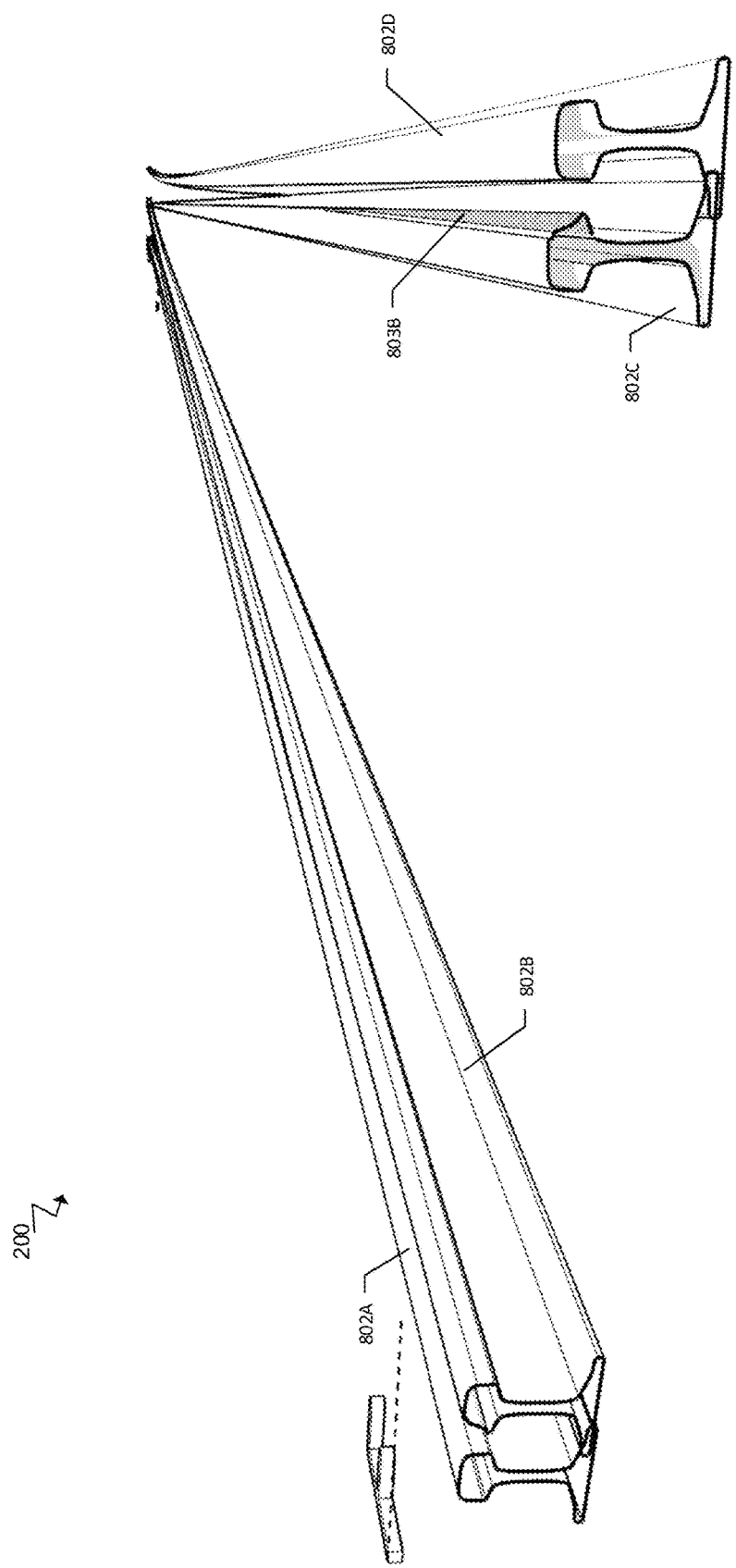
FIG. 2F illustrates a perspective view of a rail assembly.

FIG. 2F illustrates a perspective view of the rail assembly 200. The instant figure shows the rails 802A, 802B, 802C, 802D.

FIG. 2G illustrates a perspective view of the rail assembly 200. The instant figure shows the rails 802A, 802B, 802C, 802D.

Figure 2H:
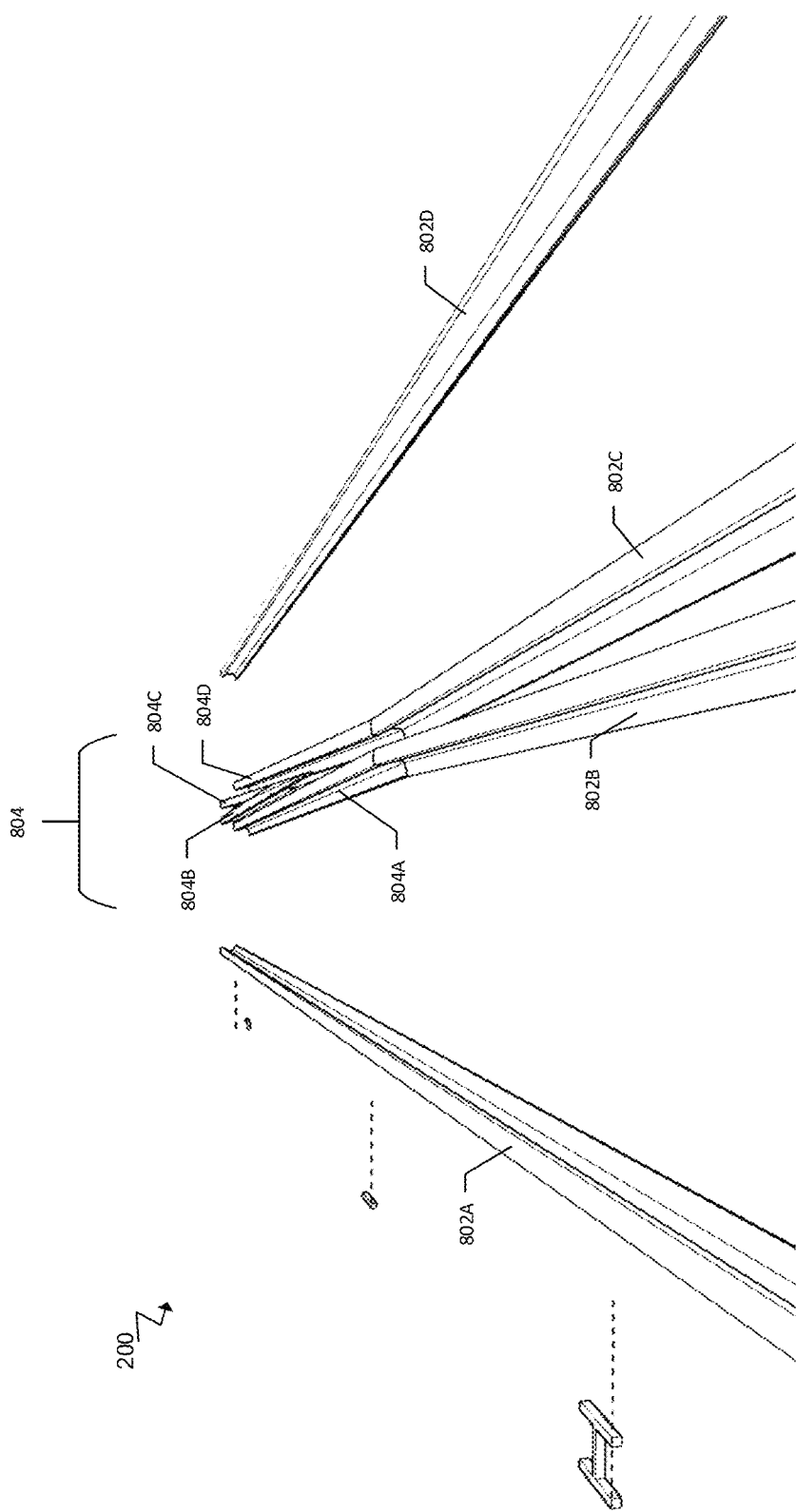
FIG. 2H illustrates a perspective view of a rail assembly.

FIG. 2H illustrates a perspective view of the rail assembly 200. The instant figure shows the rails 802A, 802B, 802C, 802D. A frog assembly 804 may be disposed within the rail assembly 200 and may be operatively connected to the rails 802B, 802C. In one aspect, the frog assembly 804 may have a different steel grade than the rails 802A, 802B, 802C, 802D such that the electromagnetic properties behave differently than other aspects of the rail assembly 200. A left-wing rail 804A and a right-wing rail 804D are depicted in the instant figure to form the frog nose. In one aspect, the left-wing rail 804A is substantially connected to the rail 802B; the left rail 802B is disposed in a manner such that a wheel assembly (e.g., the wheel assemblies 105A, 105B) may traverse from the rail 802B to a right-center frog rail 804C.

The right-wing rail 804D may be substantially connected to the rail 802C, and the right rail 802C may be disposed in a manner such that a wheel assembly (e.g., the wheel assemblies 105A, 105B) may traverse from the rail 802C to a left-center frog rail 804B, in one aspect. In another aspect, the rails 804A, 804D may be non-standard material rails made of less magnetic steel and operable for bidirectional magnetic force. In one aspect, the wing rails 804A, 804D are considered to be non-magnetic or less magnetic with respect to magnetic force interaction.

The left-center frog rail 804B may be disposed to the right of the left-wing rail 804A. The left-center frog rail 804B may be operable for bidirectional magnetic force interaction. In one aspect, the left-center frog rail 804B may be made of the same magnetic steel as the steel utilized in the rails 802A, 802D unlike the rails 804A, 804D which may be less or non-magnetic steel.

The right-center frog rail 804C is disposed to the left of the right-wing rail 804D. The right-center frog rail 804C may be operable for bidirectional magnetic force interaction. In one aspect, the right-center frog rail 804C is made of the same magnetic steel as the steel utilized in the rails 802A, 802D, but not 804A, 804D, which may be less or non-magnetic steel, in one aspect.

Figure 2I:
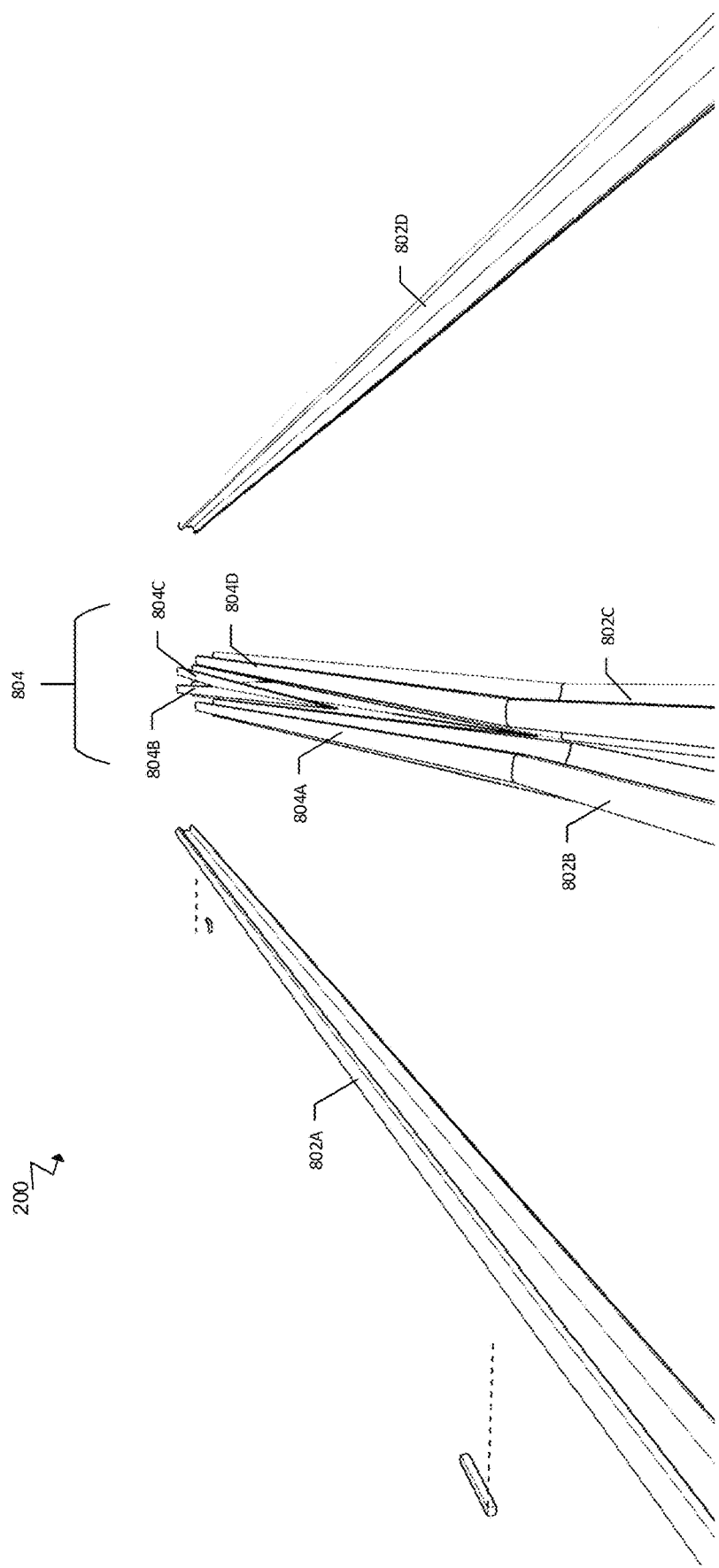
FIG. 2I illustrates a perspective view of a rail assembly.

FIG. 2I illustrates a perspective view of the rail assembly 200. The instant figure shows the rails 802A, 802B, 802C, 802D and the frog assembly 804.

Figure 2J:
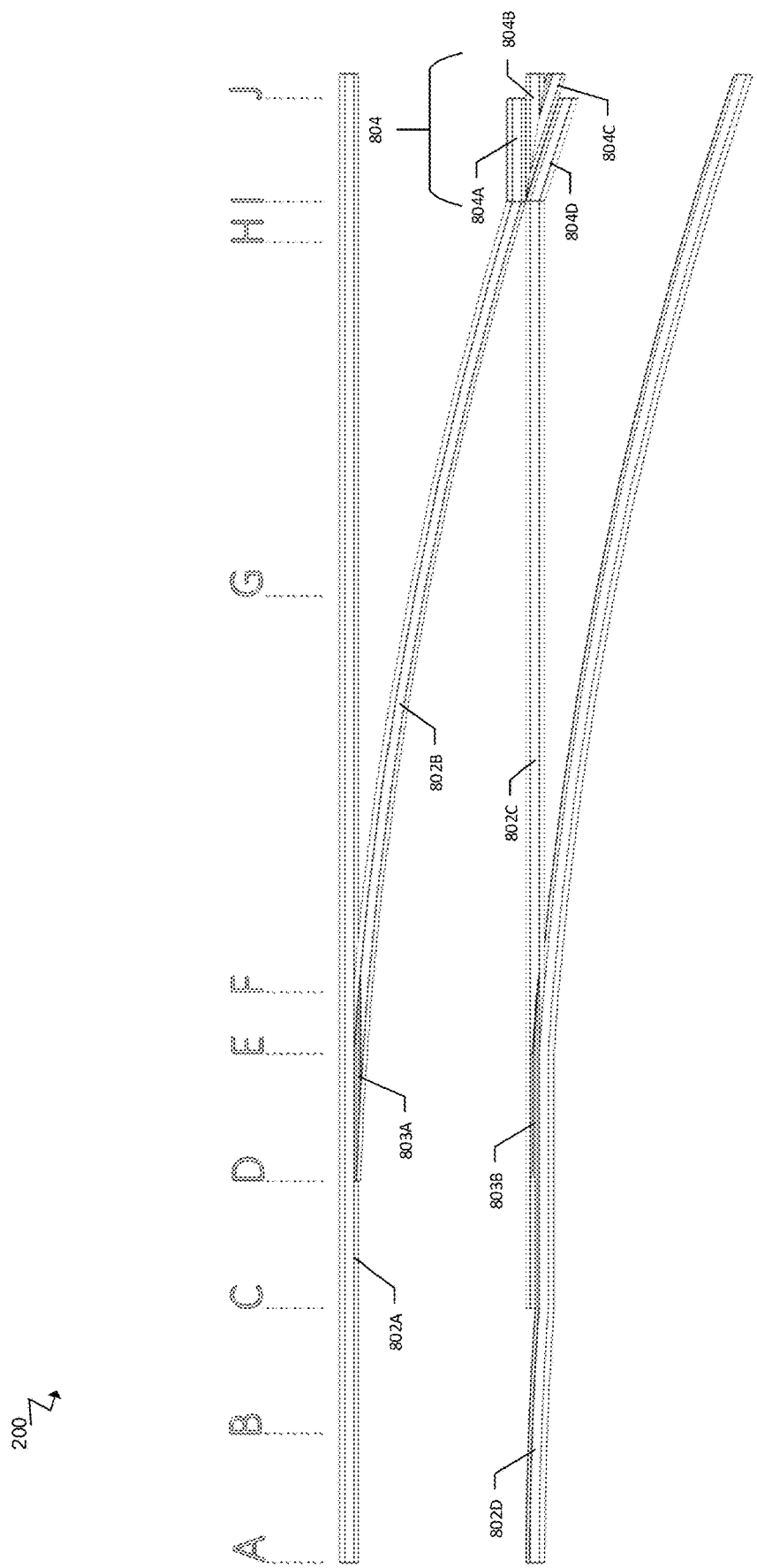
FIG. 2J illustrates a planar view of a rail assembly.

FIG. 2J illustrates a planar view of the rail assembly 200. The instant figure shows the rails 802A, 802B, 802C, 802D and the frog assembly 804.

Figure 3A:
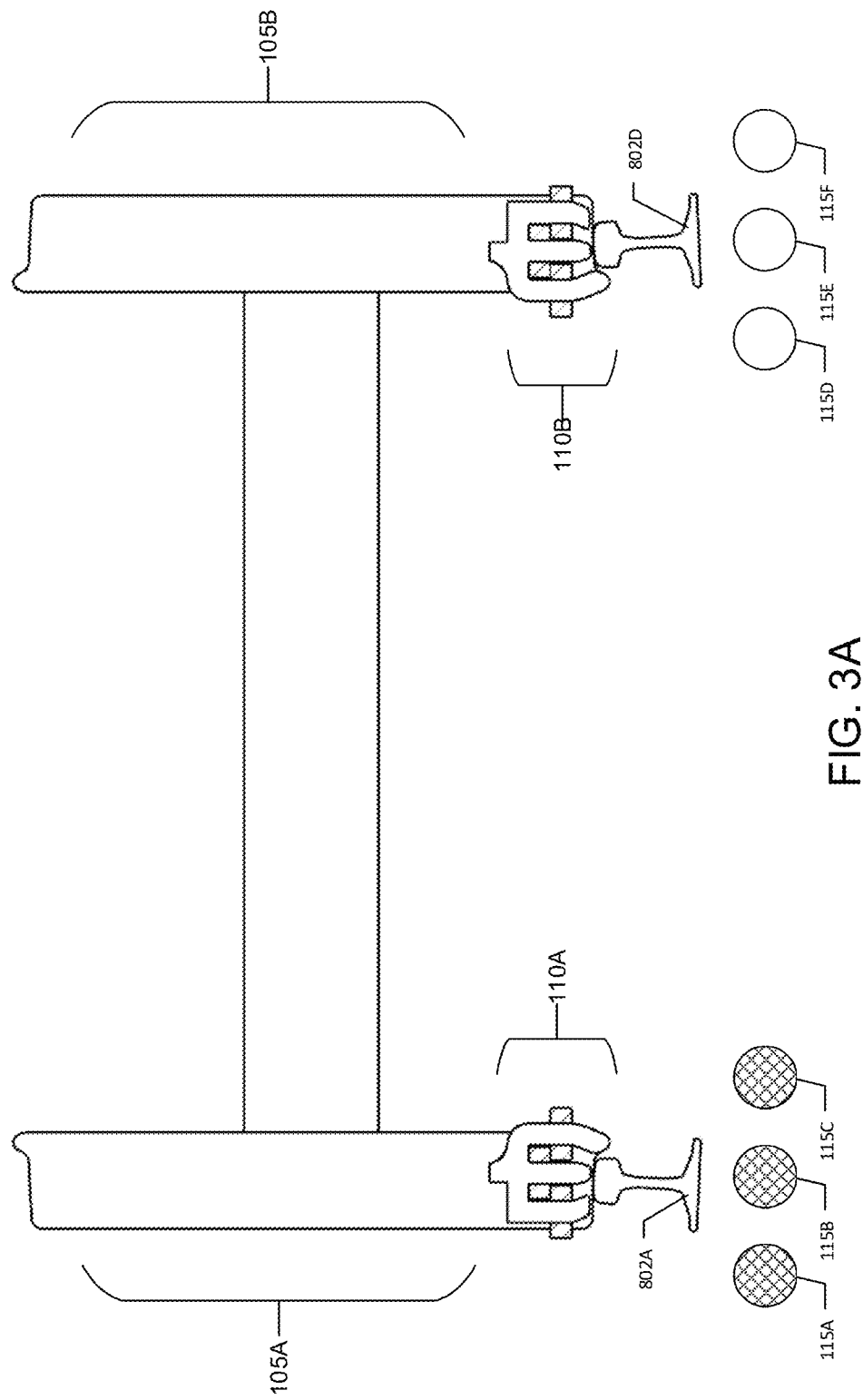
FIG. 3A illustrates a planar view of a bogie assembly positioned on a rail assembly, as shown from a rear perspective.

FIG. 3A illustrates a planar view of the bogie assembly 100 positioned on the rail assembly 200, as shown from a rear perspective. The plurality of electromagnetic engines is comprised of the electromagnetic engine 110A and the electromagnetic engine 110B. The plurality of wheel assemblies is comprised of the wheel assembly 105A and the wheel assembly 105B. The pluralities of electromagnetic engines and the pluralities of wheel assemblies may be fitted with more or fewer components than those illustrated in the instant disclosure; as such, one of skill in the art will appreciate that design considerations in deployment may affect the components employed.

A plurality of coil power states is depicted in the instant figure. The plurality of coil power states may correlate to the coils 115A, 115B, 115C, 115D, 115E, 115F. Said labels are used in the power state-related figures for the purpose of clarity and not as duplication or replacement of the description of the coils 115A, 115B, 115C, 115D, 115E, 115F as disclosed herein.

The coil power states may be in one of three states for the purposes of this disclosure viz. full power, partial power, and no power. The various coil power states are depicted with corresponding labels viz. diagonal marks for substantially full power, cross-hatching for partial power, and empty white for no power (or not powered, low power, sleep power, etc.).

Absolute offsets are depicted in the various figures throughout this disclosure by a horizontal arrow positioned to the left or right of a rectangle with diagonal lines therein. The absolute offsets are positioned near the bogie or near the rail depending on the context. One of skill in the art will understand the absolute offsets to be suggestive and subject to variation in a commercially deployed implementation of the disclosed solution. The coil power states 115A, 115B, 115C are partially powered. The coil power states 115D, 115E, 115F are not powered.

Figure 3B:
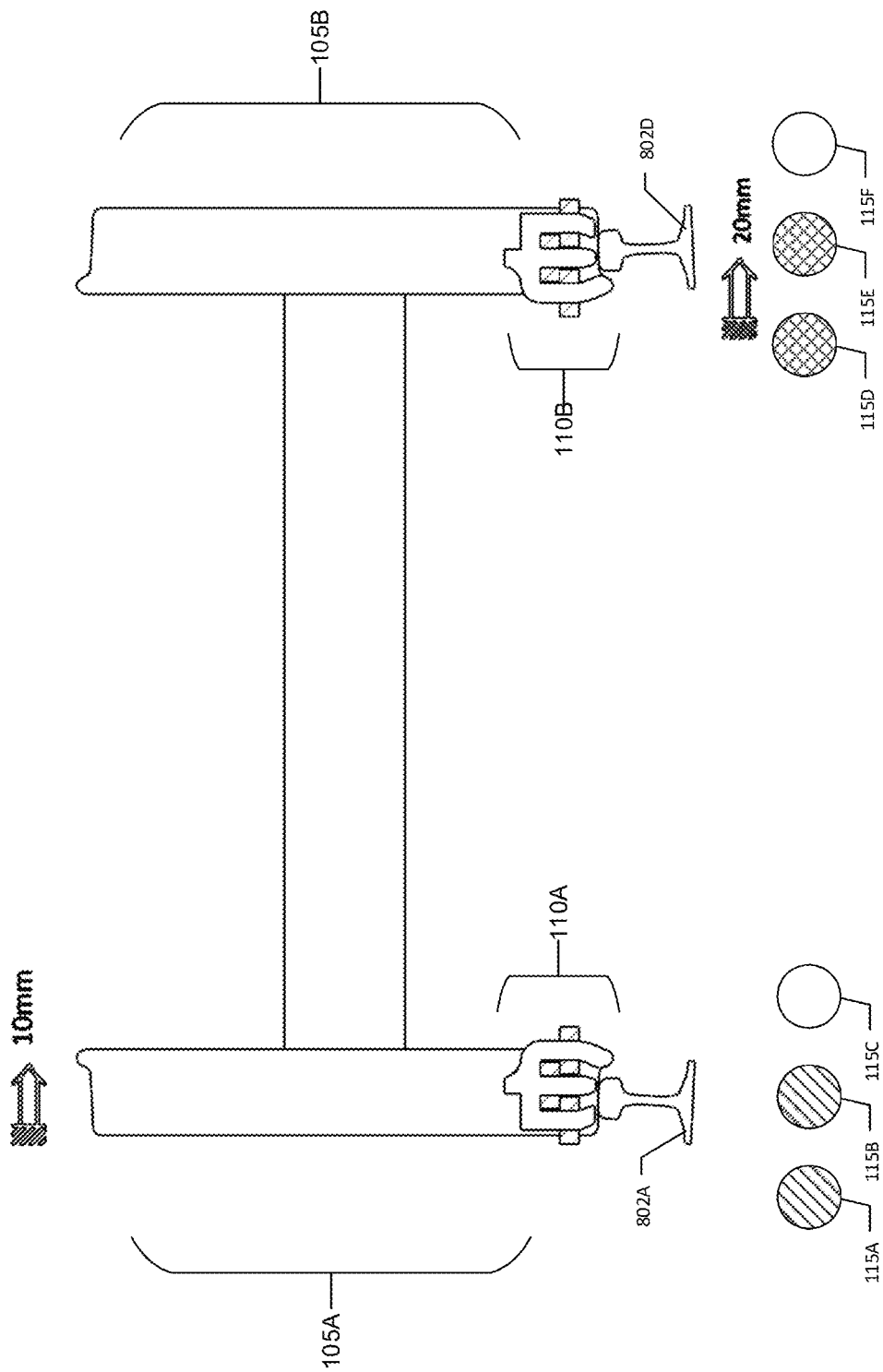
FIG. 3B illustrates a planar view of a bogie assembly positioned on a rail assembly, as shown from a rear perspective.

FIG. 3B illustrates a planar view of the bogie assembly 100 positioned on the rail assembly 200, as shown from a rear perspective. The coil power states 115A, 115B are fully powered. The coil power state 115C is not powered. The coil power states 115D, 115E are partially powered. The coil power state 115F is not powered.

Figure 3C:
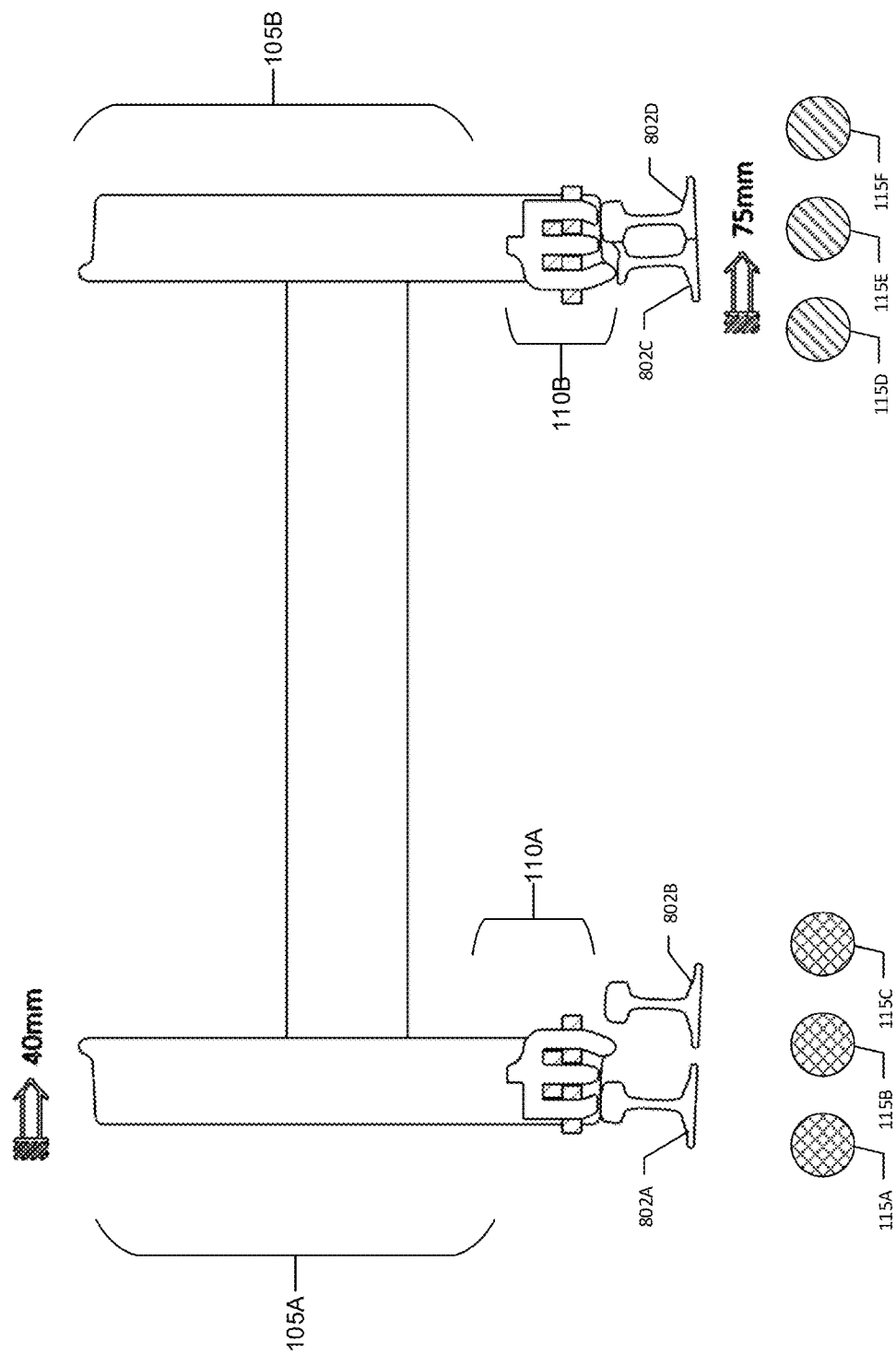
FIG. 3C illustrates a planar view of a bogie assembly positioned on a rail assembly, as shown from a rear perspective.

FIG. 3C illustrates a planar view of the bogie assembly 100 positioned on the rail assembly 200, as shown from a rear perspective. The coil power states 115A, 115B, 115C are partially powered. The coil power states 115D, 115E, 115F are fully powered.

Figure 3D:
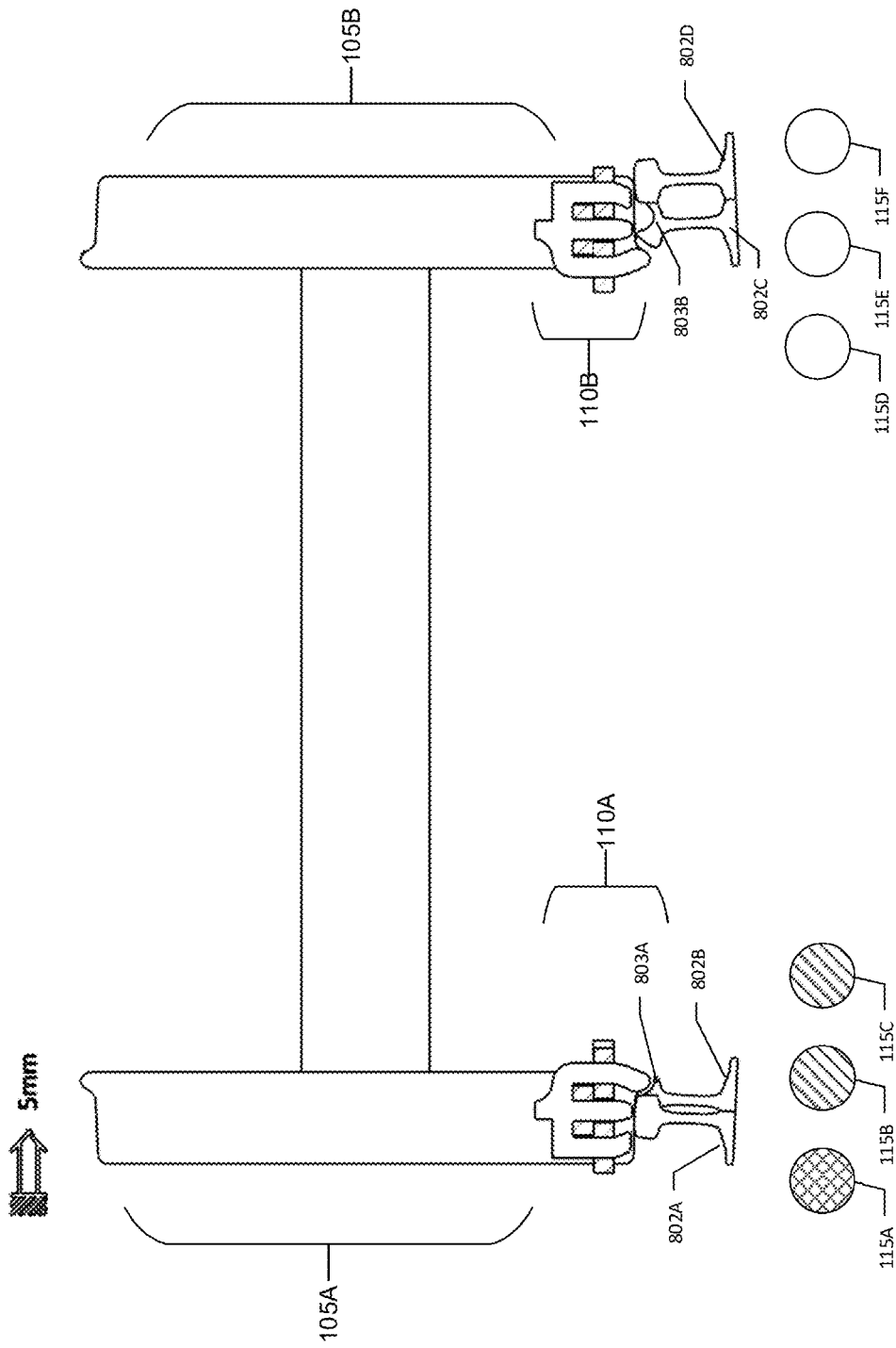
FIG. 3D illustrates a planar view of a bogie assembly positioned on a rail assembly, as shown from a rear perspective.

FIG. 3D illustrates a planar view of the bogie assembly 100 positioned on the rail assembly 200, as shown from a rear perspective. The coil power state 115A is partially powered. The coil power states 115B, 115C are fully powered. The coil power states 115D, 115E, 115F are not powered.

Figure 3E:
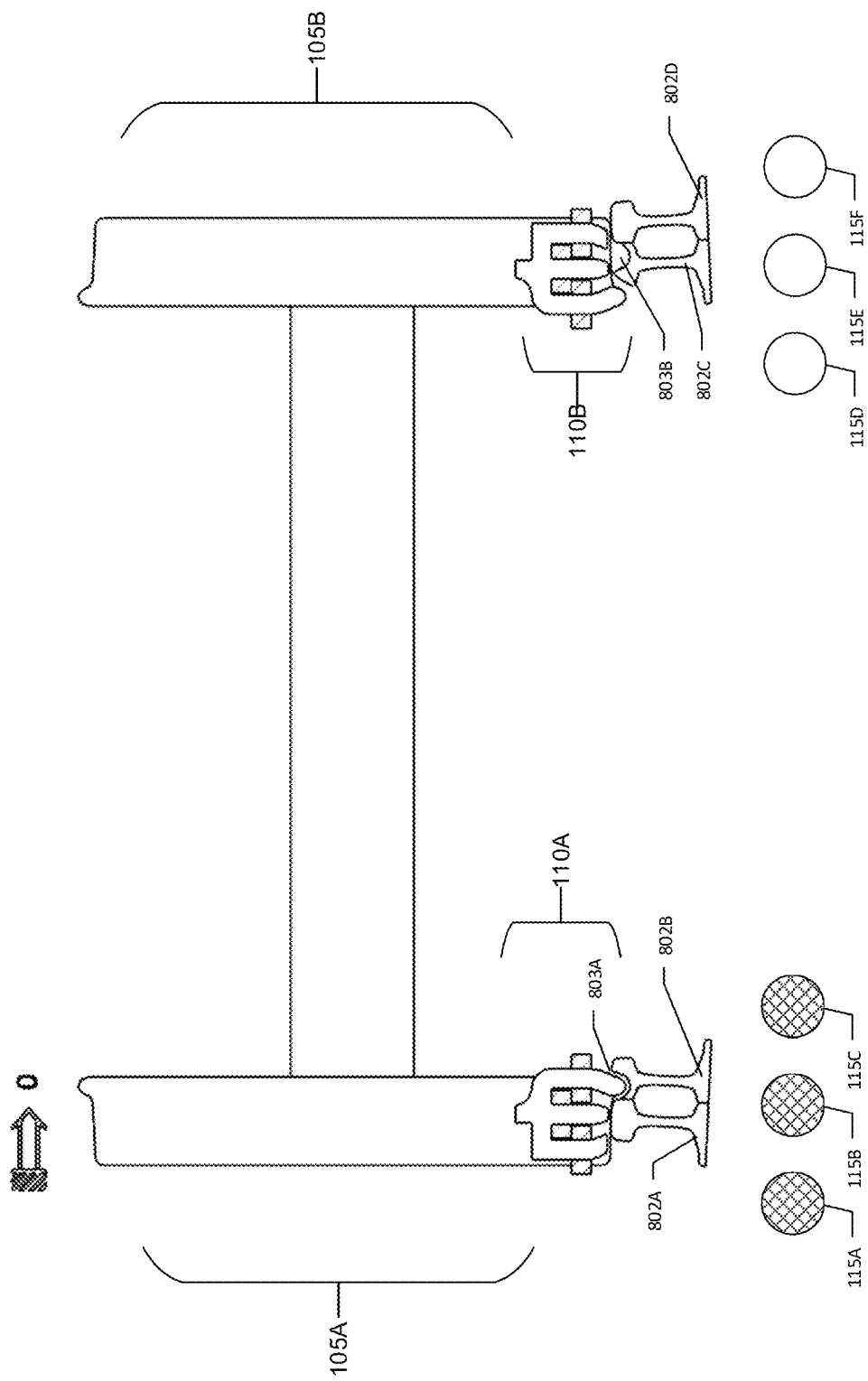
FIG. 3E illustrates a planar view of a bogie assembly positioned on a rail assembly, as shown from a rear perspective.

FIG. 3E illustrates a planar view of the bogie assembly 100 positioned on the rail assembly 200, as shown from a rear perspective. The coil power states 115A, 115B, 115C are partially powered. The coil power states 115D, 115E, 115F are not powered.

Figure 3F:
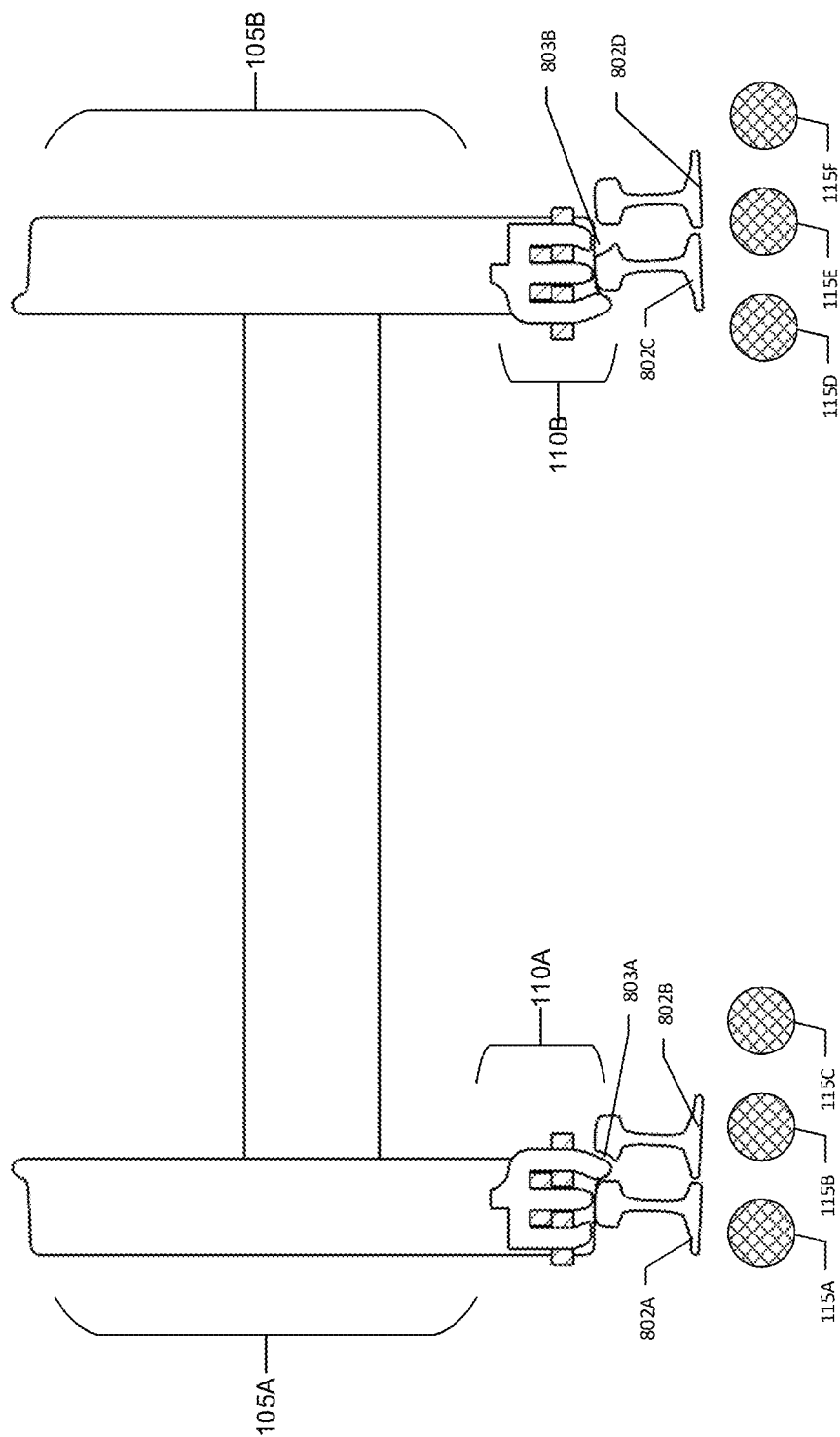
FIG. 3F illustrates a planar view of a bogie assembly positioned on a rail assembly, as shown from a rear perspective.

FIG. 3F illustrates a planar view of the bogie assembly 100 positioned on the rail assembly 200, as shown from a rear perspective. The coil power states 115A, 115B, 115C, 115D, 115E, 115F are partially powered.

Figure 3G:
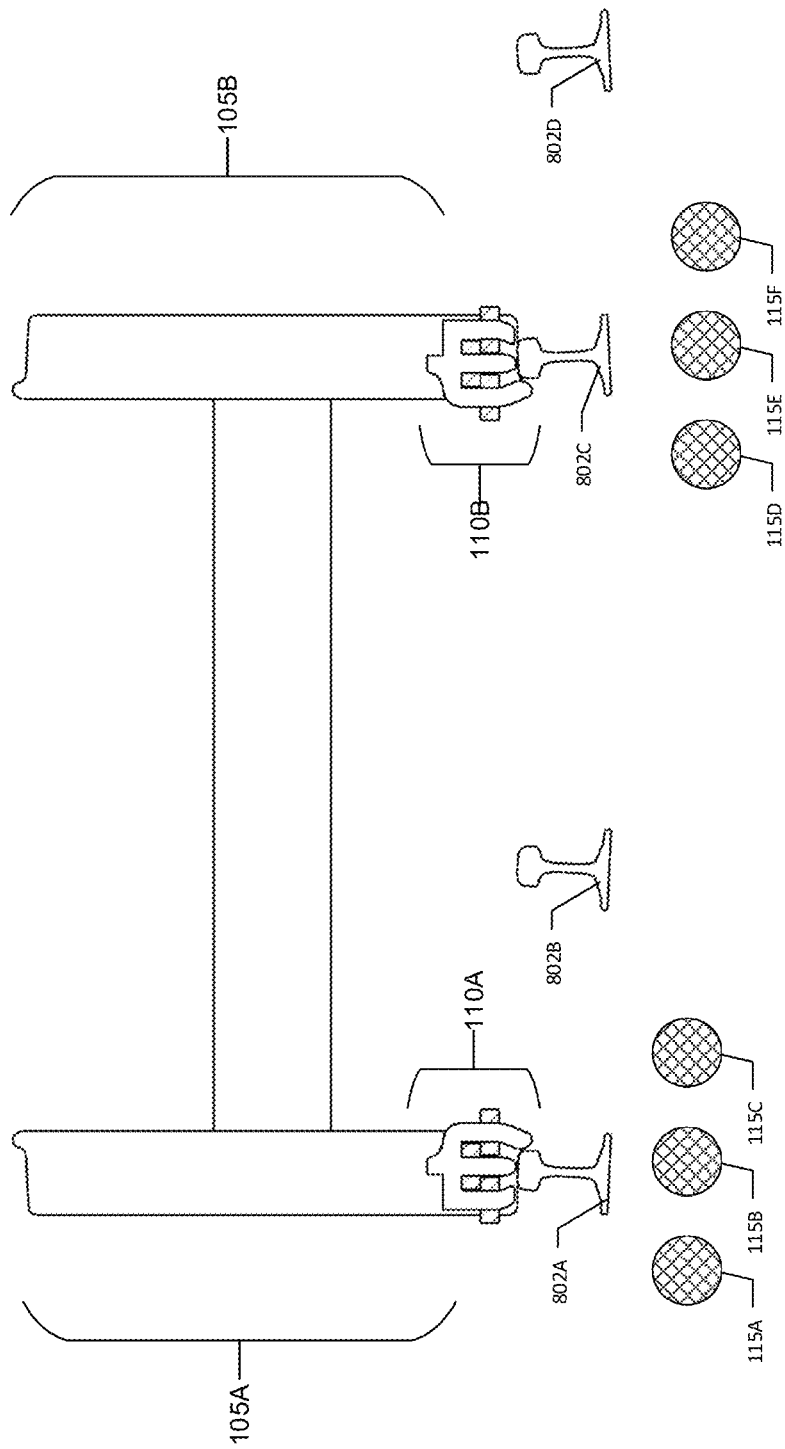
FIG. 3G illustrates a planar view of a bogie assembly positioned on a rail assembly, as shown from a rear perspective.

FIG. 3G illustrates a planar view of the bogie assembly 100 positioned on the rail assembly 200, as shown from a rear perspective. The coil power states 115A, 115B, 115C, 115D, 115E, 115F are partially powered.

Figure 3H:
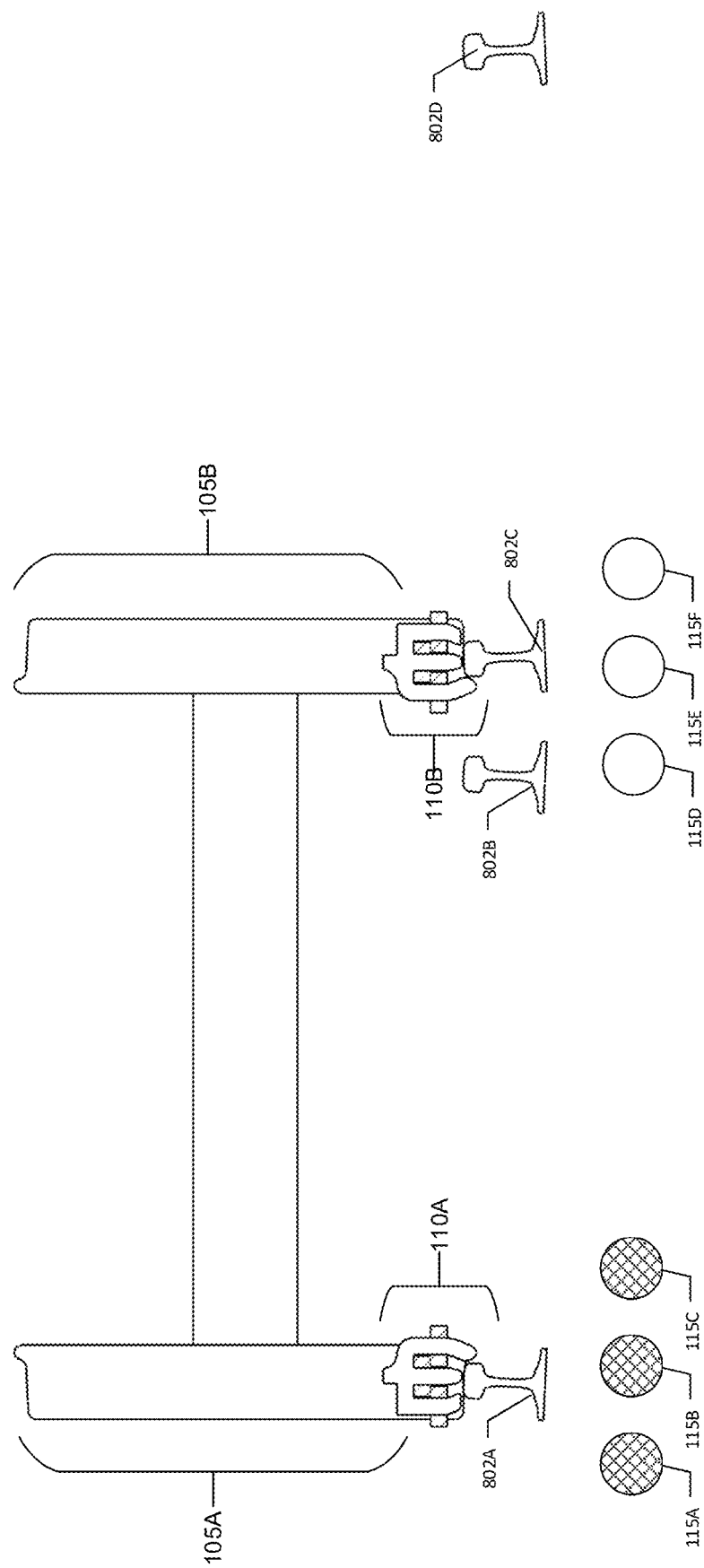
FIG. 3H illustrates a planar view of a bogie assembly positioned on a rail assembly, as shown from a rear perspective.

FIG. 3H illustrates a planar view of the bogie assembly 100 positioned on the rail assembly 200, as shown from a rear perspective. The coil power states 115A, 115B, 115C are partially powered. The coil power states 115D, 115E, 115F are not powered.

Figure 3I:
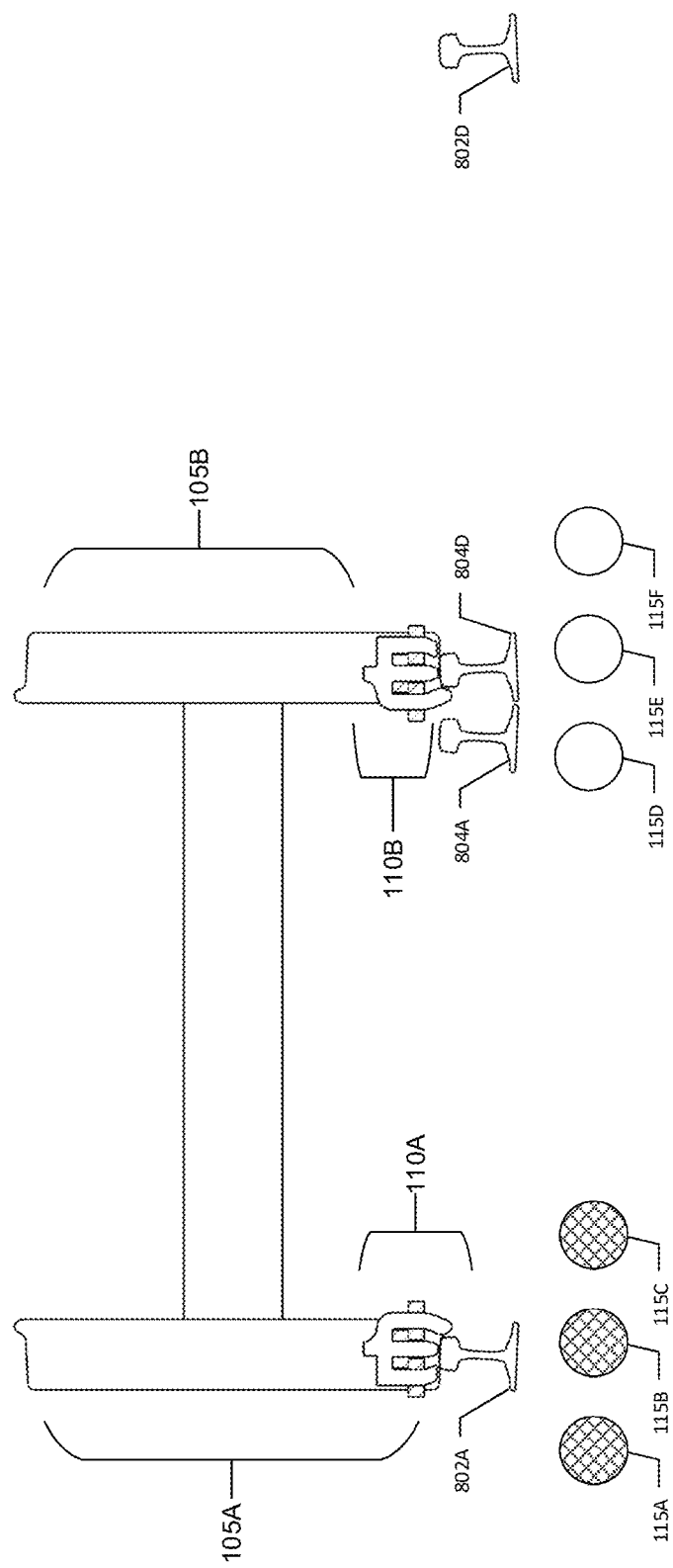
FIG. 3I illustrates a planar view of a bogie assembly positioned on a rail assembly, as shown from a rear perspective.

FIG. 3I illustrates a planar view of the bogie assembly 100 positioned on the rail assembly 200, as shown from a rear perspective. The coil power states 115A, 115B, 115C are partially powered. The coil power states 115D, 115E, 115F are not powered.

Figure 3J:
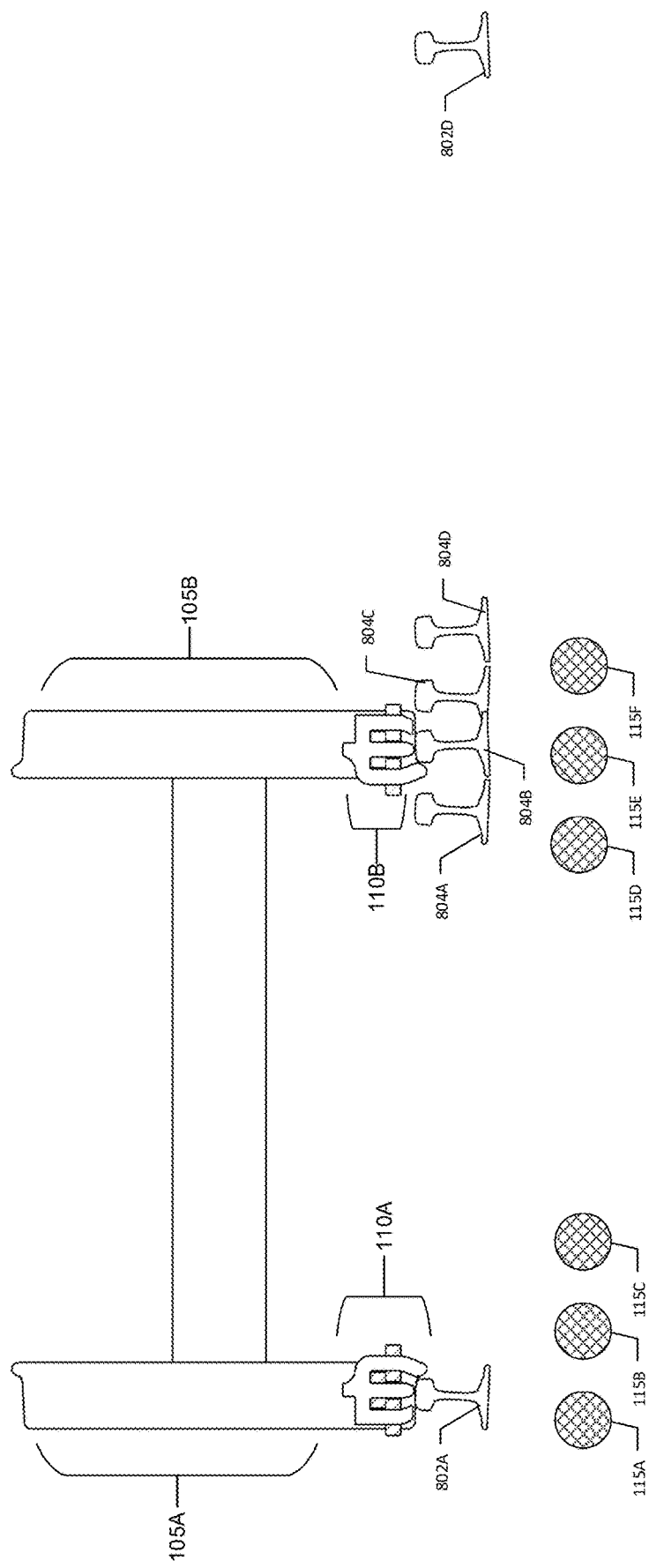
FIG. 3J illustrates a planar view of a bogie assembly positioned on a rail assembly, as shown from a rear perspective.

FIG. 3J illustrates a planar of the bogie assembly 100 positioned on the rail assembly 200, as shown from a rear perspective. The coil power states 115A, 115B, 115C, 115D, 115E, 115F are partially powered.

Figure 4A:
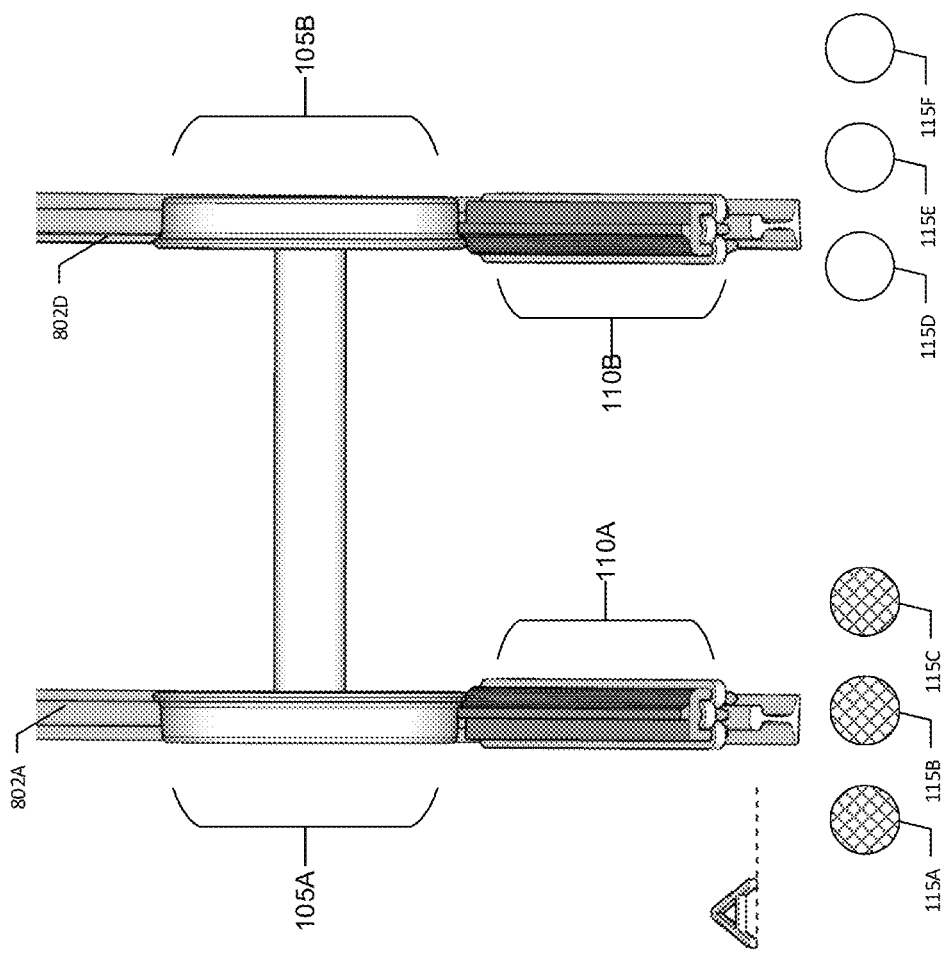
FIG. 4A illustrates a perspective view of a bogie assembly positioned on a rail assembly.

FIG. 4A illustrates a perspective view of a bogie assembly 100 positioned on a rail assembly 200. The coil power states 115A, 115B, 115C are partially powered. The coil power states 115D, 115E, 115F are not powered.

Figure 4B:
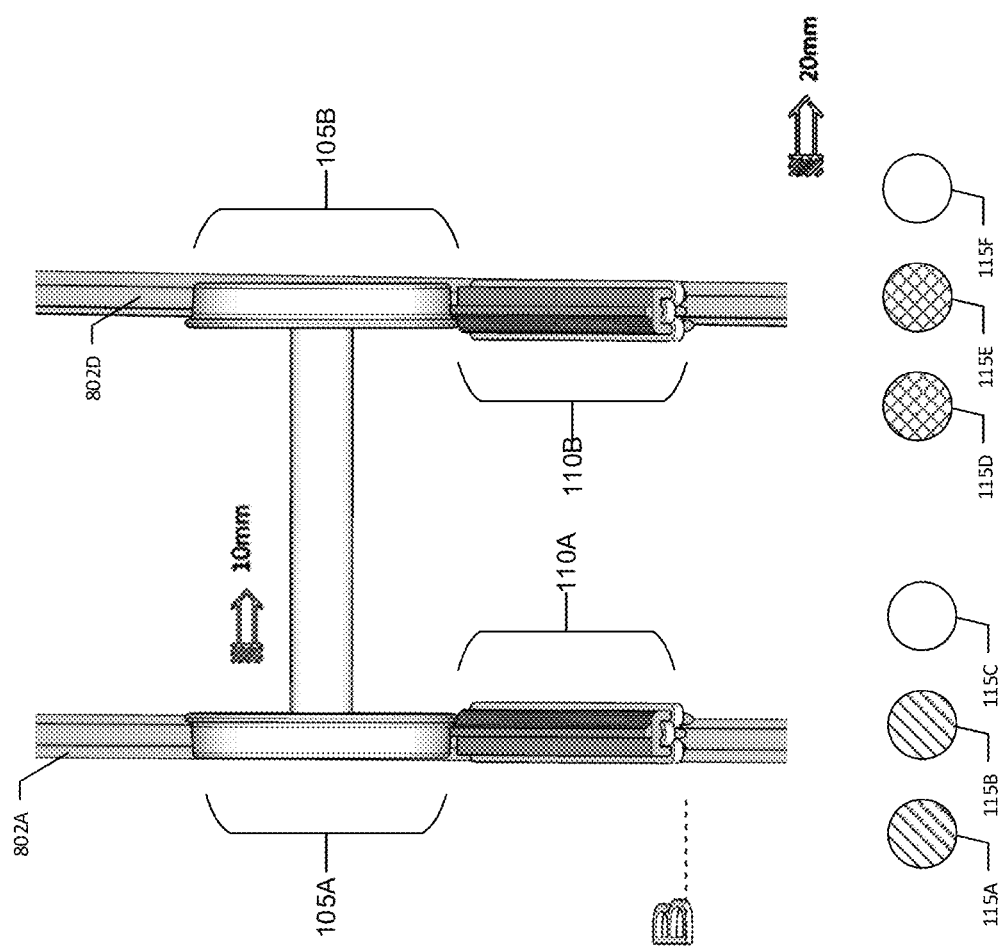
FIG. 4B illustrates a perspective view of a bogie assembly positioned on a rail assembly.

FIG. 4B illustrates a perspective view of the bogie assembly 100 positioned on the rail assembly 200. The coil power states 115A, 115B are fully powered. The coil power state 115C is not powered. The coil power states 115D, 115E are partially powered. The coil power state 115F is not powered.

Figure 4C:
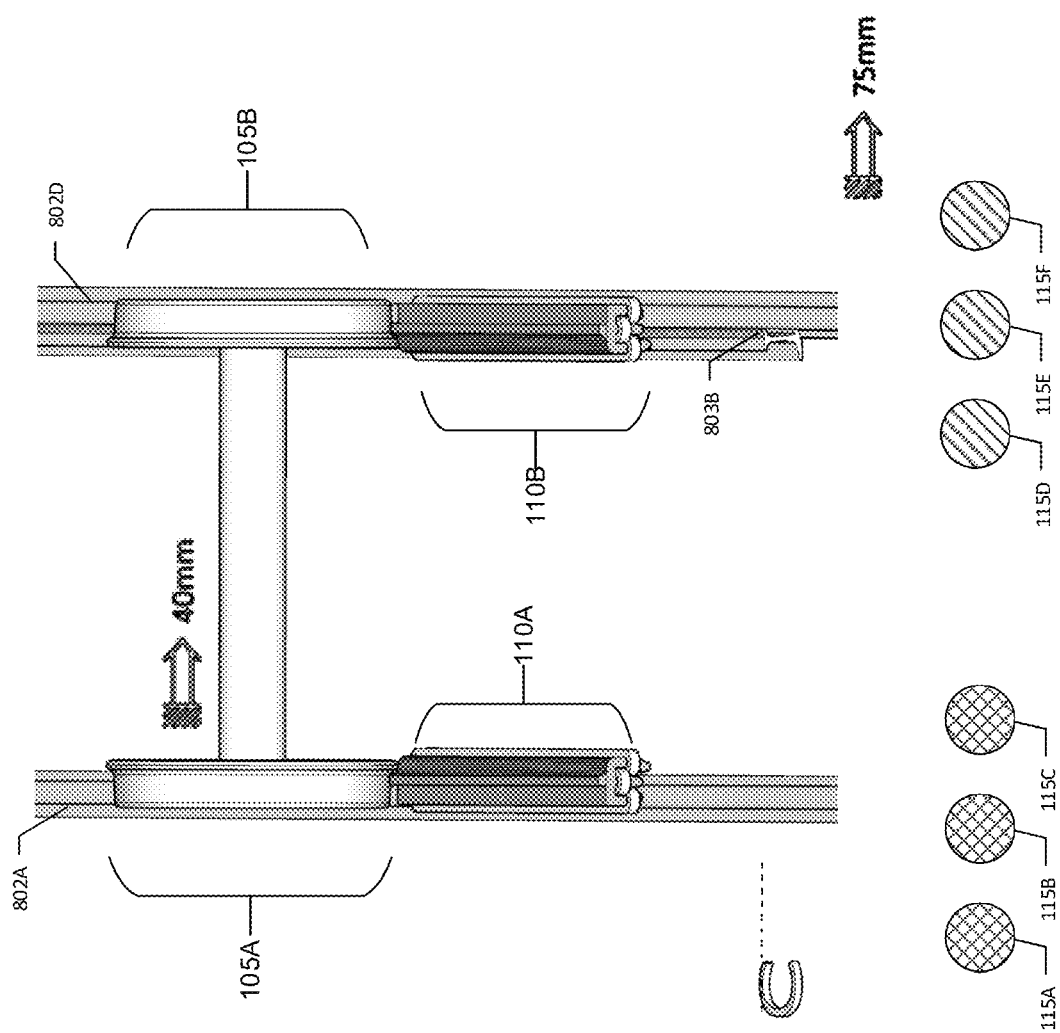
FIG. 4C illustrates a perspective view of a bogie assembly positioned on a rail assembly.

FIG. 4C illustrates a perspective view of the bogie assembly 100 positioned on the rail assembly 200. The coil power states 115A, 115B, 115C are partially powered. The coil power states 115D, 115E, 115F are fully powered.

Figure 4D:
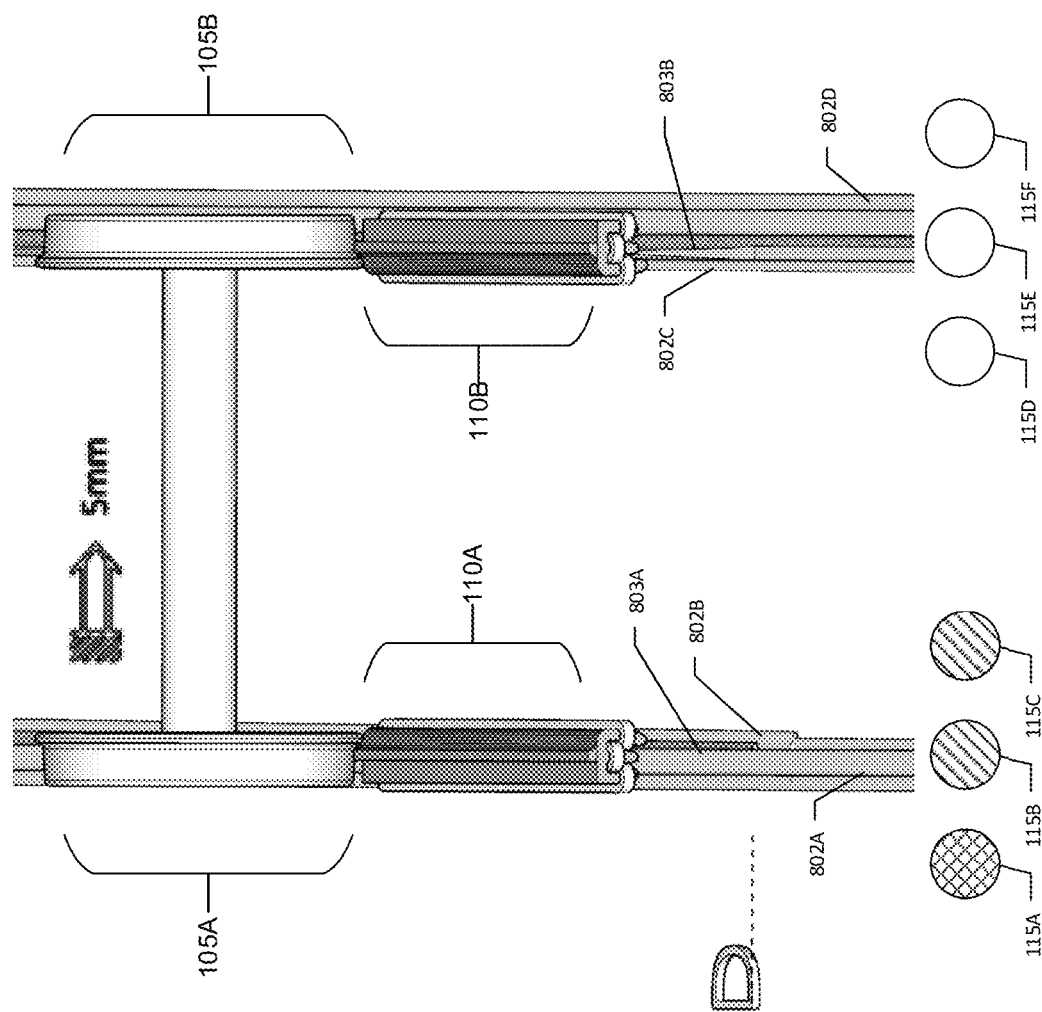
FIG. 4D illustrates a perspective view of a bogie assembly positioned on a rail assembly.

FIG. 4D illustrates a perspective view of the bogie assembly 100 positioned on the rail assembly 200. The coil power state 115A is partially powered. The coil power states 115B, 115C are fully powered. The coil power states 115D, 115E, 115F are not powered.

FIG. 4E illustrates a perspective view of the bogie assembly 100 positioned on the rail assembly 200. The coil power states 115A, 115B, 115C are partially powered. The coil power states 115D, 115E, 115F are not powered.

Figure 4F:
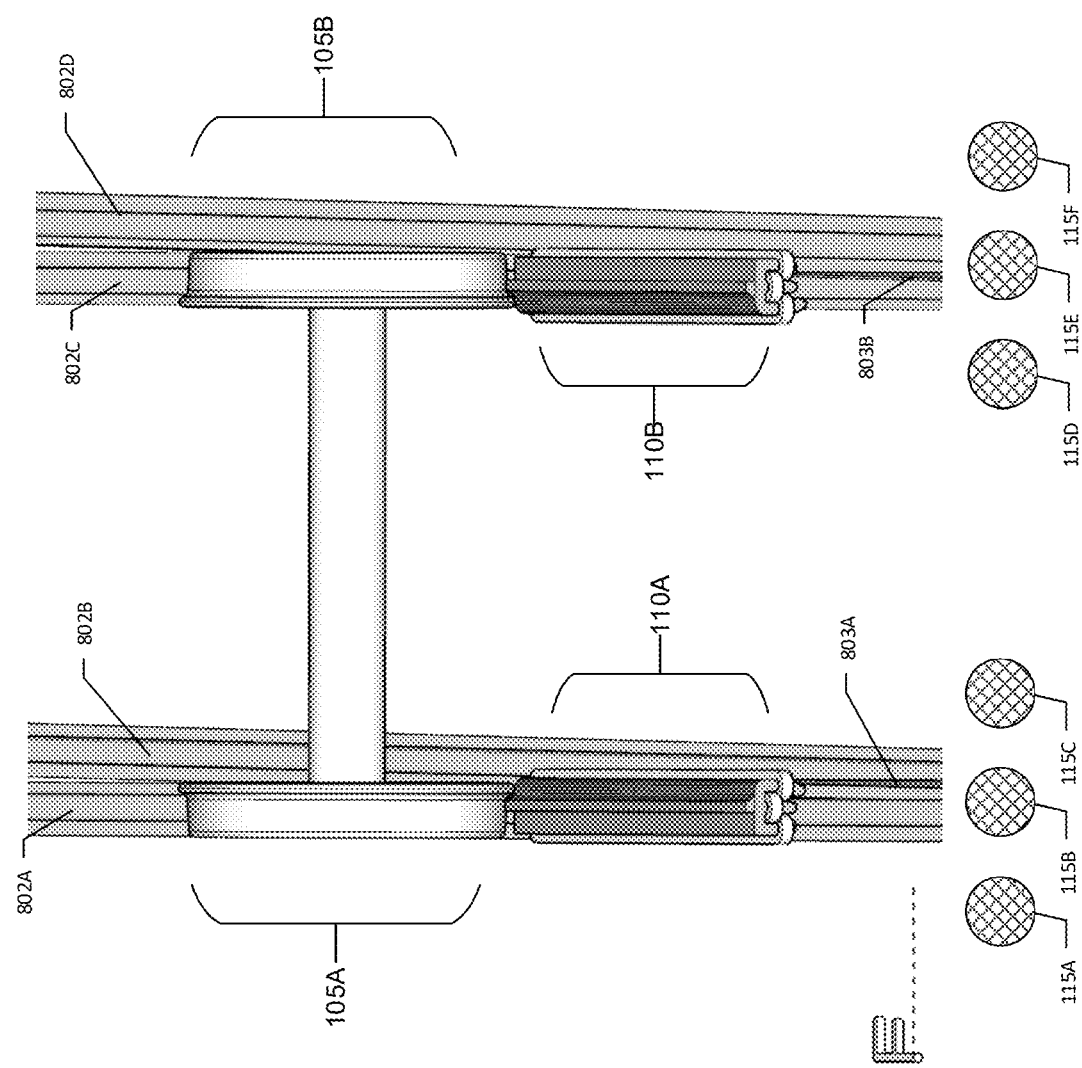
FIG. 4F illustrates a perspective view of a bogie assembly positioned on a rail assembly.

FIG. 4F illustrates a perspective view of the bogie assembly 100 positioned on the rail assembly 200. The coil power states 115A, 115B, 115C, 115D, 115E, 115F are partially powered.

Figure 4G:
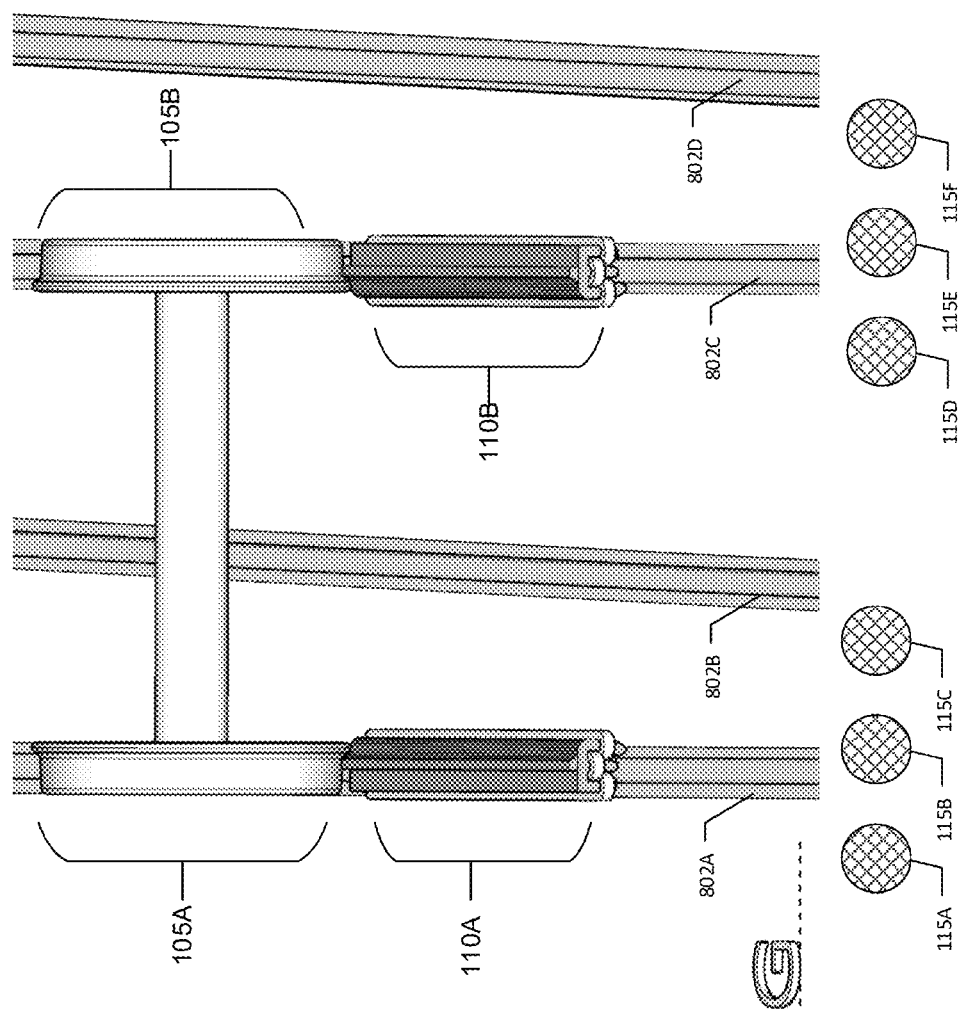
FIG. 4G illustrates a perspective view of a bogie assembly positioned on a rail assembly.

FIG. 4G illustrates a perspective view of the bogie assembly 100 positioned on the rail assembly 200. The coil power states 115A, 115B, 115C, 115D, 115E, 115F are partially powered.

FIG. 4H illustrates a perspective view of the bogie assembly 100 positioned on the rail assembly 200. The coil power states 115A, 115B, 115C are partially powered. The coil power states 115D, 115E, 115F are not powered.

Figure 4I:
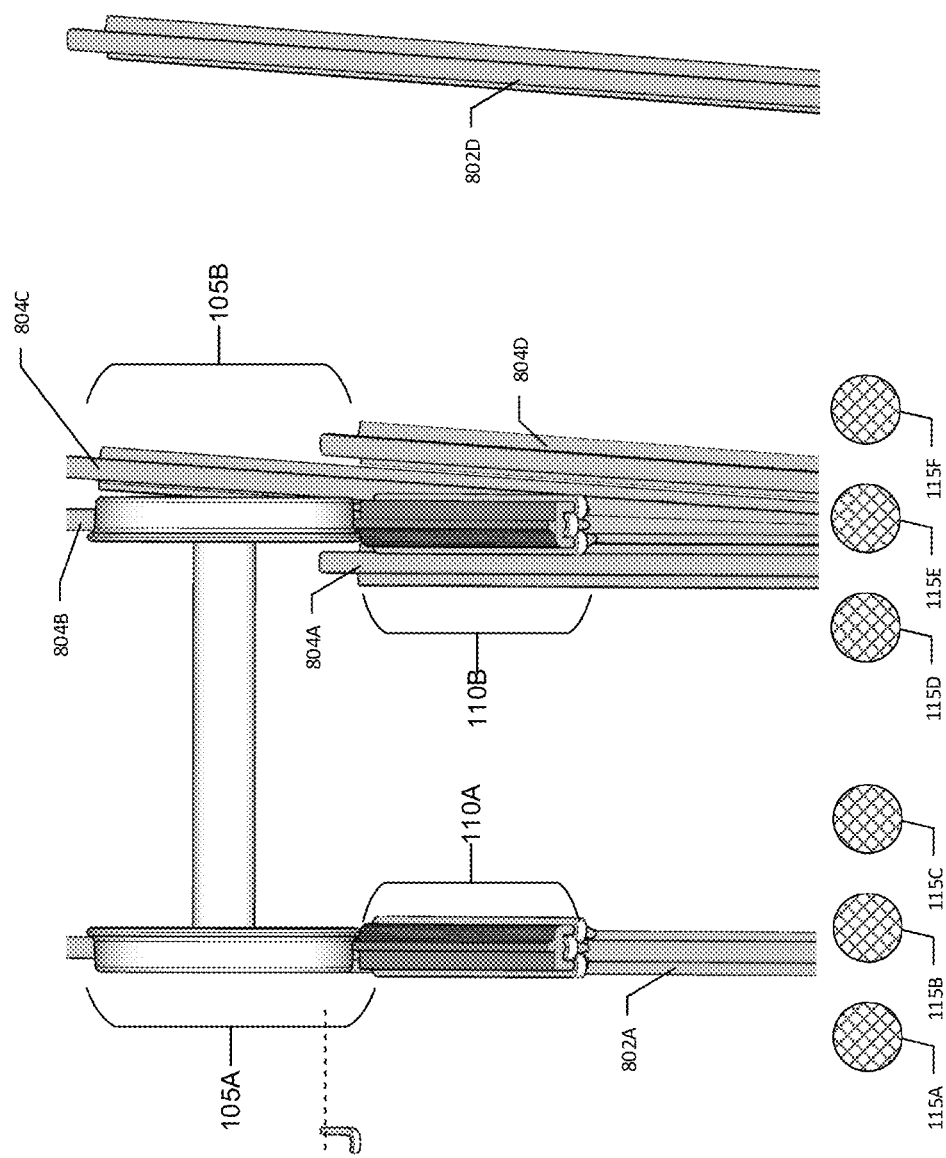
FIG. 4I illustrates a perspective view of a bogie assembly positioned on a rail assembly.

FIG. 4I illustrates a perspective view of the bogie assembly 100 positioned on the rail assembly 200. The coil power states 115A, 115B, 115C, 115D, 115E, 115F are partially powered.

Figure 5A:
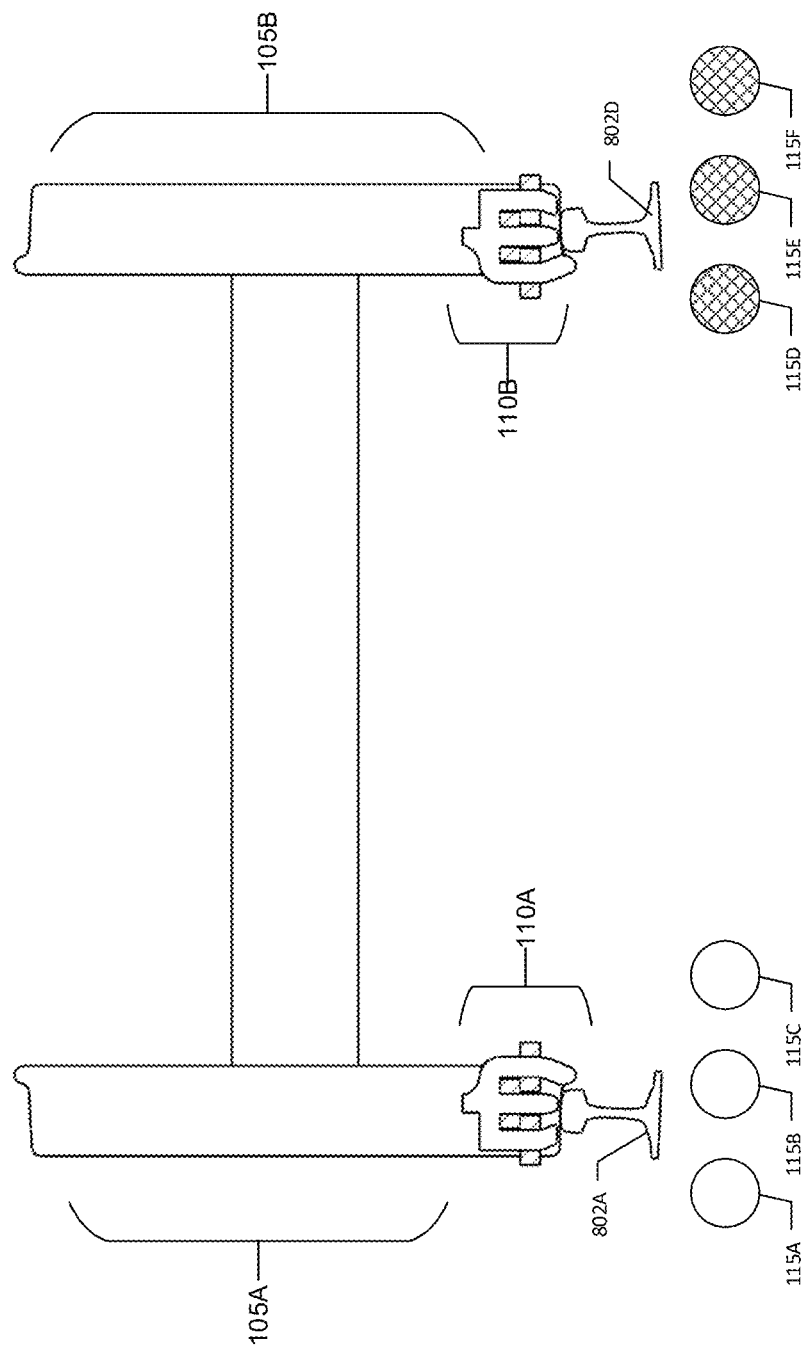
FIG. 5A illustrates a planar view of a bogie assembly positioned on a rail assembly, as shown from a rear perspective.

FIG. 5A illustrates a planar view of the bogie assembly 100 positioned on the rail assembly 200, as shown from a rear perspective. The coil power states 115A, 115B, 115C are not powered. The coil power states 115D, 115E, 115F are partially powered.

Figure 5B:
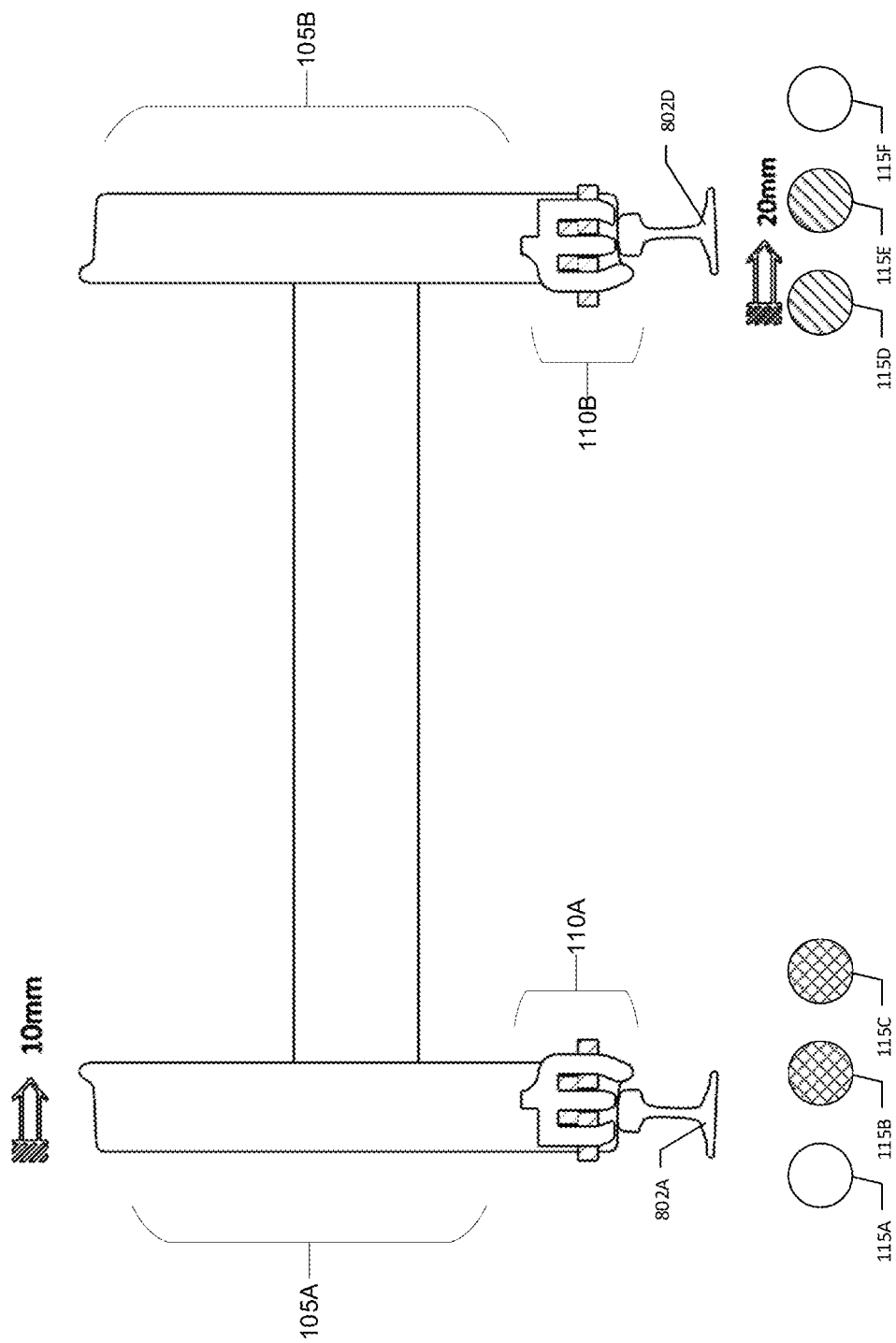
FIG. 5B illustrates a planar view of a bogie assembly positioned on a rail assembly, as shown from a rear perspective.

FIG. 5B illustrates a planar view of the bogie assembly 100 positioned on the rail assembly 200, as shown from a rear perspective. The coil power state 115A is not powered. The coil power states 115B, 115C are partially powered. The coil power states 115D, 115E are fully powered. The coil power state 115F is not powered.

Figure 5C:
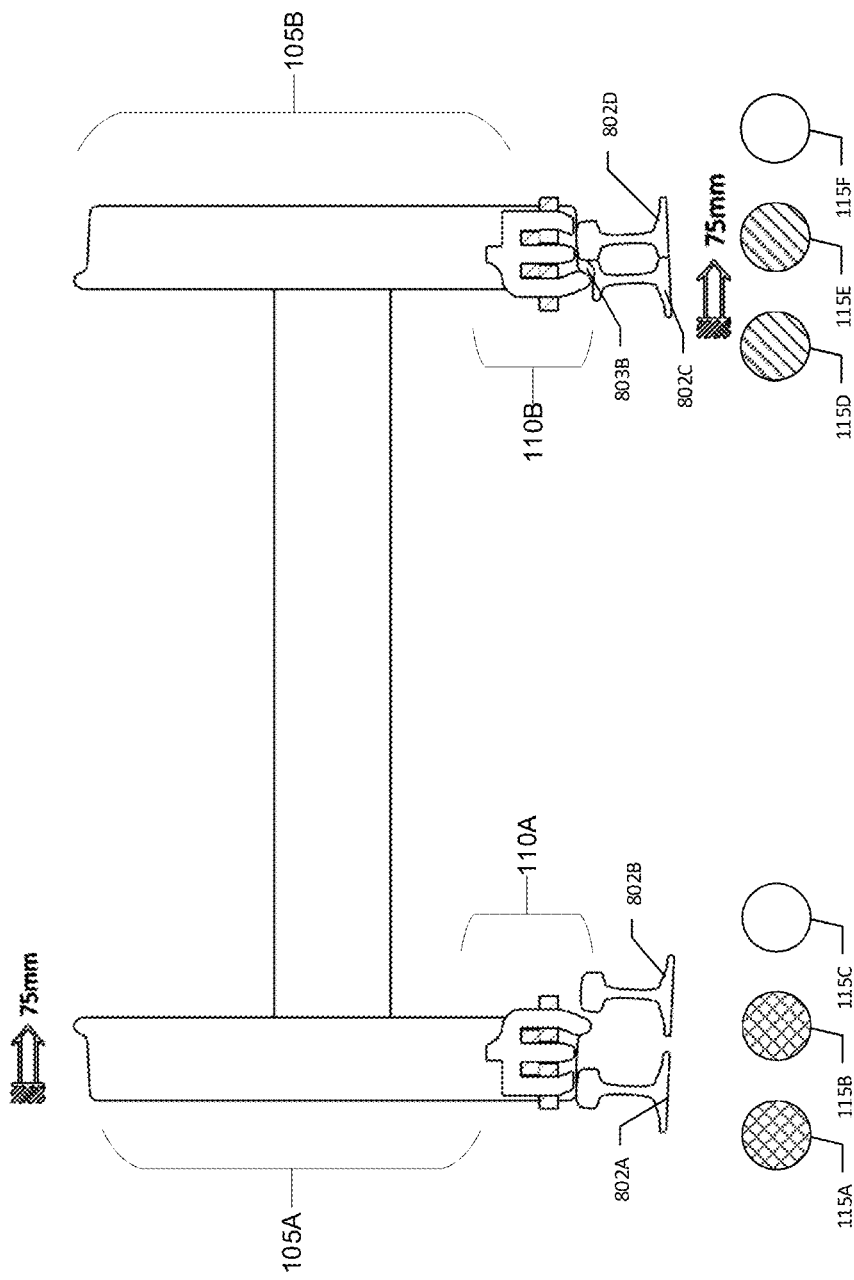
FIG. 5C illustrates a planar view of a bogie assembly positioned on a rail assembly, as shown from a rear perspective.

FIG. 5C illustrates a planar view of the bogie assembly 100 positioned on the rail assembly 200, as shown from a rear perspective. The coil power state 115A, 115B is partially powered. The coil power state 115C is not powered. The coil power state 115D, 115E is fully powered. The coil power state 115F is not powered.

Figure 5D:
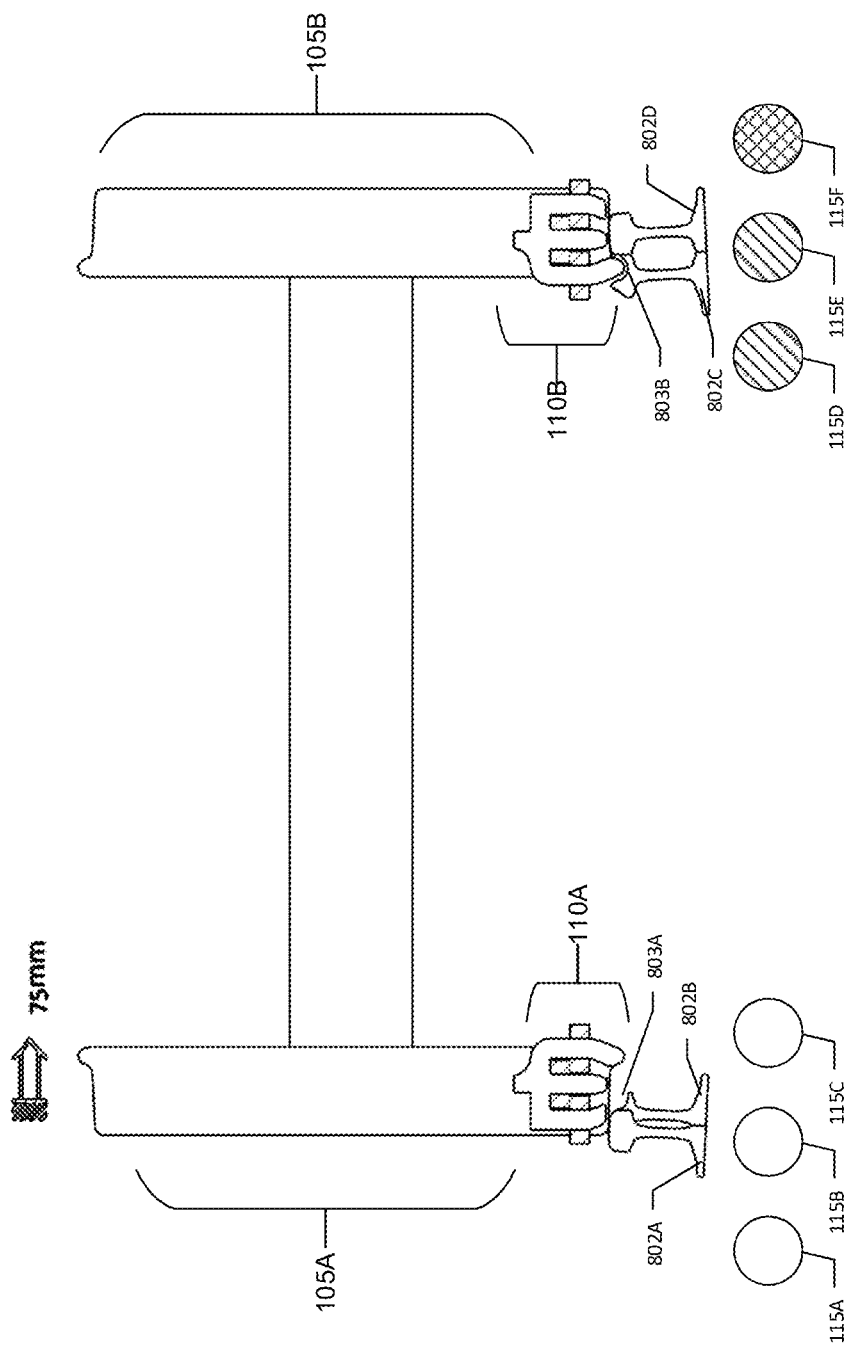
FIG. 5D illustrates a planar view of a bogie assembly positioned on a rail assembly, as shown from a rear perspective.

FIG. 5D illustrates a planar of the bogie assembly 100 positioned on the rail assembly 200, as shown from a rear perspective. The coil power states 115A, 115B, 115C are not powered. The coil power states 115D, 115E are fully powered. The coil power state 115F is partially powered.

Figure 5E:
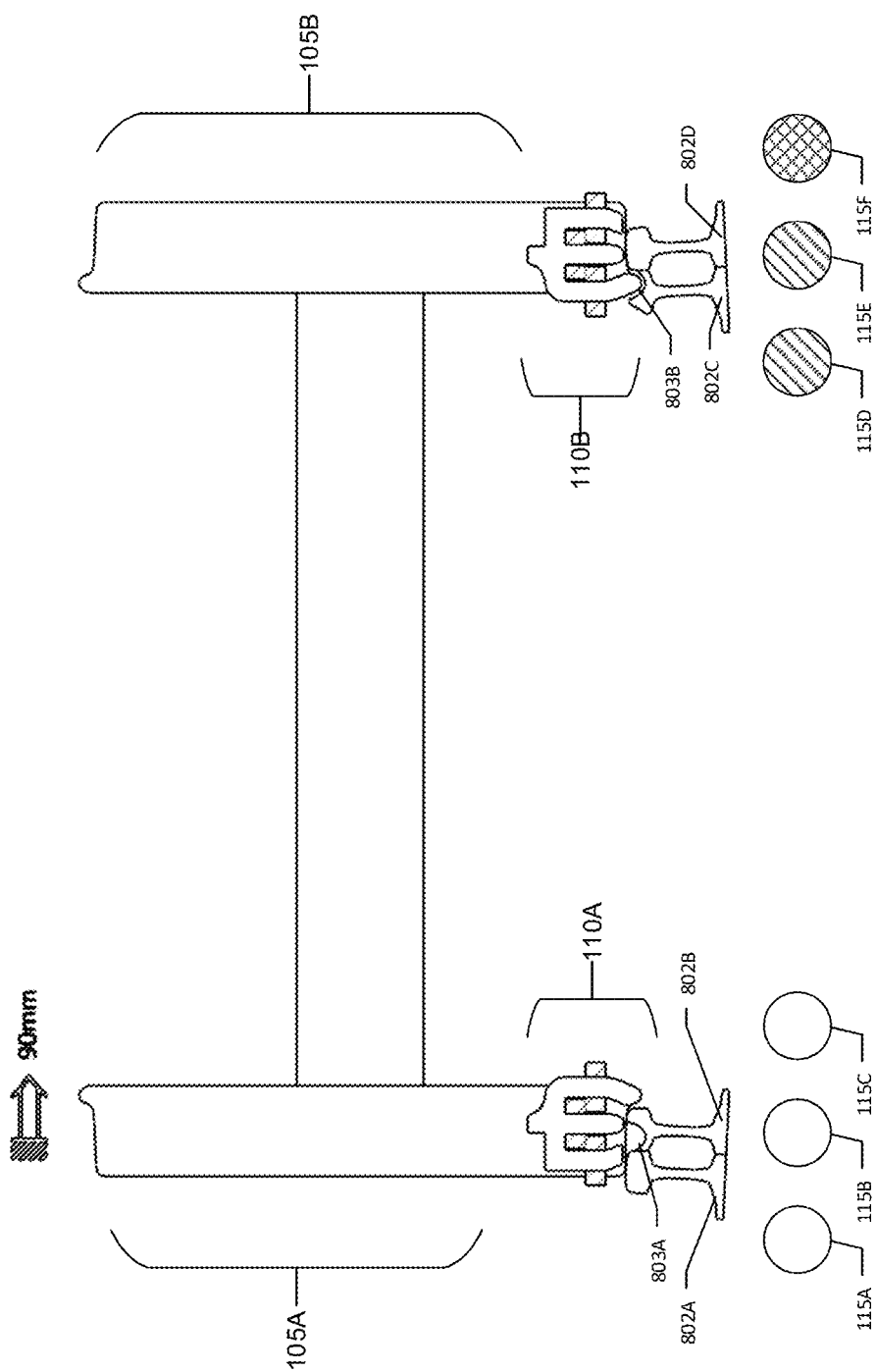
FIG. 5E illustrates a planar view of a bogie assembly positioned on a rail assembly, as shown from a rear perspective.

FIG. 5E illustrates a planar view of the bogie assembly 100 positioned on the rail assembly 200, as shown from a rear perspective. The coil power states 115A, 115B, 115C are not powered. The coil power states 115D, 115E are fully powered. The coil power state 115F is partially powered.

Figure 5F:
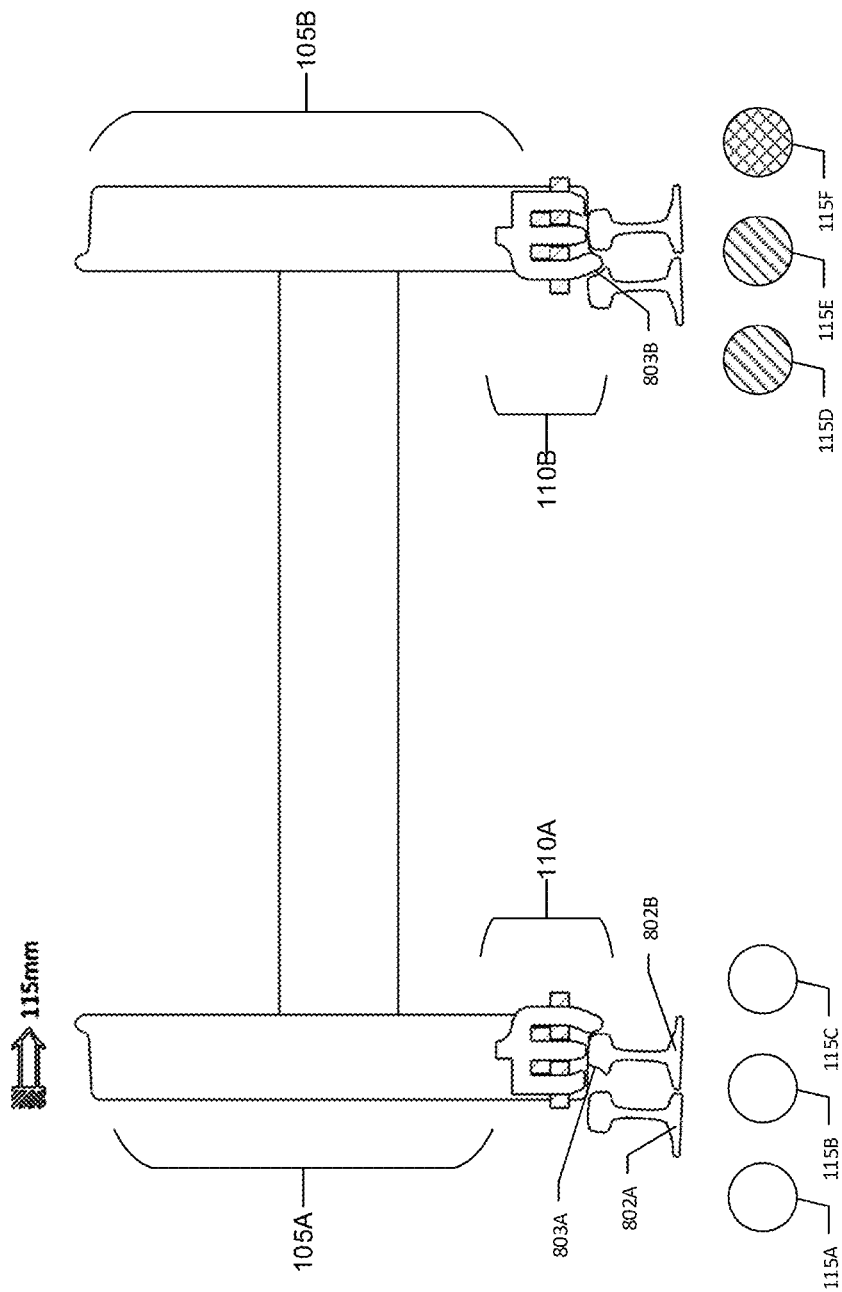
FIG. 5F illustrates a planar view of a bogie assembly positioned on a rail assembly, as shown from a rear perspective.

FIG. 5F illustrates a planar view of the bogie assembly 100 positioned on the rail assembly 200, as shown from a rear perspective. The coil power states 115A, 115B, 115C are not powered. The coil power states 115D, 115E are fully powered. The coil power state 115F is partially powered.

Figure 5G:
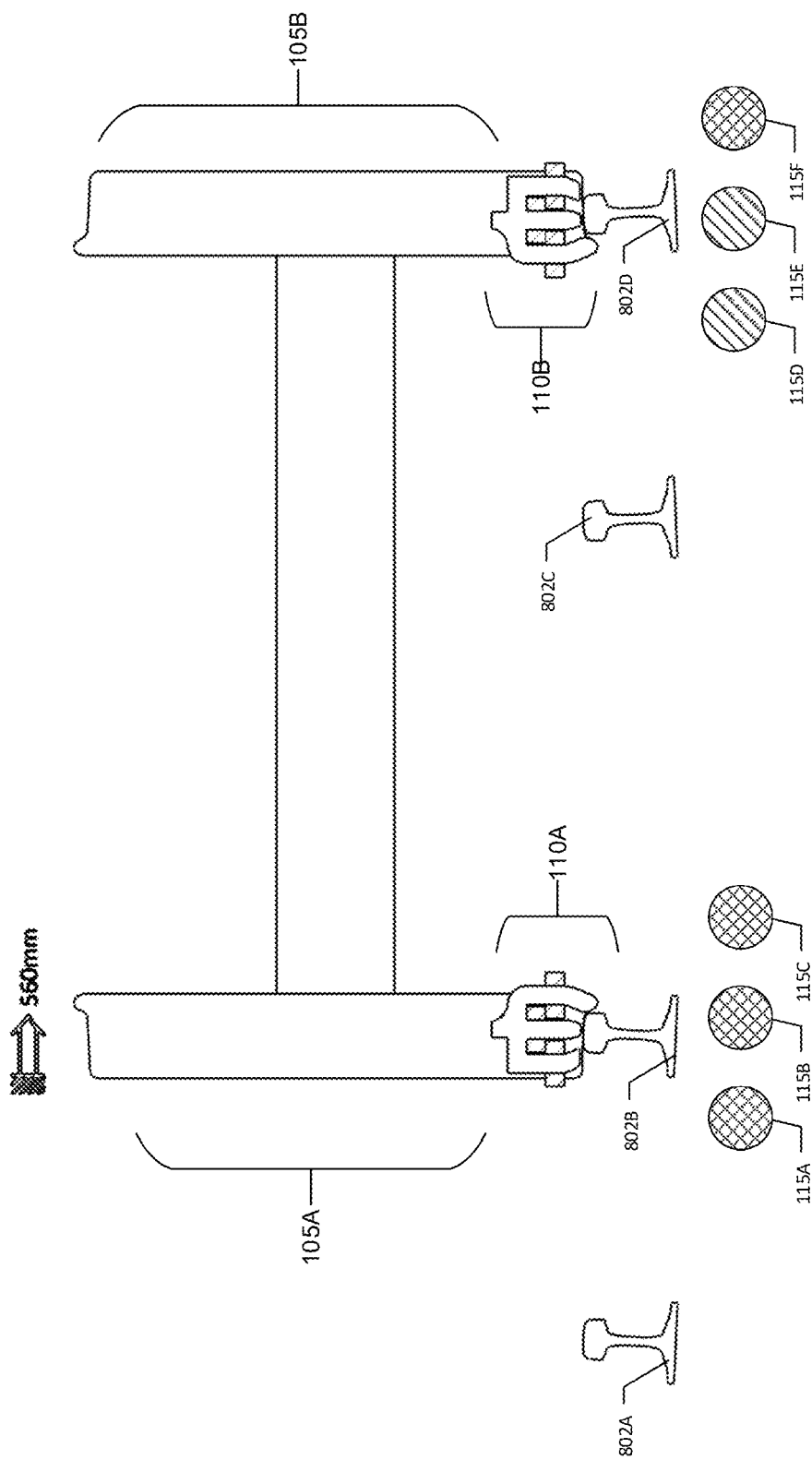
FIG. 5G illustrates a planar view of a bogie assembly positioned on a rail assembly, as shown from a rear perspective.

FIG. 5G illustrates a planar view of the bogie assembly 100 positioned on the rail assembly 200, as shown from a rear perspective. The coil power states 115A, 115B, 115C are partially powered. The coil power states 115D, 115E are fully powered. The coil power state 115F is partially powered.

Figure 5H:
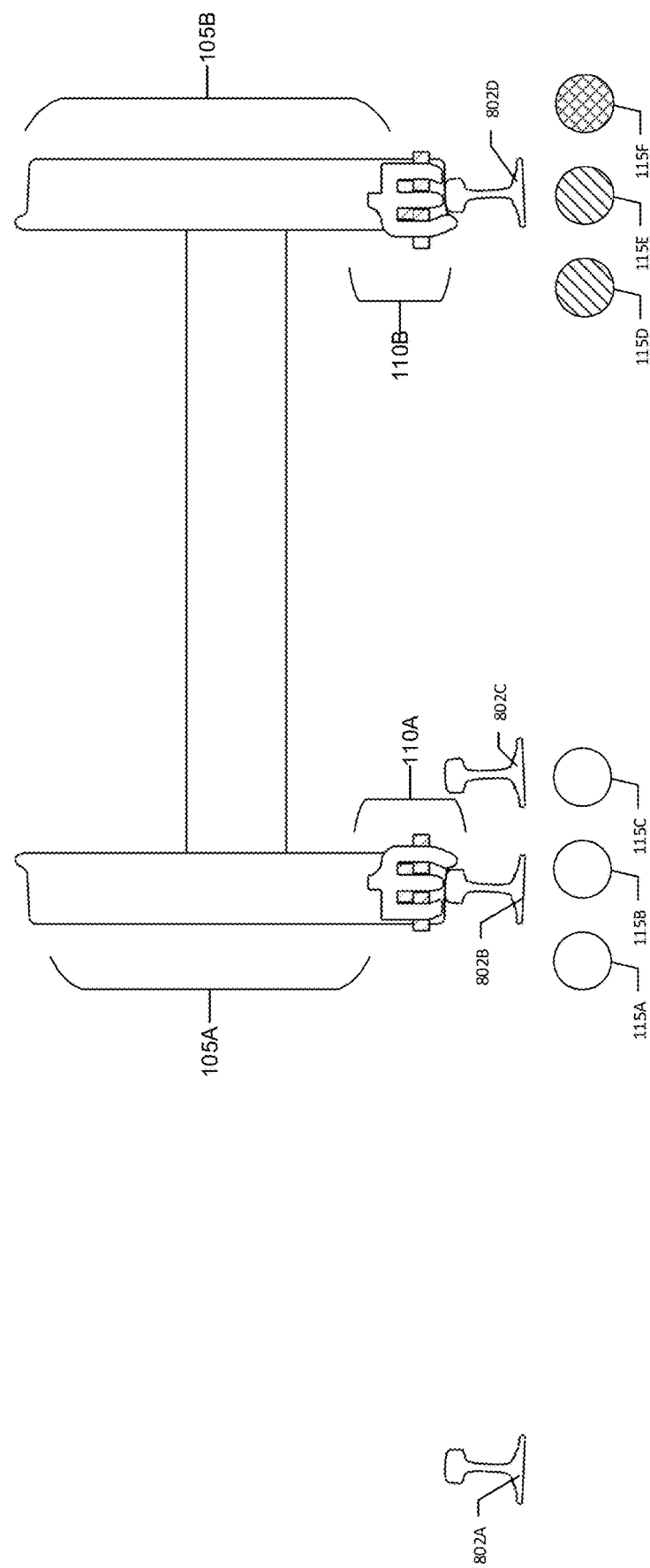
FIG. 5H illustrates a planar view of a bogie assembly positioned on a rail assembly, as shown from a rear perspective.

FIG. 5H illustrates a planar view of the bogie assembly 100 positioned on the rail assembly 200, as shown from a rear perspective. The coil power states 115A, 115B, 115C are not powered. The coil power states 115D, 115E are fully powered. The coil power state 115F is partially powered.

Figure 5I:
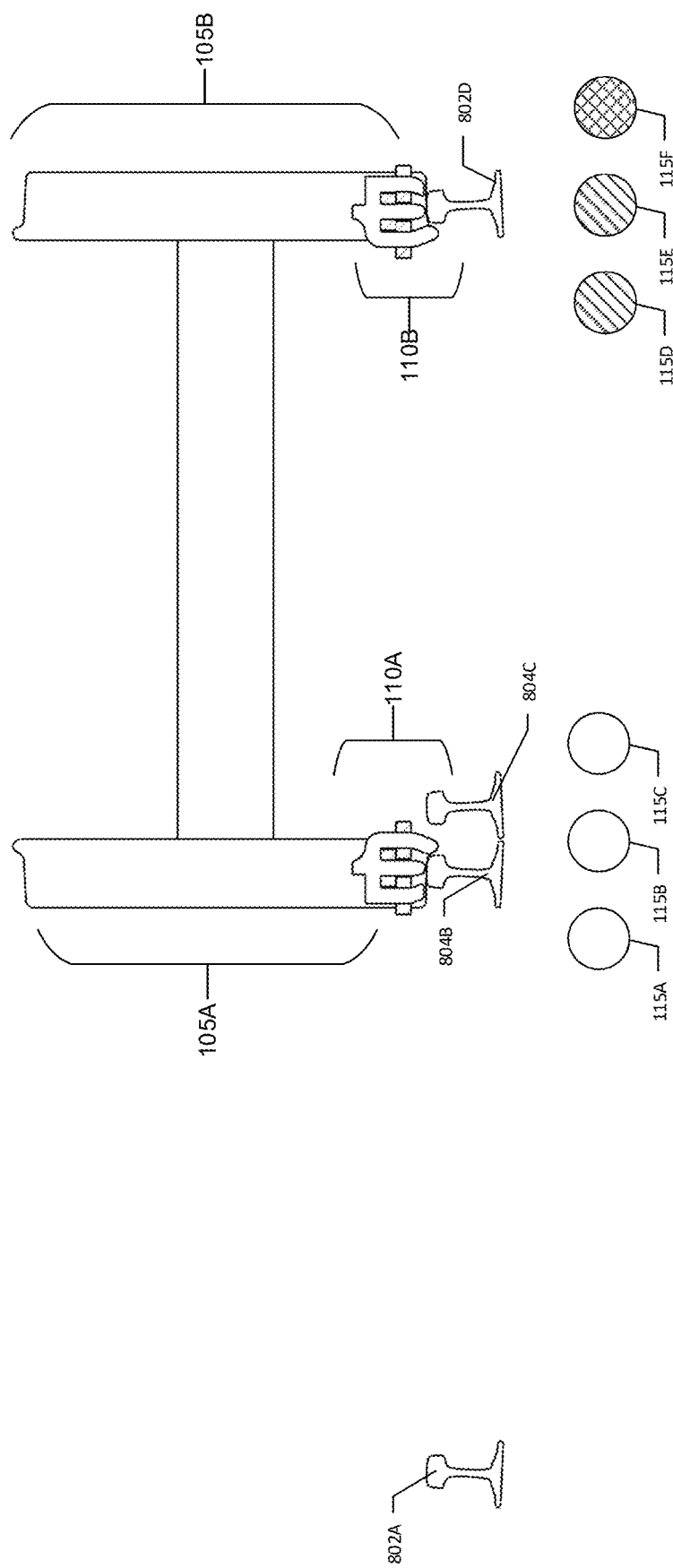
FIG. 5I illustrates a planar view of a bogie assembly positioned on a rail assembly, as shown from a rear perspective.

FIG. 5I illustrates a planar view of the bogie assembly 100 positioned on the rail assembly 200, as shown from a rear perspective. The coil power states 115A, 115B, 115C are not powered. The coil power states 115D, 115E are fully powered. The coil power state 115F is partially powered.

Figure 5J:
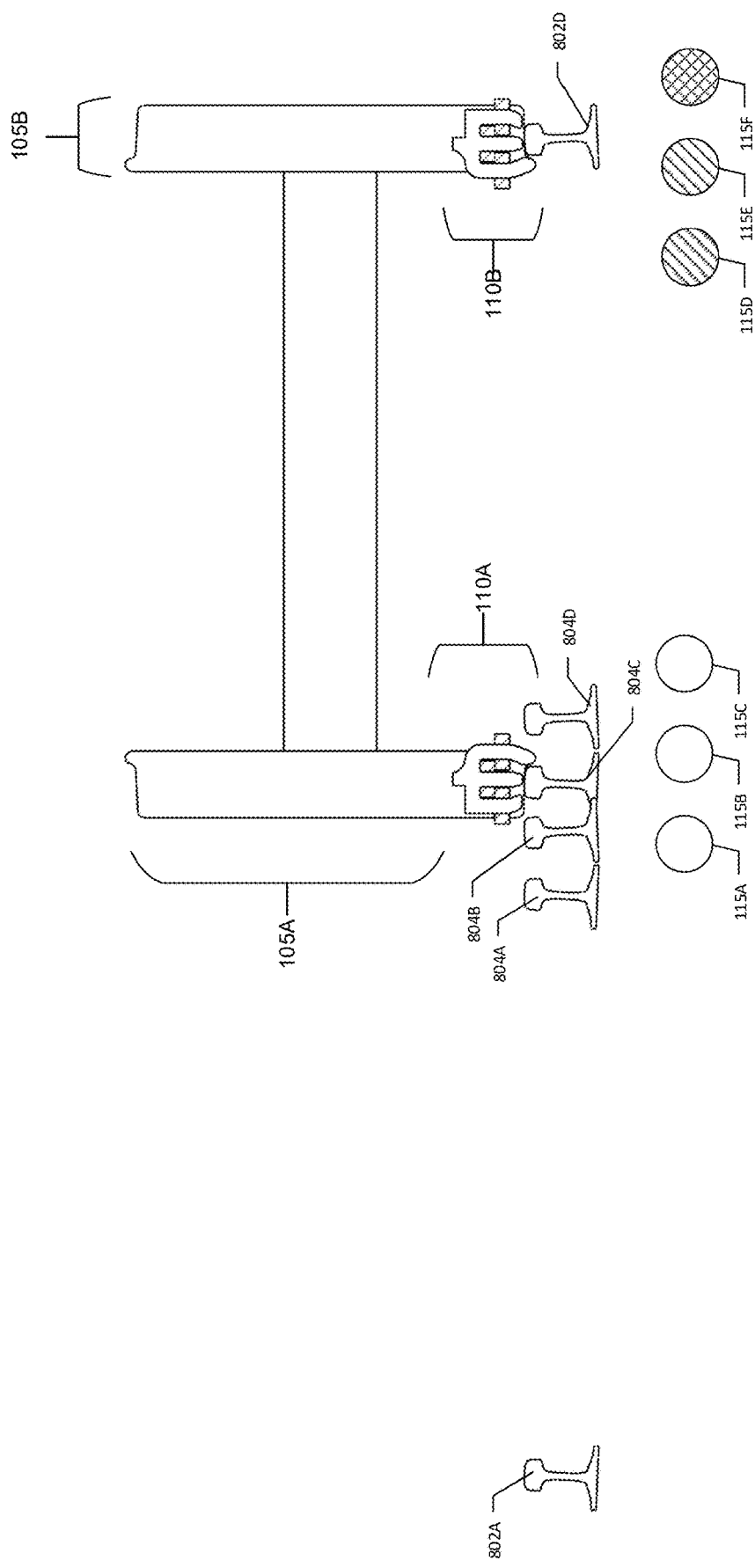
FIG. 5J illustrates a planar view of a bogie assembly positioned on a rail assembly, as shown from a rear perspective.

FIG. 5J illustrates a planar view of the bogie assembly 100 positioned on the rail assembly 200, as shown from a rear perspective. The coil power states 115A, 115B, 115C are not powered. The coil power states 115D, 115E are fully powered. The coil power state 115F is partially powered.

Figure 6A:
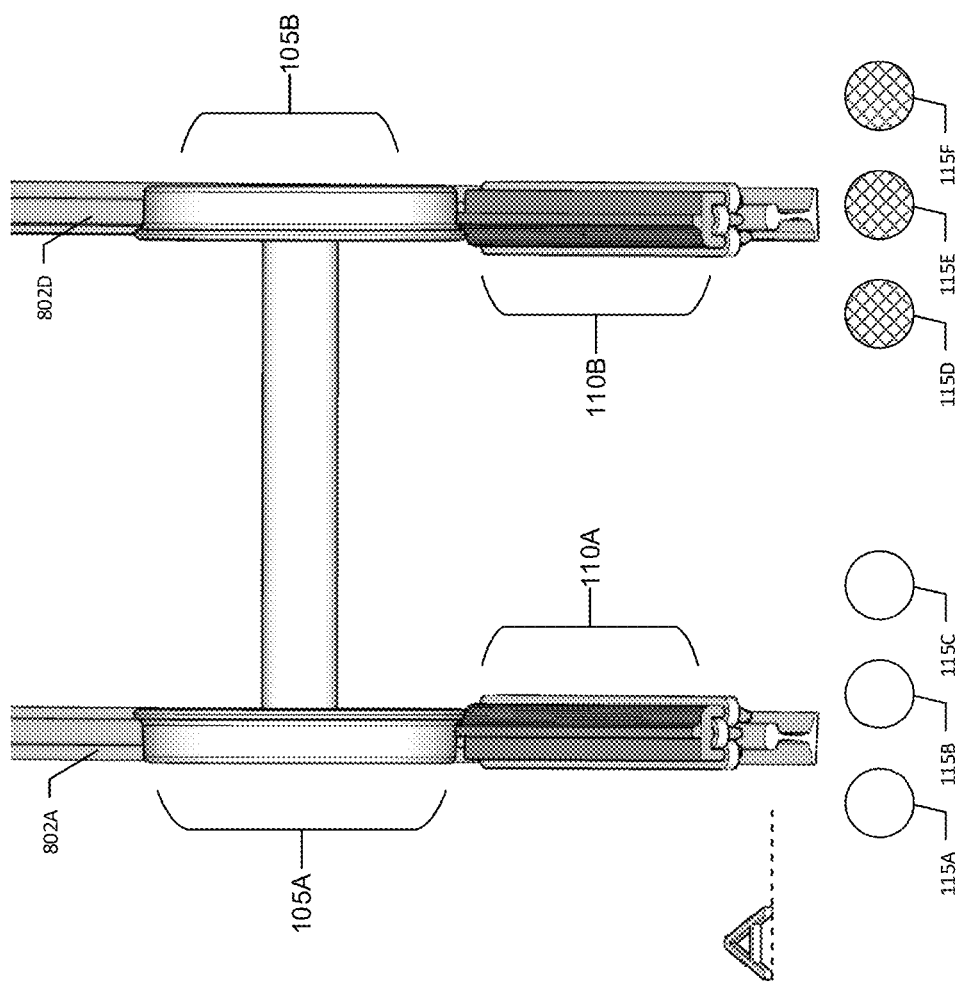
FIG. 6A illustrates a perspective view of a bogie assembly positioned on a rail assembly.

FIG. 6A illustrates a perspective view of the bogie assembly 100 positioned on the rail assembly 200. The coil power states 115A, 115B, 115C are not powered. The coil power states 115D, 115E, 115F are partially powered.

Figure 6B:
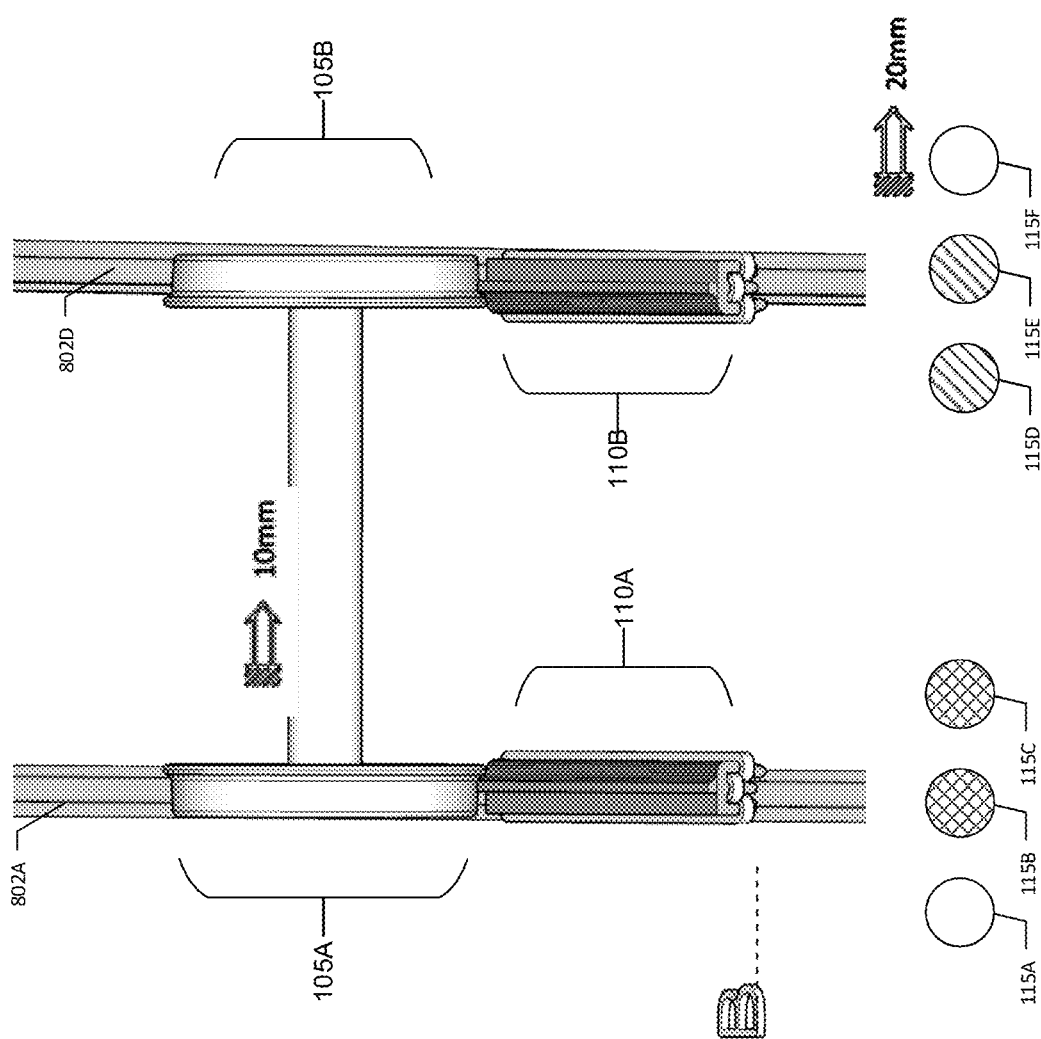
FIG. 6B illustrates a perspective view of a bogie assembly positioned on a rail assembly.

FIG. 6B illustrates a perspective view of the bogie assembly 100 positioned on the rail assembly 200. The coil power state 115A is not powered. The coil power states 110B, 115C are partially powered. The coil power states 115D, 115E are fully powered. The coil power state 115F is not powered.

Figure 6C:
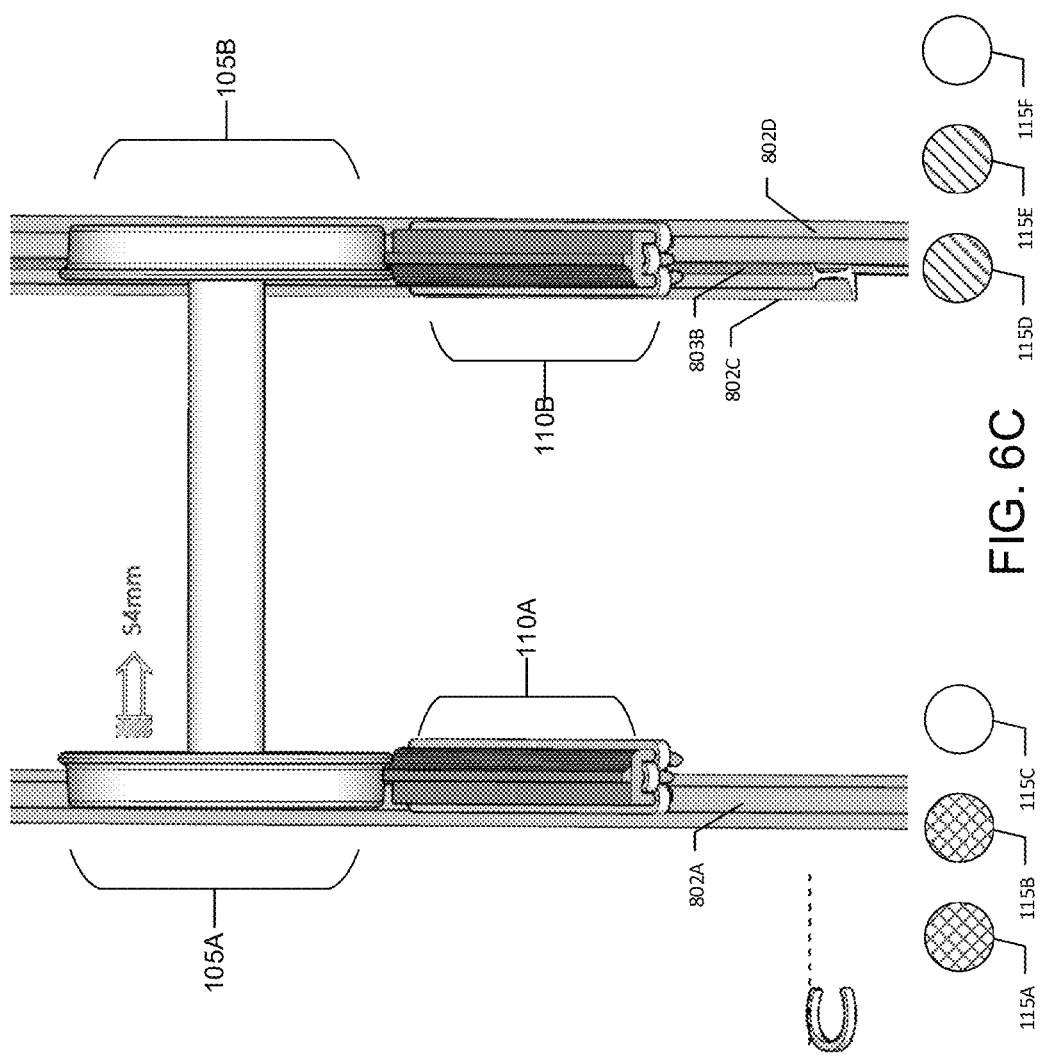
FIG. 6C illustrates a perspective view of a bogie assembly positioned on a rail assembly.

FIG. 6C illustrates a perspective view of the bogie assembly 100 positioned on the rail assembly 200. The coil power state 115A, 115B is partially powered. The coil power state 115C is not powered. The coil power states 115D, 115E are fully powered. The coil power state 115F is not powered.

Figure 6D:
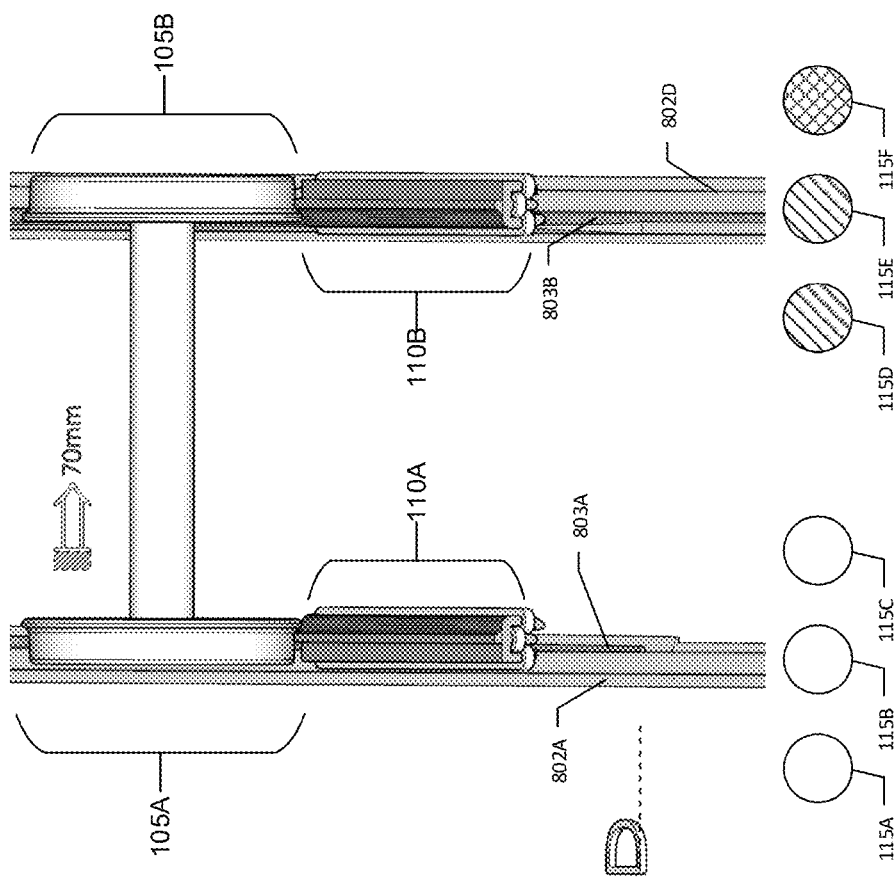
FIG. 6D illustrates a perspective view of a bogie assembly positioned on a rail assembly.

FIG. 6D illustrates a perspective view of the bogie assembly 100 positioned on the rail assembly 200. The coil power states 115A, 115B, 115C are not powered. The coil power states 115D, 115E are fully powered. The coil power state 115F is partially powered.

Figure 6E:
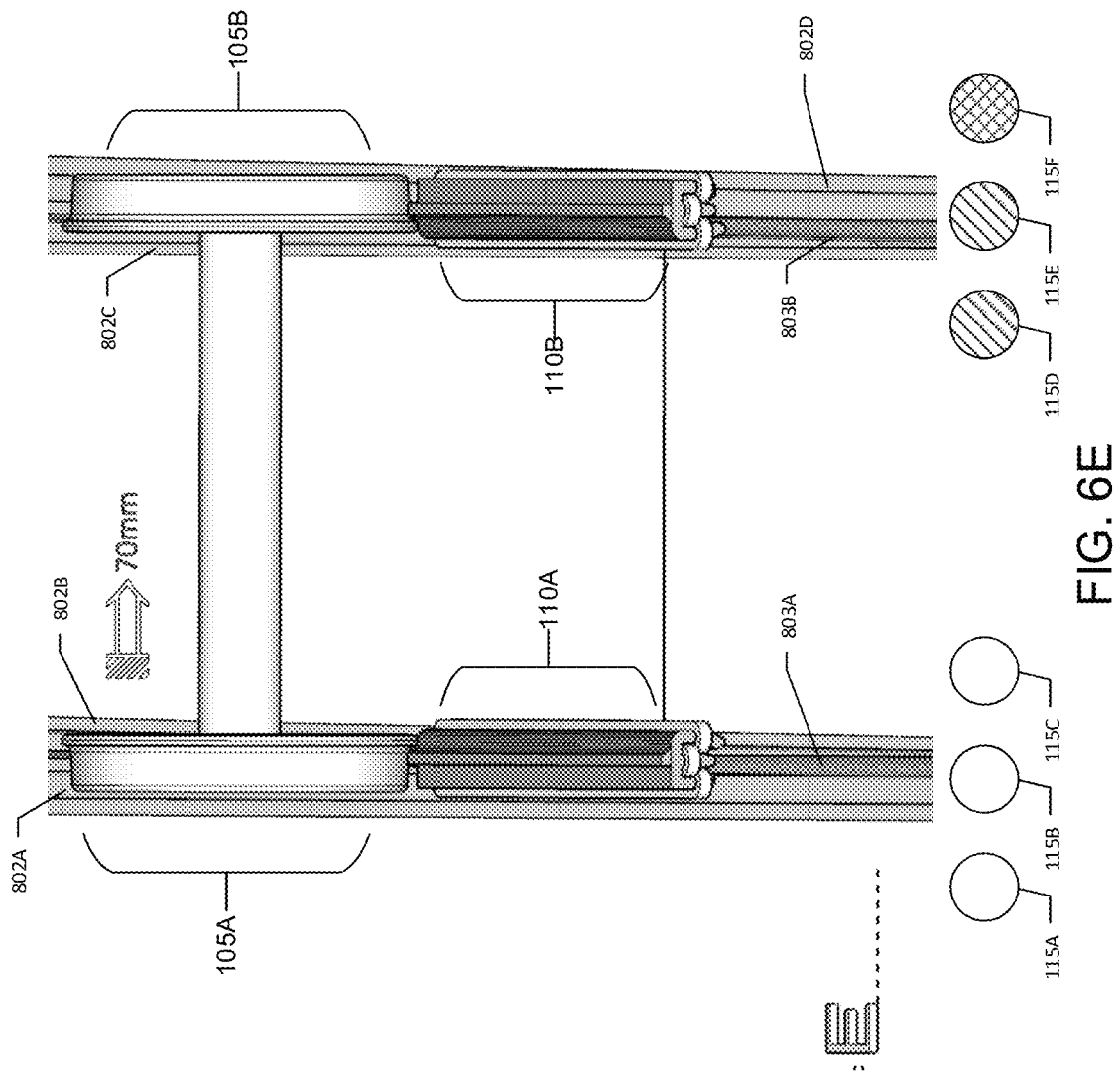
FIG. 6E illustrates a perspective view of a bogie assembly positioned on a rail assembly.

FIG. 6E illustrates a perspective view of the bogie assembly 100 positioned on the rail assembly 200. The coil power states 115A, 115B, 115C are not powered. The coil power states 115D, 115E are fully powered. The coil power state 115F is partially powered.

Figure 6F:
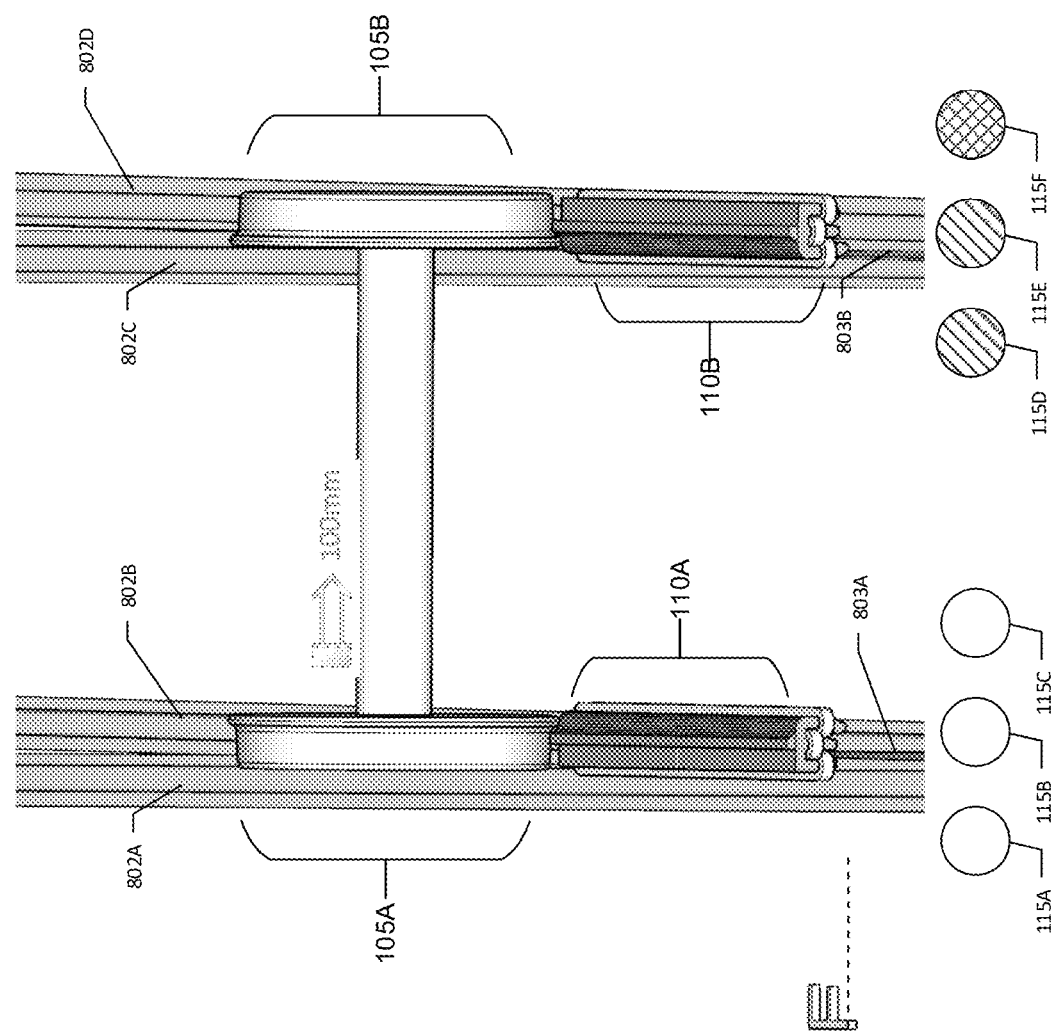
FIG. 6F illustrates a perspective view of a bogie assembly positioned on a rail assembly.

FIG. 6F illustrates a perspective view of the bogie assembly 100 positioned on the rail assembly 200. The coil power states 115A, 115B, 115C are not powered. The coil power states 115D, 115E are fully powered. The coil power state 115F is partially powered.

Figure 6G:
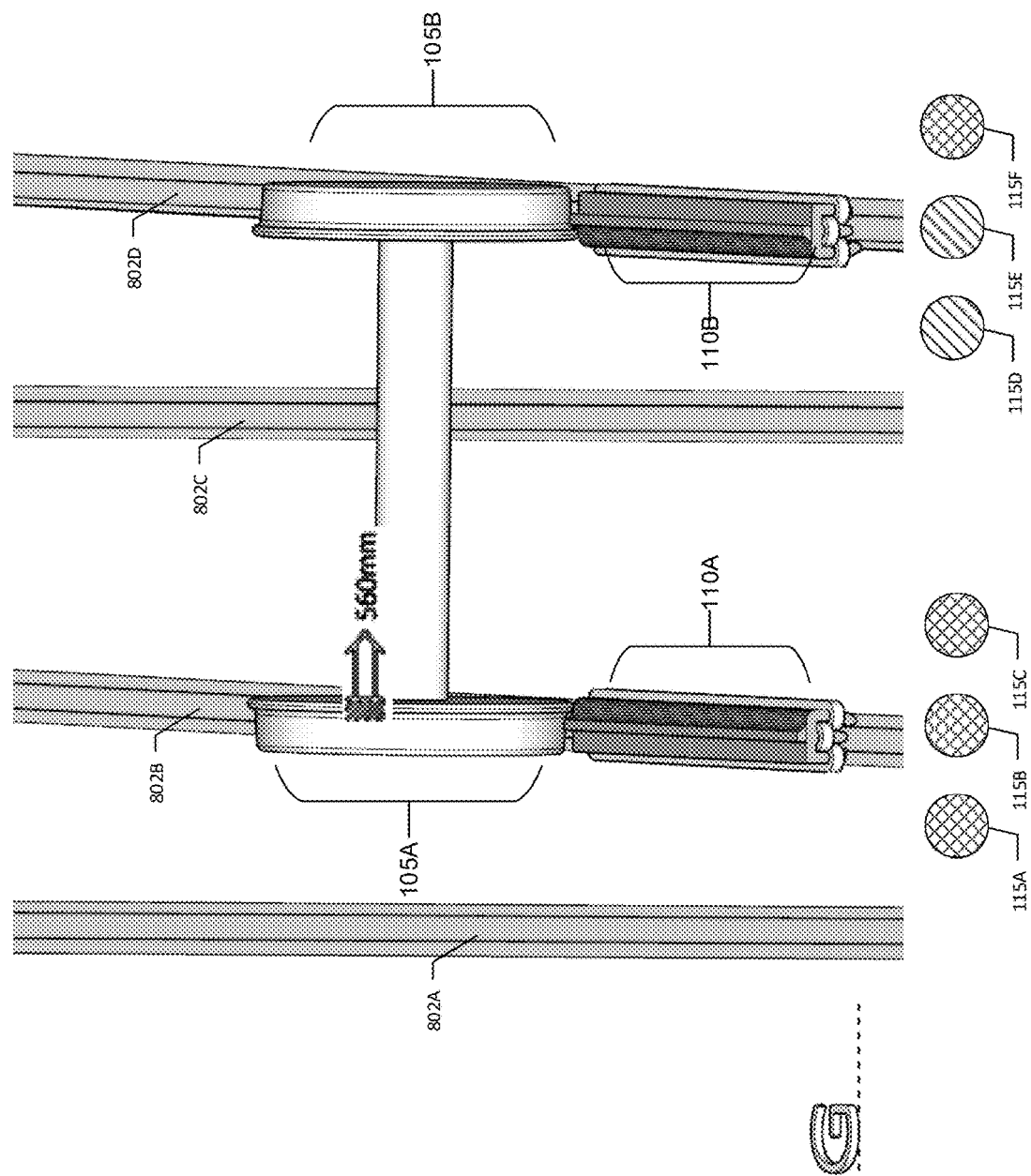
FIG. 6G illustrates a perspective view of a bogie assembly positioned on a rail assembly.

FIG. 6G illustrates a perspective view of the bogie assembly 100 positioned on the rail assembly 200. The coil power states 115A, 115B, 115C are partially powered. The coil power states 115D, 115E are fully powered. The coil power state 115F is partially powered.

Figure 6H:
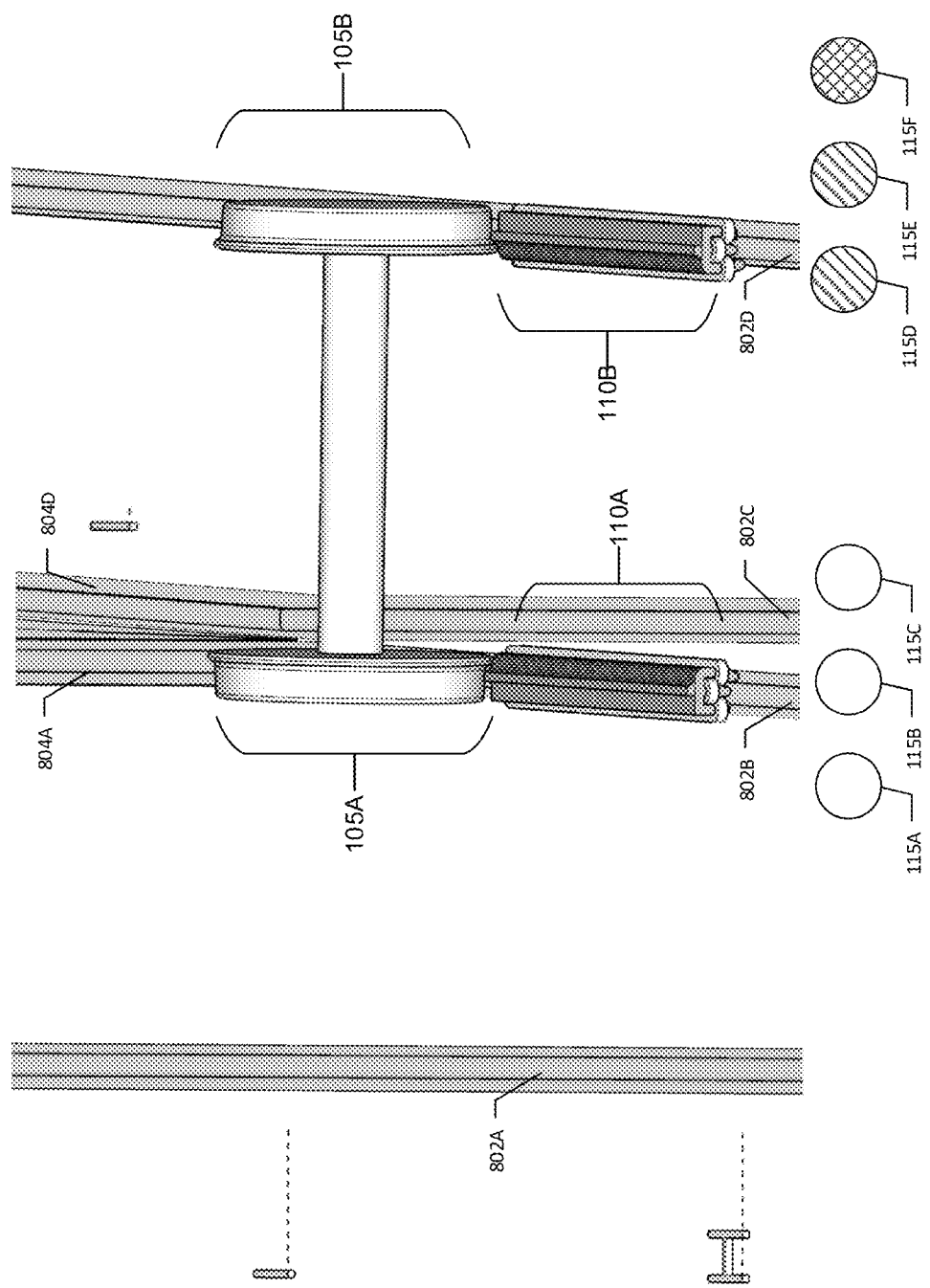
FIG. 6H illustrates a perspective view of a bogie assembly positioned on a rail assembly.
Figure 61:
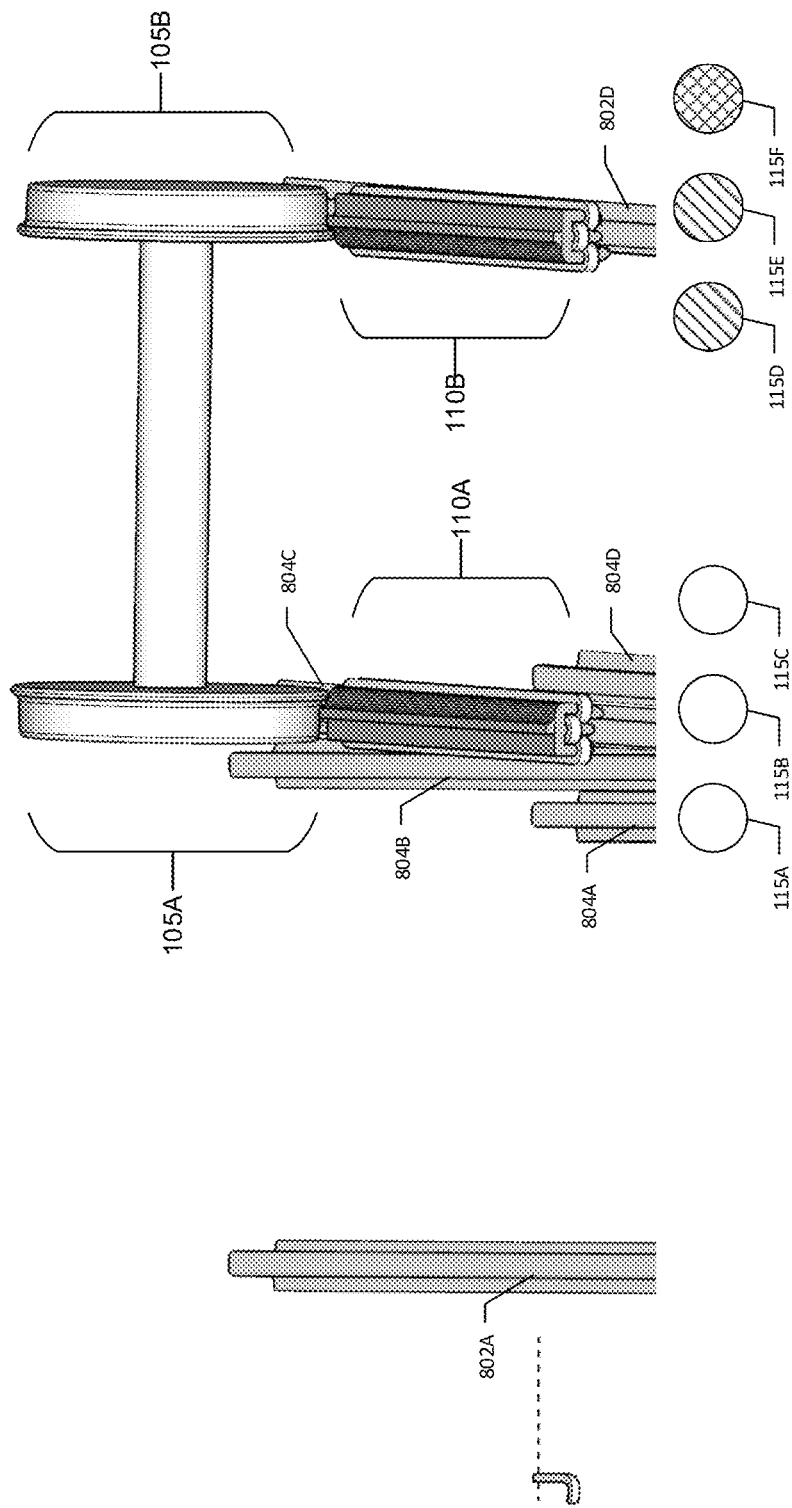

FIG. 6H illustrates a perspective view of the bogie assembly 100 positioned on the rail assembly 200. The coil power states 115A, 115B, 115C are not powered. The coil power states 115D, 115E are fully powered. The coil power state 115F is partially powered.

FIG. 6I illustrates a perspective view of the bogie assembly 100 positioned on the rail assembly 200. The coil power states 115A, 115B, 115C are not powered. The coil power states 115D, 115E are fully powered. The coil power state 115F is partially powered.

Figure 7:
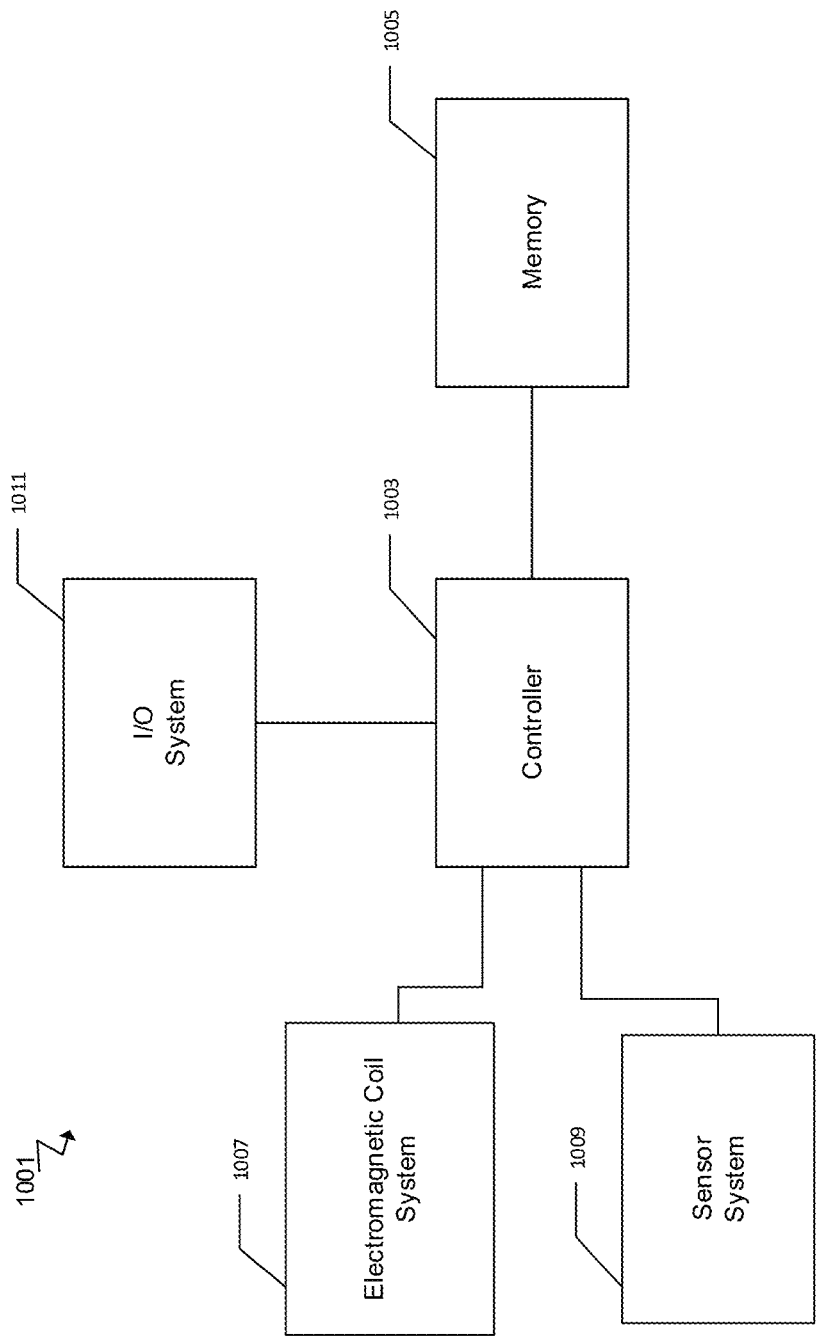
FIG. 7 is a block diagram of a system operable for use with electromagnetic engines.

FIG. 7 is a block diagram of a system 1001 operable for use with the electromagnetic engines 110A, 110B. One of skill in the art will appreciate that the electromagnetic engine 110A may require a hardware and software solution, similar to the system 1001, in order to manage the operation of the electromagnetic engine 110A. The system 1001 may be configured to operate within the electromagnetic engine 110A, within the bogie assembly 100, on a server, in the cloud, or combination thereof. For example, a deployment within a deep tunnel may require stand-alone implementations where much of the logic within the system 1001 is resident on the bogie assembly 100. In contrast, a deployment on standard, above-ground rails may have an implementation of the system 1001 that utilizes remote processing since communication is accessible and reliable.

A controller 1003 may be operatively connected a memory 1005, an electromagnetic coil system 1007, a sensor system 1009, and an I/O system 1011. The controller 1003 may be implemented in hardware, software, or combination thereof. One of skill in the art will appreciate how an operating environment may affect selection of a controller. For example, one of skill in the art may implement the controller 1003 as an ASIC or as software running on a general-purpose computer (e.g., an x86 machine).

In one aspect, the controller 1003 may manage the coils 115A, 115B, 115C, 115D, 115E, 115F via the electromagnetic coil system 1007. For instance, the controller 1003 may so communicate with the electromagnetic coil system 1007 in order to ascertain the presence and location of the rail 125A. In another aspect, the controller 1003 may perform guidance control by exciting one or more of the coils 115A, 115B, 115C, 115D, 115E, 115F to traverse the bogie assembly 100 left or right. In still another aspect, the controller 1003 may perform said guidance control to navigate the frog assembly 804.

The sensor system 1009 may be operable to managing the sensors 120A, 120B, 120C, 120D, 120E, 120F. The sensor system 1009 may be configured to perform triangulation based on a number of observations. In one aspect, the controller 1003 may instruct the sensor system 1009 to gather observations from the sensor 120A and the sensor 120C in order to view a portion of the rail 125A from two discrete perspectives.

The memory 1005 is operable to store instructions, data, information, etc. in either volatile or non-volatile storage. The processes described herein may be configured to be stored in the memory 1005, in one aspect. In another aspect, the processes described herein may be encoded into the controller 1003 (e.g., as an ASIC). One of skill in the art will appreciate that the memory 1005 may take many forms in a commercial implementation of the disclosed solution.

The I/O system 1011 is generally operable to communicate information within the system 1001 itself or to a remote system (e.g., cloud computing environments). In one aspect, the I/O system 1011 may be operable to gather GPS location data from cellular-based triangulation, satellite, or combination thereof. In another aspect, the I/O system 1011 may be a 5G modem operable to communicate wirelessly with the Internet.

The I/O system 1011 may be connected to other implementations of the system 1001 such that the system 1001 may be considered a node within a larger system of many implementations of the system 1001. For example, a first bogie assembly may communicate guidance data to a second bogie assembly via each I/O system 1011 of the bogie assemblies, respectively. Such communication may be over the Internet or via a local area network (e.g., ethernet, Bluetooth, WIFI, etc.). Further, such communication may be for additional information beyond guidance (e.g., safety, weather, traffic, passenger load, etc.).

The electromagnetic coil system 1007 is generally operable to manage the coils 115A, 115B, 115C, 115D, 115E, 115F. Further, the electromagnetic coil system 1007 may manage the parameters of the electromagnetic field (e.g., phase, power, etc.).

Figure 8A:
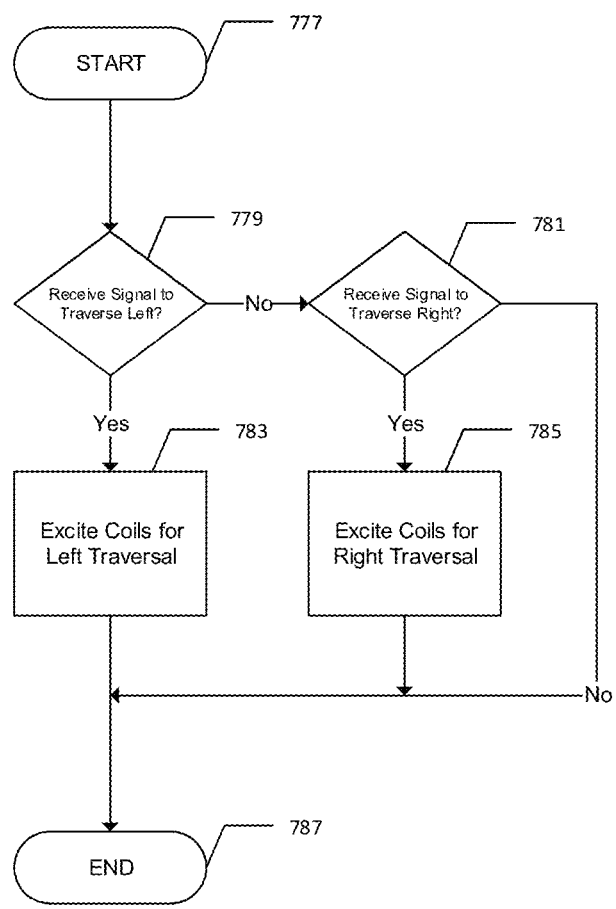
FIG. 8A illustrates a flowchart for a process operable to control a plurality of electromagnetic coils to traverse the rail assembly.

FIG. 8A illustrates a process 702 for the operation of the electromagnetic engines 110A, 110B. In one aspect, the process 702 is operable to being utilized within the system 1001 described above. Further, the process 702 may execute within the controller 1003 as an active process managed by an operating system. The process 702 may have instructions stored in the memory 1005 that persist after a power-collapse event, i.e., the memory 1005 may have non-volatile storage.

The process 702 begins at the start block 777 and proceeds to the decision block 779. For the purpose of explanation for FIGS. 8A through 8D, the directions left and right are with respect to the direction of travel, viewing the bogie assembly 100 from the rear, looking ahead with respect to the track. At the decision block 779, a signal may be received to traverse the bogie assembly 100 to the left. If the signal to traverse left is received, the process 702 proceeds along the YES branch to the block 783 wherein the coils for left traversal are excited. In one aspect, the coils 115A, 115B, 115D, 115E are excited, thus causing a magnetic force to be generated between the electromagnetic engines 110A, 110B and the rails 125A, 125B, respectively. In one aspect, the magnetic force 160A may be generated by the coils 115D, 115E. Likewise, a similar force (not shown) would be generated by the coils 115A, 115B. In one aspect, the electromagnetic coil system 1007 is utilized to manage the power of the coils 115A, 115B, 115D, 115E. The process 702 then proceeds to the end block 787 and terminates.

Returning to the decision block 779, if no signal to traverse left has been received, the process 702 proceeds along the NO branch to the decisions block 781. At the decision block 781, the process 702 determines whether or not to traverse the bogie 100 to the right based on a signal received at the electromagnetic engines 110A, 110B. In one aspect, the I/O system 1011 may be utilized to receive the signal. If the determination is positive to traverse right, the process 702 proceeds along the YES branch to the block 785.

At the block 785, the process 702 excites the coils to shift or traverse the bogie assembly 100 to the right. In one aspect, the coils 115B, 115C, 115E, 115F may be excited by the process 702 (e.g., as embodied in hardware having a real-time operating system). The resulting magnetic force causes the wheel assemblies 105A, 105B to shift right. In one aspect, the magnetic force 160B is generated by the coils 115E, 115F. Similarly, the coils 115B, 115C generate a like magnetic force (not shown). The process 702 then proceeds to the end block 787 and terminates.

One of skill in the art will appreciate that the signal to traverse left or right may be sent from a remote processor and received at the electromagnetic engines 110A, 110B, in one aspect. Further, the received signal may be received by the I/O system 1011 and processed by the controller 1003. For example, the controller 1003 may be disposed on the bogie assembly 100 near the truck such that technicians and operators may more readily access electronic components. In another aspect, the controller 1003 may be substantially co-located with the electromagnetic engines 110A, 110B. One of skill in the art will appreciate, from a high level, that the electromagnetic engines 110A, 110B may require some form of controller or processor to manage: the power levels of the coils 115A, 115B, 115C, 115D, 115E, 115F (e.g., the electromagnetic coil system 1007), the safety control algorithms (e.g., the controller 1003 and the memory 1005), the sensors 120A, 120B, 120C, 120D, 120E, 120F (e.g., the sensor system 1009), the coordination of the plurality of electromagnetic engines 110A, 110B acting in concert, etc. Such a controller or processor may be coupled with memory, user interface equipment, volatile storage, non-volatile storage, I/O interfaces, etc.

Figure 8B:
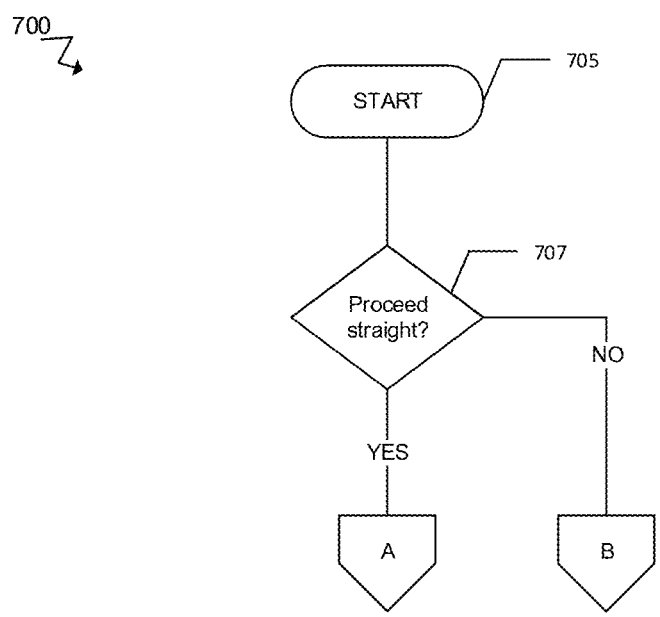
FIG. 8B illustrates a flowchart for a process operable to control a plurality of electromagnetic coils to traverse the rail assembly.

FIG. 8B illustrates a flowchart for a process 700 operable to control the plurality of electromagnetic coils to traverse the rail assembly 200. The process 700 starts at the start block 705 and proceeds to the decision block 707 wherein a decision is made to proceed straight through the rail assembly 200 or to take the turnout path on the rail assembly 200. In one aspect, the decision to proceed straight is managed by the controller 1003 upon receiving the signal via the I/O system 1011. The straight path leads to the left of FIGS. 2A-2I in a substantially straight direction. Further, the straight path corresponds to FIGS. 3A-3J and FIGS. 4A-4I. The turnout path leads to the right of FIGS. 2A-2I. Further, the turnout path corresponds to FIGS. 5A-5J and FIGS. 6A-6I.

Figure 8C:
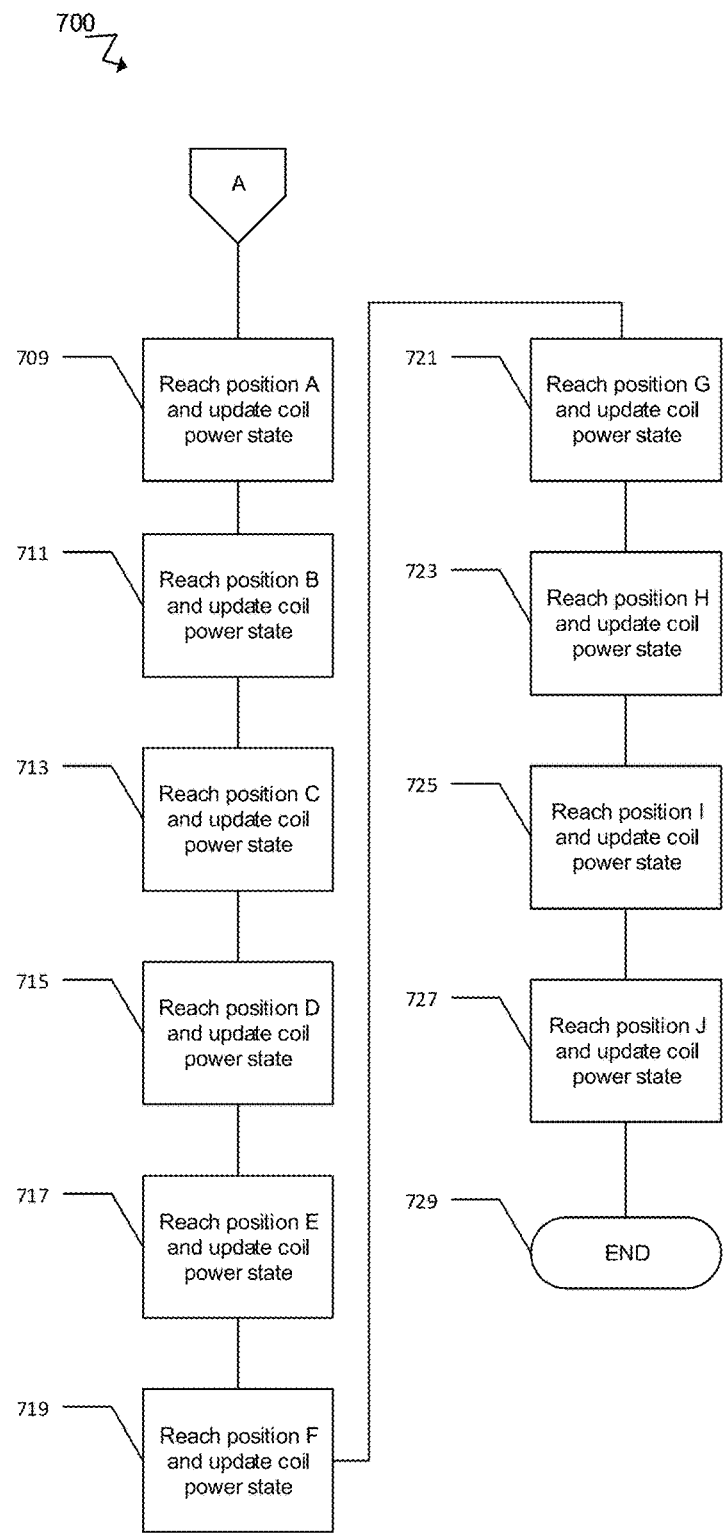
FIG. 8C illustrates a flowchart for a process operable to control a plurality of electromagnetic coils to traverse the rail assembly.

If the straight path is selected, the process 700 proceeds to the callout block A and proceeds to FIG. 8C. Returning to the decision block 700, if the turnout path is selected, the process 700 proceeds to the callout block B and proceeds to FIG. 8D.

FIG. 8C illustrates a flowchart for the process 700 operable to control the plurality of electromagnetic coils disposed in the electromagnetic engines 110A, 110B in order to traverse the rail assembly 200 along the straight path of the rail assembly 200. In one aspect, the controller 1003 and the electromagnetic coil system 1007 operate in conjunction to manage the power levels of the coils 115A, 115B, 115C, 115D, 115E, 115F. The process 700 resumes at callout block A and proceeds to the block 709. At the block 709, the power states as discussed in FIG. 3A and FIG. 4A are set to the coils 115A, 115B, 115C, 115D, 115E, 115F.

The process 700 proceeds to the block 711. At the block 711, the power states as discussed in FIG. 3B and FIG. 4B are set to the coils 115A, 115B, 115C, 115D, 115E, 115F.

The process 700 proceeds to the block 713. At the block 713, the power states as discussed in FIG. 3C and FIG. 4C are set to the coils 115A, 115B, 115C, 115D, 115E, 115F.

The process 700 proceeds to the block 715. At the block 715, the power states as discussed in FIG. 3D and FIG. 4D are set to the coils 115A, 115B, 115C, 115D, 115E, 115F.

The process 700 proceeds to the block 717. At the block 717, the power states as discussed in FIG. 3E and FIG. 4E are set to the coils 115A, 115B, 115C, 115D, 115E, 115F.

The process 700 proceeds to the block 719. At the block 719, the power states as discussed in FIG. 3F and FIG. 4F are set to the coils 115A, 115B, 115C, 115D, 115E, 115F.

The process 700 proceeds to the block 721. At the block 721, the power states as discussed in FIG. 3G and FIG. 4G are set to the coils 115A, 115B, 115C, 115D, 115E, 115F.

The process 700 proceeds to the block 723. At the block 723, the power states as discussed in FIG. 3H and FIG. 4H are set to the coils 115A, 115B, 115C, 115D, 115E, 115F.

The process 700 proceeds to the block 725. At the block 725, the power states as discussed in FIG. 3I are set to the coils 115A, 115B, 115C, 115D, 115E, 115F.

The process 700 proceeds to the block 727. At the block 727, the power states as discussed in FIG. 3J and FIG. 4I are set to the coils 115A, 115B, 115C, 115D, 115E, 115F. The process 700 proceeds to the end block 729 and terminates.

Figure 8D:
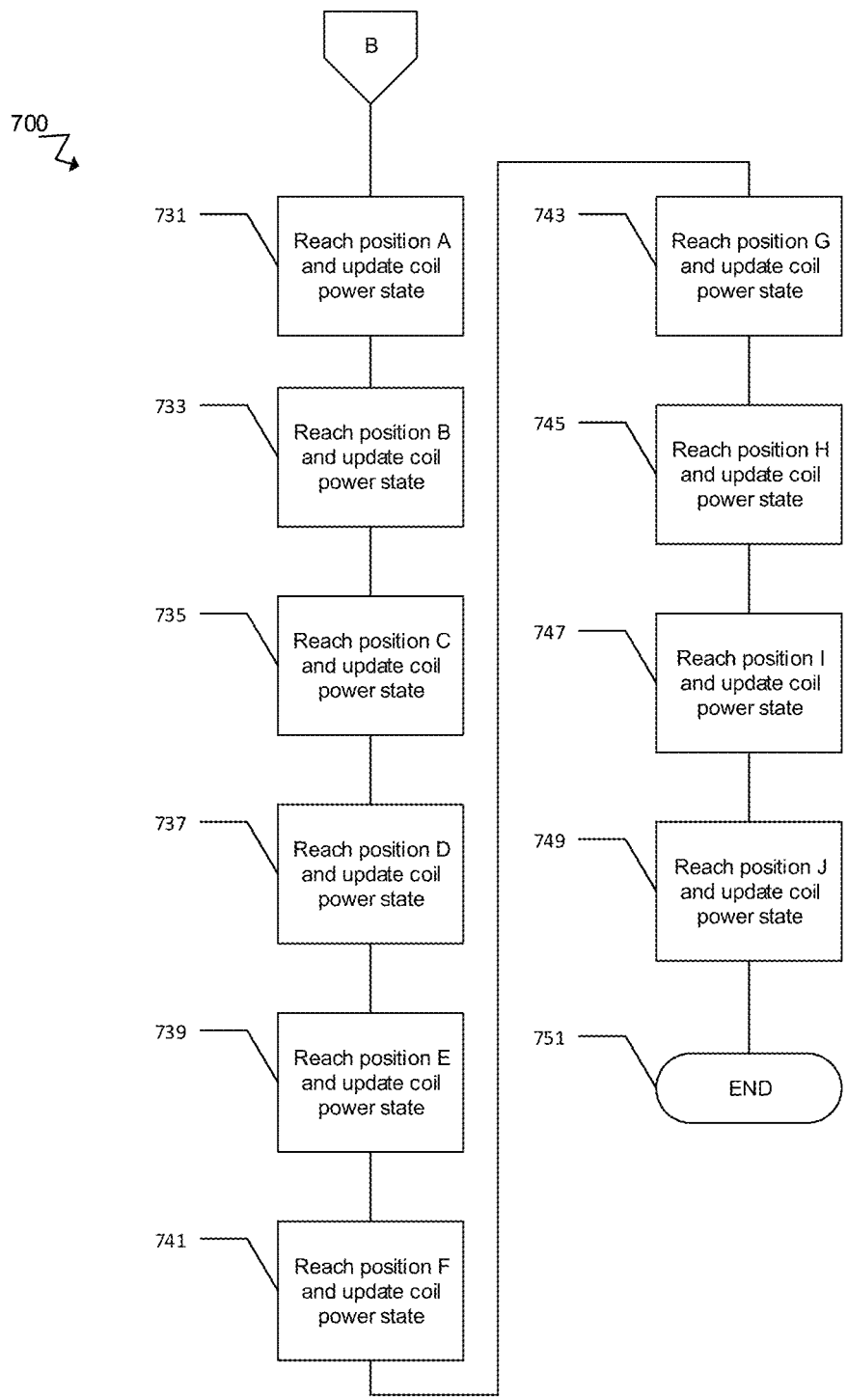

FIG. 8D illustrates a flowchart for the process 700 operable to control the plurality of electromagnetic coils belonging to the electromagnetic engines 110A, 110B in order to traverse the rail assembly 200 via the turnout path of the rail assembly 200. In one aspect, the decision to proceed straight is managed by the controller 1003 upon receiving the signal via the I/O system 1011. The process 700 resumes at callout block B and proceeds to the block 731. At the block 731, the power states as discussed in FIG. 5A and FIG. 6A are set to the coils 115A, 115B, 115C, 115D, 115E, 115F.

The process 700 proceeds to the block 733. At the block 733, the power states as discussed in FIG. 5B and FIG. 6B are set to the coils 115A, 115B, 115C, 115D, 115E, 115F.

The process 700 proceeds to the block 735. At the block 735, the power states as discussed in FIG. 5C and FIG. 6C are set to the coils 115A, 115B, 115C, 115D, 115E, 115F.

The process 700 proceeds to the block 737. At the block 737, the power states as discussed in FIG. 5D and FIG. 6D are set to the coils 115A, 115B, 115C, 115D, 115E, 115F.

The process 700 proceeds to the block 739. At the block 739, the power states as discussed in FIG. 5E and FIG. 6E are set to the coils 115A, 115B, 115C, 115D, 115E, 115F.

The process 700 proceeds to the block 741. At the block 741, the power states as discussed in FIG. 5F and FIG. 6F are set to the coils 115A, 115B, 115C, 115D, 115E, 115F.

The process 700 proceeds to the block 743. At the block 743, the power states as discussed in FIG. 5G and FIG. 6G are set to the coils 115A, 115B, 115C, 115D, 115E, 115F.

The process 700 proceeds to the block 745. At the block 745, the power states as discussed in FIG. 5H and FIG. 6H are set to the coils 115A, 115B, 115C, 115D, 115E, 115F.

The process 700 proceeds to the block 747. At the block 747, the power states as discussed in FIG. 5I are set to the coils 115A, 115B, 115C, 115D, 115E, 115F.

The process 700 proceeds to the block 749. At the block 749, the power states as discussed in FIG. 5J and FIG. 6I are set to the coils 115A, 115B, 115C, 115D, 115E, 115F.

One of skill in the art will appreciate that the power states illustrated with references 115A, 115B, 115C, 115D, 115E, 115F do not replace the coils 115A, 115B, 115C, 115D, 115E, 115F but rather are used for illustrative purposes. As described, the power states have been discussed as having full power, partial power, or no power. However, one of skill in the art will appreciate that such full cf. partial power levels are approximate and may be relative to other power levels. For example, partial power may be less than full power. Further, partial may be more than no power. Such power levels may be more or less discrete than so described herein, especially given the analog nature of power control in commercial deployments.

Figure 9:
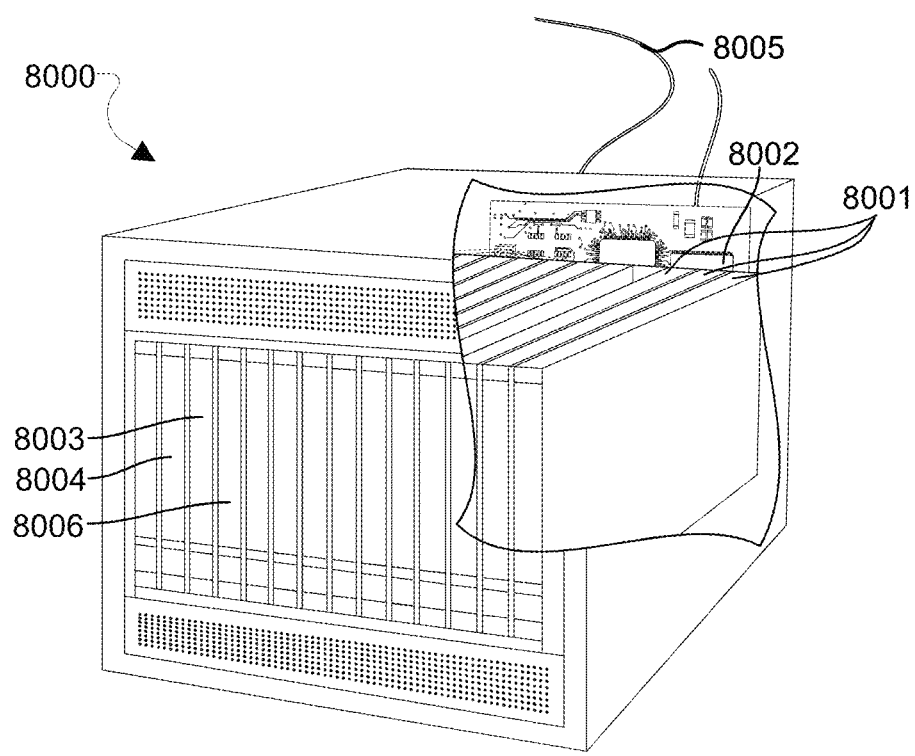
FIG. 9 is a block diagram illustrating a server suitable for use with the various aspects described herein.

FIG. 9 is a diagram illustrating a server 8000 suitable for use with the various aspects described herein. In one aspect, the server 8000 may be connected to the electromagnetic engines 110A, 110B in order to measure, store, and process data collected by the sensors 120A, 120B, 120C, 120D, 120E, 120F. Further, the processes 700, 702 may be stored and executed by the server 8000. In another aspect, the server 8000 may control the power levels applied to the coils 115A, 115B, 115C, 115D, 115E, 115F.

The server 8000 may include one or more processor assemblies 8001 (e.g., an x86 processor) coupled to volatile memory 8002 (e.g., DRAM) and a large capacity nonvolatile memory 8004 (e.g., a magnetic disk drive, a flash disk drive, etc.). As illustrated in the instant figure, processor assemblies 8001 may be added to the server 8000 by inserting them into the racks of the assembly. The server 8000 may also include an optical drive 8006 coupled to the processor 8001. The server 8000 may also include a network access interface 8003 (e.g., an ethernet card, WIFI card, etc.) coupled to the processor assemblies 8001 for establishing network interface connections with a network 8005. The network 8005 may be a local area network, the Internet, the public switched telephone network, and/or a cellular data network (e.g., LTE, 5G, etc.).

One of skill in the art will appreciate that any of the components of the server 8000 may be designed into an implementation of the electromagnetic engine 110A. For example, the electromagnetic engines 110A, 110B may be controlled by a processor embedded into the either one of the electromagnetic engines 110A, 110B. In one aspect, the system 1001 may be implemented on the server 8000. In another aspect, the processor assemblies 8001 may be utilized as the controller 1003. In yet another aspect, the processor assemblies 8001 may a low-power ARM architecture chipset embedded into the bogie assembly 100, the electromagnetic engines 110A, 110B, or combination thereof. With cloud-computing and distributed processing, the processes 700, 702 may be executed within the electromagnetic engines 110A, 110B or a remote server (similar to the server 8000).

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

What is claimed is:

1. A plurality of electromagnetic engines configured to attach to a wheeled bogie assembly configured to operate on a rail assembly having a left rail, a left-center rail, a right-center rail, a right rail, and a frog assembly, the plurality of electromagnetic engines comprising:
   a first electromagnetic engine, the first electromagnetic engine having a first plurality of coils and being configured to being controlled by a controller;
   a second electromagnetic engine, the second electromagnetic engine having a second plurality of coils and being configured to being controlled by the controller; and
   the controller being configured to:
      receive a first signal;
      excite, based on the first signal, the first plurality of coils and the second plurality of coils according to a set of power states, the set of power states defining which of one or more coils within the first plurality of coils and the second plurality of coils are excited, wherein the first plurality of coils comprises a first coil, a second coil, and a third coil, wherein the second plurality of coils comprises a fourth coil, a fifth coil, and a sixth coil, wherein the first signal is a left traversal signal, and wherein the one or more coils excited comprises the first coil, the second coil, the fourth coil, and the fifth coil.

2. The plurality of electromagnetic engines of claim 1, wherein the one or more coils, when excited, are excited to a partial power level, the partial power level being less than a full power level.

3. The plurality of electromagnetic engines of claim 1, wherein the first signal is a straight signal to cause the wheeled bogie assembly to proceed straight via the left rail, the right-center rail, the frog assembly, or a combination thereof.

4. The plurality of electromagnetic engines of claim 1, wherein the first signal is a turnout signal to cause the wheeled bogie assembly to turnout via the right rail, the left-center rail, and the frog assembly, or a combination thereof.

5. The plurality of electromagnetic engines of claim 1, wherein the set of power states is configured to cause the wheeled bogie assembly to traverse between the left rail and the left-center rail via a first grooved profile section.

6. The plurality of electromagnetic engines of claim 1, wherein the set of power states is configured to cause the wheeled bogie assembly to traverse between the right rail and the right-center rail via a second grooved profile section.

7. A method for controlling a first electromagnetic engine and a second electromagnetic engine, both of which being configured to attach to a wheeled bogie assembly configured to operate on a rail assembly having a left rail, a left-center rail, a right-center rail, a right rail, and a frog assembly, the method comprising:
   receiving a first signal;
   determining a set of power states configured to cause the first electromagnetic engine and the second electromagnetic engine to excite one or more coils, the exciting resulting in electromagnetic force configured to cause the attached wheeled bogie to traverse laterally across a first plurality of rails;
   exciting, based on the first signal, the one or more coils, based on a set of power states, the set of power states defining which of the one or more coils are excited, wherein the set of power states is configured to cause the wheeled bogie assembly to traverse left or right via a first or second grooved profile section.

8. The method of claim 7, wherein the one or more coils, when excited, are excited to a partial power level, the partial power level being less than a full power level.

9. The method of claim 7, wherein the first signal is a straight signal to cause the wheeled bogie assembly to proceed straight via the left rail, the right-center rail, the frog assembly, or a combination thereof.

10. The method of claim 7, wherein the first signal is a turnout signal to cause the wheeled bogie assembly to turnout via the right rail, the left-center rail, and the frog assembly, or a combination thereof.

11. The method of claim 7, wherein the set of power states is configured to cause the wheeled bogie assembly to traverse between the left rail and the left-center rail via a first grooved profile section.

12. The method of claim 7, wherein the set of power states is configured to cause the wheeled bogie assembly to traverse between the right rail and the right-center rail via a second grooved profile section.

13. The method of claim 7, wherein the first plurality of coils comprises a first coil, a second coil, and a third coil, wherein the second plurality of coils comprises a fourth coil, a fifth coil, and a sixth coil, wherein the first signal is a left traversal signal, and wherein the one or more coils excited comprises the first coil, the second coil, the fourth coil, and the fifth coil.

* * * * *